(12) United States Patent
Langaas et al.

(10) Patent No.: US 12,503,200 B2
(45) Date of Patent: Dec. 23, 2025

(54) RECOIL HOUSING, ENGINE ASSEMBLY, AND METHOD OF ASSEMBLING ENGINE ASSEMBLY

(71) Applicant: Arctic Cat Inc., Thief River Falls, MN (US)

(72) Inventors: Benjamin Taylor Langaas, Thief River Falls, MN (US); Derek Sorenson, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 396 days.

(21) Appl. No.: 18/083,142

(22) Filed: Dec. 16, 2022

(65) Prior Publication Data

US 2023/0257066 A1    Aug. 17, 2023

Related U.S. Application Data

(60) Provisional application No. 63/404,822, filed on Sep. 8, 2022, provisional application No. 63/310,951, filed on Feb. 16, 2022.

(51) Int. Cl.
| | |
|---|---|
| *B62M 27/02* | (2006.01) |
| *B60K 5/12* | (2006.01) |
| *B62J 41/00* | (2020.01) |
| *B62M 7/02* | (2006.01) |
| *F02N 3/02* | (2006.01) |

(Continued)

(52) U.S. Cl.
CPC ............ *B62M 27/02* (2013.01); *B60K 5/12* (2013.01); *B62J 41/00* (2020.02); *B62M 7/02* (2013.01); *F02N 3/02* (2013.01); *F16H 57/0006* (2013.01); *F16H 57/035* (2013.01); *F16H 57/0416* (2013.01); *B62M 2027/023* (2013.01);

(Continued)

(58) Field of Classification Search
CPC .. B62M 27/02; B62M 7/02; B62M 2027/023; B62M 2027/028; B60K 5/12; B60K 5/1208; B60K 11/04; B62J 41/00; F02N 3/02; F02N 15/006; F16H 57/0006; F16H 57/035; F16H 57/0416; F16H 2057/02026; F16H 57/031; B60Y 2200/252
See application file for complete search history.

(56) References Cited

U.S. PATENT DOCUMENTS

| | | |
|---|---|---|
| 745,862 A | 12/1903 | Kerr |
| 3,529,494 A | 9/1970 | Matte |

(Continued)

FOREIGN PATENT DOCUMENTS

| | | |
|---|---|---|
| CA | 2456088 A1 | 8/2001 |
| CA | 2456088 C | 3/2005 |

(Continued)

OTHER PUBLICATIONS

IN-495786-B English Translation (Year: 2024).*

(Continued)

*Primary Examiner* — Michael T. Walsh
(74) *Attorney, Agent, or Firm* — Billion & Armitage

(57) ABSTRACT

Embodiments include a recoil housing for an engine in a vehicle. The recoil housing includes a housing portion having one or more engine fastening features, an arm integrated with the housing portion, and a mounting portion integrated with the arm. The mounting portion includes one or more mounting portion features.

20 Claims, 50 Drawing Sheets

(51) Int. Cl.
*F16H 57/00* (2012.01)
*F16H 57/035* (2012.01)
*F16H 57/04* (2010.01)
*F16H 57/02* (2012.01)

(52) U.S. Cl.
CPC .............. *B62M 2027/028* (2013.01); *F16H 2057/02026* (2013.01)

(56) References Cited

U.S. PATENT DOCUMENTS

| | | |
|---|---|---|
| 3,548,961 A | 12/1970 | Newman |
| 3,688,604 A | 9/1972 | Schlosser |
| 3,688,856 A | 9/1972 | Boehm et al. |
| 3,750,774 A | 8/1973 | Trapp |
| 3,758,169 A | 9/1973 | Trapp |
| 3,858,566 A * | 1/1975 | Perry ............... F02N 3/02 123/185.2 |
| 3,963,083 A | 6/1976 | Reese |
| 4,359,021 A * | 11/1982 | Frahm ............... F02N 3/02 123/185.2 |
| 4,502,353 A | 3/1985 | Beaudoin |
| 4,602,525 A | 7/1986 | Moroto et al. |
| 4,667,758 A | 5/1987 | Tamura |
| 4,892,165 A | 1/1990 | Yasui et al. |
| 4,940,100 A | 7/1990 | Ueda |
| 4,987,965 A | 1/1991 | Bourret |
| 5,000,056 A | 3/1991 | Crawford et al. |
| 5,152,255 A | 10/1992 | Fukuda |
| 5,232,066 A | 8/1993 | Schnelker |
| 5,251,718 A | 10/1993 | Inagawa et al. |
| 5,660,245 A | 8/1997 | Marier et al. |
| 5,862,662 A | 1/1999 | Fukuda et al. |
| 5,924,514 A | 7/1999 | Bullerdick |
| 5,957,230 A | 9/1999 | Harano et al. |
| 6,109,217 A | 8/2000 | Hedlund et al. |
| 6,161,908 A | 12/2000 | Takayama et al. |
| 6,170,589 B1 | 1/2001 | Kawano et al. |
| 6,224,134 B1 | 5/2001 | Johnson et al. |
| 6,270,106 B1 | 8/2001 | Maki et al. |
| 6,419,533 B2 | 7/2002 | Lecours |
| 6,446,744 B2 | 9/2002 | Wubbolts et al. |
| 6,561,297 B2 | 5/2003 | Yatagai et al. |
| 6,561,302 B2 | 5/2003 | Karpik |
| 6,604,594 B2 | 8/2003 | Wubbolts et al. |
| 6,644,261 B2 | 11/2003 | Morii et al. |
| 6,651,764 B2 | 11/2003 | Fournier et al. |
| 6,651,765 B1 | 11/2003 | Weinzierl |
| 6,681,724 B1 | 1/2004 | Berg |
| 6,695,087 B2 | 2/2004 | Fournier et al. |
| 6,749,036 B1 | 6/2004 | Schrapp et al. |
| 6,758,497 B2 | 7/2004 | Bergman |
| 6,823,957 B2 | 11/2004 | Girouard et al. |
| 6,823,960 B2 | 11/2004 | Shimizu et al. |
| 6,860,352 B2 | 3/2005 | Mallette et al. |
| 6,860,826 B1 | 3/2005 | Johnson |
| 6,890,010 B2 | 5/2005 | Bergman |
| 6,904,990 B2 | 6/2005 | Etou |
| 6,923,284 B2 | 8/2005 | Bédard et al. |
| 6,923,287 B2 | 8/2005 | Morii |
| 6,926,107 B2 | 8/2005 | Nishijima |
| 6,941,924 B2 | 9/2005 | Morii et al. |
| 6,942,050 B1 | 9/2005 | Honkala et al. |
| 6,942,052 B1 | 9/2005 | Blakely |
| 6,951,523 B1 | 10/2005 | Dieter et al. |
| 6,955,237 B1 | 10/2005 | Przekwas et al. |
| 6,966,395 B2 | 11/2005 | Schuehmacher et al. |
| 6,976,550 B2 | 12/2005 | Vaisanen |
| 6,981,564 B2 | 1/2006 | Bédard et al. |
| 7,011,173 B2 | 3/2006 | Cadotte et al. |
| 7,025,161 B2 | 4/2006 | Bertrand et al. |
| 7,032,561 B2 | 4/2006 | Morii et al. |
| 7,036,619 B2 | 5/2006 | Yatagai et al. |
| 7,048,293 B2 | 5/2006 | Bédard |
| 7,063,178 B2 | 6/2006 | Etou |
| 7,080,704 B1 | 7/2006 | Kerner et al. |
| 7,083,024 B2 | 8/2006 | Bergman et al. |
| 7,096,988 B2 | 8/2006 | Moriyama |
| 7,104,352 B2 | 9/2006 | Weinzierl et al. |
| 7,104,355 B2 | 9/2006 | Hoi |
| 7,124,846 B2 | 10/2006 | Bédard et al. |
| 7,124,847 B2 | 10/2006 | Girouard et al. |
| 7,124,848 B2 | 10/2006 | Girouard et al. |
| 7,128,176 B1 | 10/2006 | Mills et al. |
| 7,140,463 B2 | 11/2006 | Morii et al. |
| 7,147,074 B1 | 12/2006 | Berg et al. |
| 7,150,336 B2 | 12/2006 | Desmarais |
| 7,152,706 B2 | 12/2006 | Pichler et al. |
| 7,188,693 B2 | 3/2007 | Girouard et al. |
| 7,198,126 B2 | 4/2007 | Vaisanen |
| 7,198,127 B2 | 4/2007 | Yatagai et al. |
| 7,204,355 B2 | 4/2007 | Akiyama et al. |
| 7,213,668 B2 | 5/2007 | Richard et al. |
| 7,213,669 B2 | 5/2007 | Fecteau et al. |
| 7,249,647 B2 | 7/2007 | Nietlispach |
| 7,255,068 B2 | 8/2007 | Ashida |
| 7,255,195 B2 | 8/2007 | Haruna |
| 7,264,075 B2 | 9/2007 | Schuemacher et al. |
| 7,281,598 B2 | 10/2007 | Hoi |
| 7,296,645 B1 | 11/2007 | Kerner et al. |
| 7,296,657 B2 | 11/2007 | Ohno et al. |
| 7,300,382 B2 | 11/2007 | Yamamoto |
| 7,303,037 B2 | 12/2007 | Yatagai et al. |
| 7,328,765 B2 | 2/2008 | Ebert et al. |
| 7,353,898 B1 | 4/2008 | Bates |
| 7,353,899 B2 | 4/2008 | Abe et al. |
| 7,353,901 B2 | 4/2008 | Abe et al. |
| 7,357,207 B2 | 4/2008 | Vaeisaenen |
| 7,360,618 B2 | 4/2008 | Hibbert et al. |
| 7,370,724 B2 | 5/2008 | Saito et al. |
| 7,374,016 B2 | 5/2008 | Yamaguchi et al. |
| 7,377,348 B2 | 5/2008 | Girouard et al. |
| 7,389,842 B2 | 6/2008 | Inoguchi et al. |
| 7,401,674 B1 | 7/2008 | Berg et al. |
| 7,401,816 B2 | 7/2008 | Abe et al. |
| 7,409,949 B1 | 8/2008 | Zauner et al. |
| 7,410,182 B1 | 8/2008 | Giese |
| 7,413,046 B2 | 8/2008 | Okada et al. |
| 7,451,846 B2 | 11/2008 | Wubbolts et al. |
| 7,458,593 B2 | 12/2008 | Saito et al. |
| 7,472,771 B2 | 1/2009 | Yatagai et al. |
| 7,475,751 B2 | 1/2009 | Pard et al. |
| 7,484,584 B1 | 2/2009 | Kerner et al. |
| 7,533,749 B1 | 5/2009 | Sampson et al. |
| 7,540,511 B2 | 6/2009 | Saito et al. |
| 7,543,669 B2 | 6/2009 | Kelahaara |
| 7,543,672 B2 | 6/2009 | Codere et al. |
| 7,591,332 B1 | 9/2009 | Bates |
| 7,594,557 B2 | 9/2009 | Polakowski et al. |
| 7,597,069 B2 | 10/2009 | Ashida |
| 7,610,132 B2 | 10/2009 | Yanai et al. |
| 7,708,096 B2 | 5/2010 | Vezina |
| 7,753,154 B2 | 7/2010 | Maltais |
| 7,775,313 B1 | 8/2010 | Sampson et al. |
| 7,779,944 B2 | 8/2010 | Bergman et al. |
| 7,779,946 B2 | 8/2010 | Okada et al. |
| 7,789,184 B2 | 9/2010 | Maltais |
| 7,798,529 B2 | 9/2010 | Sato |
| 7,802,644 B2 | 9/2010 | Brodeur et al. |
| 7,802,645 B2 | 9/2010 | Mallette et al. |
| 7,802,646 B2 | 9/2010 | Matsudo |
| 7,806,215 B2 | 10/2010 | Codere et al. |
| 7,878,293 B2 | 2/2011 | Okada et al. |
| 7,913,785 B2 | 3/2011 | Korsumaki et al. |
| 7,918,299 B2 | 4/2011 | Yoshihara |
| 7,980,629 B2 | 7/2011 | Bedard |
| 7,997,372 B2 | 8/2011 | Maltais |
| 8,001,862 B2 | 8/2011 | Albulushi et al. |
| 8,028,795 B2 | 10/2011 | Hisanaga et al. |
| 8,037,961 B2 | 10/2011 | Fecteau |
| 8,127,877 B2 | 3/2012 | Fredrickson et al. |
| 8,167,073 B2 | 5/2012 | Polakowski et al. |
| 8,191,665 B1 | 6/2012 | Sampson et al. |

(56) References Cited

U.S. PATENT DOCUMENTS

| | | | |
|---|---|---|---|
| 8,225,896 B2 * | 7/2012 | Eichenberger | B60K 28/00 |
| | | | 220/501 |
| 8,235,164 B2 | 8/2012 | Okada et al. | |
| 8,240,417 B2 | 8/2012 | Takata | |
| 8,281,889 B2 | 10/2012 | Inoue | |
| 8,381,857 B1 | 2/2013 | Sampson et al. | |
| 8,408,348 B2 | 4/2013 | Nakamura et al. | |
| 8,430,197 B2 | 4/2013 | Matsudo | |
| 8,453,779 B2 | 6/2013 | Vezina | |
| 8,474,783 B2 | 7/2013 | Hu | |
| 8,490,731 B2 | 7/2013 | Eaton et al. | |
| 8,528,683 B2 | 9/2013 | Beavis et al. | |
| 8,534,413 B2 * | 9/2013 | Nelson | B60W 30/1882 |
| | | | 474/8 |
| 8,567,546 B2 | 10/2013 | Berg et al. | |
| 8,590,654 B2 | 11/2013 | Kerner et al. | |
| 8,607,912 B2 | 12/2013 | Mallette et al. | |
| 8,657,054 B2 | 2/2014 | Mallette et al. | |
| 8,733,773 B2 | 5/2014 | Sampson | |
| 8,763,745 B2 | 7/2014 | Nagao et al. | |
| 8,881,856 B2 | 11/2014 | Fecteau et al. | |
| 8,919,477 B2 | 12/2014 | Conn et al. | |
| 8,944,204 B2 | 2/2015 | Ripley et al. | |
| 8,994,494 B2 | 3/2015 | Koenig et al. | |
| 9,022,156 B2 | 5/2015 | Bedard et al. | |
| 9,061,732 B1 | 6/2015 | Vezina | |
| 9,073,604 B2 | 7/2015 | Mallette et al. | |
| 9,090,313 B2 | 7/2015 | Bedard | |
| 9,096,289 B2 | 8/2015 | Hedlund et al. | |
| 9,114,852 B2 | 8/2015 | Fecteau et al. | |
| 9,139,255 B1 | 9/2015 | Glissmeyer et al. | |
| 9,162,731 B2 | 10/2015 | Maltais | |
| 9,228,581 B2 | 1/2016 | Bernier et al. | |
| 9,327,789 B1 | 5/2016 | Vezina et al. | |
| 9,346,508 B1 | 5/2016 | Lemieux | |
| 9,346,518 B2 | 5/2016 | Polakowski et al. | |
| 9,352,801 B2 | 5/2016 | Makitalo et al. | |
| 9,352,802 B2 | 5/2016 | Sampson | |
| 9,359,022 B2 | 6/2016 | Bedard et al. | |
| 9,387,907 B2 | 7/2016 | Nasca et al. | |
| 9,428,232 B2 | 8/2016 | Ripley et al. | |
| 9,446,810 B2 | 9/2016 | Ripley | |
| 9,481,370 B2 | 11/2016 | Bernier et al. | |
| 9,540,072 B2 | 1/2017 | Hedulnd | |
| 9,545,844 B2 | 1/2017 | Forty et al. | |
| 9,610,986 B2 | 4/2017 | Conn | |
| 9,618,071 B2 | 4/2017 | Hirota | |
| 9,682,746 B2 | 6/2017 | Yasuda et al. | |
| 9,683,492 B2 | 6/2017 | Bernier et al. | |
| 9,688,354 B2 | 6/2017 | Nagao et al. | |
| 9,694,872 B2 | 7/2017 | Laroche et al. | |
| 9,738,301 B2 | 8/2017 | Vezina et al. | |
| 9,751,552 B2 | 9/2017 | Mangum et al. | |
| 9,789,930 B1 | 10/2017 | Vezina et al. | |
| 9,796,437 B2 | 10/2017 | Wilson et al. | |
| 9,809,195 B2 | 11/2017 | Giese et al. | |
| 9,828,064 B2 | 11/2017 | Pard et al. | |
| 9,828,065 B2 | 11/2017 | Pard | |
| 9,845,004 B2 | 12/2017 | Hedlund et al. | |
| 9,873,485 B2 | 1/2018 | Mangum et al. | |
| 9,988,067 B1 | 6/2018 | Mangum et al. | |
| 10,001,200 B2 | 6/2018 | Parraga Gimeno et al. | |
| 10,029,567 B2 | 7/2018 | Lefebvre et al. | |
| 10,035,554 B2 | 7/2018 | Mertens et al. | |
| 10,065,708 B2 | 9/2018 | Labbe et al. | |
| 10,144,486 B2 | 12/2018 | Yasuda et al. | |
| 10,195,999 B1 | 2/2019 | Glickman et al. | |
| 10,202,169 B2 | 2/2019 | Mangum et al. | |
| 10,215,083 B2 | 2/2019 | Vezina et al. | |
| 10,232,910 B2 | 3/2019 | Mangum et al. | |
| 10,259,507 B1 | 4/2019 | Johnson et al. | |
| 10,293,885 B2 | 5/2019 | Vezina et al. | |
| 10,300,989 B2 | 5/2019 | Vezina | |
| 10,300,990 B2 | 5/2019 | Vezina | |
| 10,358,187 B2 | 7/2019 | Vistad et al. | |
| 10,377,446 B2 | 8/2019 | Thibault et al. | |
| 10,392,079 B2 | 8/2019 | Vezina et al. | |
| 10,406,910 B2 | 9/2019 | Vezina et al. | |
| 10,408,116 B2 * | 9/2019 | Reeves | F02B 61/00 |
| 10,435,059 B2 | 10/2019 | Mallette et al. | |
| 10,450,968 B2 | 10/2019 | Bernier et al. | |
| 10,451,017 B2 * | 10/2019 | Densborn | F02N 3/02 |
| 10,513,970 B2 | 12/2019 | Vezina et al. | |
| 10,526,045 B2 | 1/2020 | Vezina et al. | |
| 10,538,262 B2 | 1/2020 | Mangum et al. | |
| 10,543,792 B2 | 1/2020 | Yoshioka et al. | |
| 10,597,105 B2 | 3/2020 | Lefebvre et al. | |
| 10,619,615 B2 | 4/2020 | Dale et al. | |
| 10,675,962 B2 | 6/2020 | Urabe et al. | |
| 10,676,157 B2 | 6/2020 | Vigen | |
| 10,730,576 B2 | 8/2020 | Labbe et al. | |
| 10,766,571 B2 | 9/2020 | Sampson et al. | |
| 10,766,572 B2 | 9/2020 | Pard et al. | |
| 10,766,573 B2 | 9/2020 | Vezina et al. | |
| 10,773,684 B2 | 9/2020 | Koenig et al. | |
| 10,773,774 B2 | 9/2020 | Mangum et al. | |
| 10,780,949 B2 | 9/2020 | Crain et al. | |
| 10,793,226 B2 | 10/2020 | Crain et al. | |
| 10,800,490 B2 | 10/2020 | Foxhall et al. | |
| 10,814,935 B2 | 10/2020 | Vaisanen et al. | |
| 10,822,054 B2 | 11/2020 | Lemieux | |
| 10,843,758 B2 | 11/2020 | Hebert et al. | |
| 10,870,465 B2 | 12/2020 | Crain et al. | |
| 10,875,595 B2 | 12/2020 | Laberge et al. | |
| 10,875,605 B2 | 12/2020 | Pard | |
| 10,899,415 B2 | 1/2021 | Mangum et al. | |
| 10,913,512 B2 | 2/2021 | Thompson et al. | |
| 10,960,914 B2 | 3/2021 | Mangum et al. | |
| 10,974,790 B2 | 4/2021 | Hosaluk et al. | |
| 11,027,794 B2 | 6/2021 | Vigen | |
| 11,097,793 B2 | 8/2021 | Marchildon et al. | |
| 11,110,994 B2 | 9/2021 | Hedlund et al. | |
| 11,142,286 B2 | 10/2021 | Sampson et al. | |
| 11,208,168 B2 | 12/2021 | Hedlund et al. | |
| 11,214,320 B2 | 1/2022 | Bates et al. | |
| 11,220,310 B2 | 1/2022 | Pard et al. | |
| 11,225,302 B2 | 1/2022 | Vigen | |
| 11,230,351 B2 | 1/2022 | Vezina | |
| 11,235,634 B2 | 2/2022 | Lavallee et al. | |
| 11,286,019 B2 | 3/2022 | Hedlund et al. | |
| 11,352,996 B1 * | 6/2022 | Bernier | F02B 75/04 |
| 11,358,661 B2 | 6/2022 | Laugen et al. | |
| 11,384,679 B2 | 7/2022 | Matsumoto et al. | |
| 11,415,207 B2 | 8/2022 | Pard et al. | |
| 11,505,263 B2 | 11/2022 | Hedlund et al. | |
| 11,524,569 B2 | 12/2022 | Vezina et al. | |
| 2001/0047900 A1 | 12/2001 | Fecteau et al. | |
| 2003/0127265 A1 | 7/2003 | Watson et al. | |
| 2004/0090119 A1 | 5/2004 | Ebert et al. | |
| 2005/0016784 A1 | 1/2005 | Fecteau | |
| 2005/0241867 A1 | 11/2005 | Abe et al. | |
| 2006/0162977 A1 | 7/2006 | Etou | |
| 2008/0277184 A1 | 11/2008 | Marleau | |
| 2011/0168477 A1 | 7/2011 | Yokomori et al. | |
| 2013/0175106 A1 | 7/2013 | Bédard et al. | |
| 2013/0206494 A1 | 8/2013 | Hedlund et al. | |
| 2015/0021898 A1 | 1/2015 | Serbinski | |
| 2016/0068227 A1 | 3/2016 | Yasuda et al. | |
| 2017/0101142 A1 | 4/2017 | Hedlund et al. | |
| 2018/0334211 A1 | 11/2018 | Mertens et al. | |
| 2019/0233055 A1 | 8/2019 | Vezina | |
| 2019/0256170 A1 | 8/2019 | Labbe | |
| 2019/0344657 A1 | 11/2019 | Vezina et al. | |
| 2019/0344859 A1 | 11/2019 | Vistad et al. | |
| 2020/0148056 A1 | 5/2020 | Forty et al. | |
| 2020/0224628 A1 | 7/2020 | Dale et al. | |
| 2020/0398785 A1 | 12/2020 | Koenig et al. | |
| 2021/0053652 A1 | 2/2021 | Fuchs et al. | |
| 2021/0053653 A1 | 2/2021 | Mangum et al. | |
| 2021/0115835 A1 | 4/2021 | Diehl et al. | |
| 2021/0122445 A1 | 4/2021 | Thompson et al. | |
| 2021/0129943 A1 | 5/2021 | Mangum et al. | |
| 2021/0163086 A1 | 6/2021 | Mallette et al. | |
| 2021/0188182 A1 | 6/2021 | Edwards et al. | |

(56) References Cited

U.S. PATENT DOCUMENTS

| | | |
|---|---|---|
| 2021/0188185 A1 | 6/2021 | Hedlund et al. |
| 2021/0188376 A1 | 6/2021 | Laugen et al. |
| 2021/0188382 A1 | 6/2021 | Hedlund |
| 2021/0213899 A1 | 7/2021 | Yotsuyanagi et al. |
| 2021/0214044 A1 | 7/2021 | Krings et al. |
| 2021/0229731 A1 | 7/2021 | Stoxen et al. |
| 2021/0245837 A1 | 8/2021 | Vigen |
| 2021/0323629 A1 | 10/2021 | Blackburn et al. |
| 2021/0347432 A1 | 11/2021 | Halvorson |
| 2021/0362807 A1 | 11/2021 | Hedlund et al. |
| 2022/0024541 A1 | 1/2022 | Korsumaki |
| 2022/0097801 A1 | 3/2022 | Vigen |
| 2022/0111929 A1 | 4/2022 | Matsushita |
| 2022/0119049 A1 | 4/2022 | Bates et al. |
| 2022/0177077 A1 | 6/2022 | Vistad et al. |
| 2022/0212754 A1 | 7/2022 | Stock et al. |
| 2022/0349339 A1 | 11/2022 | Schuehmacher et al. |
| 2023/0052282 A1 | 2/2023 | Hedlund et al. |

FOREIGN PATENT DOCUMENTS

| | | |
|---|---|---|
| CA | 2411964 C | 7/2005 |
| CA | 2371477 C | 7/2006 |
| CA | 2363856 C | 1/2008 |
| CA | 2639857 A1 | 6/2009 |
| CA | 2877554 A1 | 1/2014 |
| CA | 2987534 A1 | 12/2016 |
| CA | 2925800 A1 | 10/2017 |
| CA | 2925822 A1 | 10/2017 |
| CA | 3117886 A1 | 5/2020 |
| CA | 2863952 C | 6/2020 |
| CA | 3030691 C | 10/2020 |
| CA | 3103308 A1 | 6/2021 |
| CN | 105422273 A | 3/2016 |
| CN | 214112699 U * | 9/2021 |
| IN | 495786 B * | 1/2024 |
| JP | S55125312 A | 9/1980 |
| JP | 08085350 A * | 4/1996 |
| JP | H10217921 A | 8/1998 |
| JP | 2000351161 A * | 12/2000 |
| JP | 2005193788 A | 7/2005 |
| JP | 4840406 B2 | 10/2011 |
| KR | 2016091582 A * | 8/2016 |
| WO | 8607423 A1 | 12/1986 |
| WO | 2009114414 A1 | 9/2009 |

OTHER PUBLICATIONS

JP-2000351161-A English Translation (Year: 2000).*
JP-08085350-A English Translation (Year: 1996).*
KR-2016091582-A English Translation (Year: 2016).*
CN-214112699-U English Translation (Year: 2021).*
"2007 Arctic Cat Jaguar Z1 Next Generation Performance 4-Stroke", Snowtech Magazine, retrieved May 26, 2022 from https://www.snowtechmagazine.com/2007-arctic-cat-jaguar-z1-next-generation-performance-4-stroke/, Sep. 20, 2006.

* cited by examiner

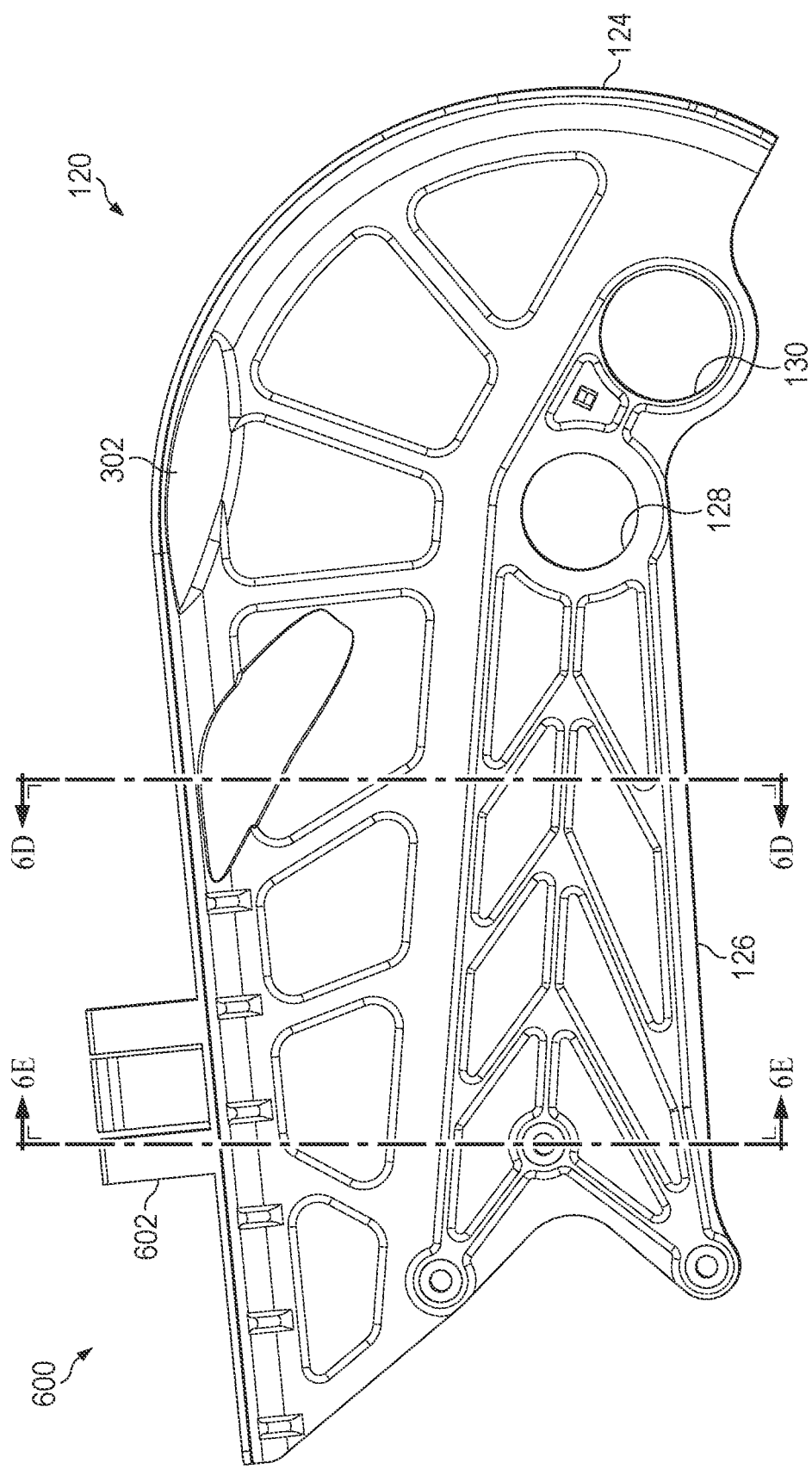

800

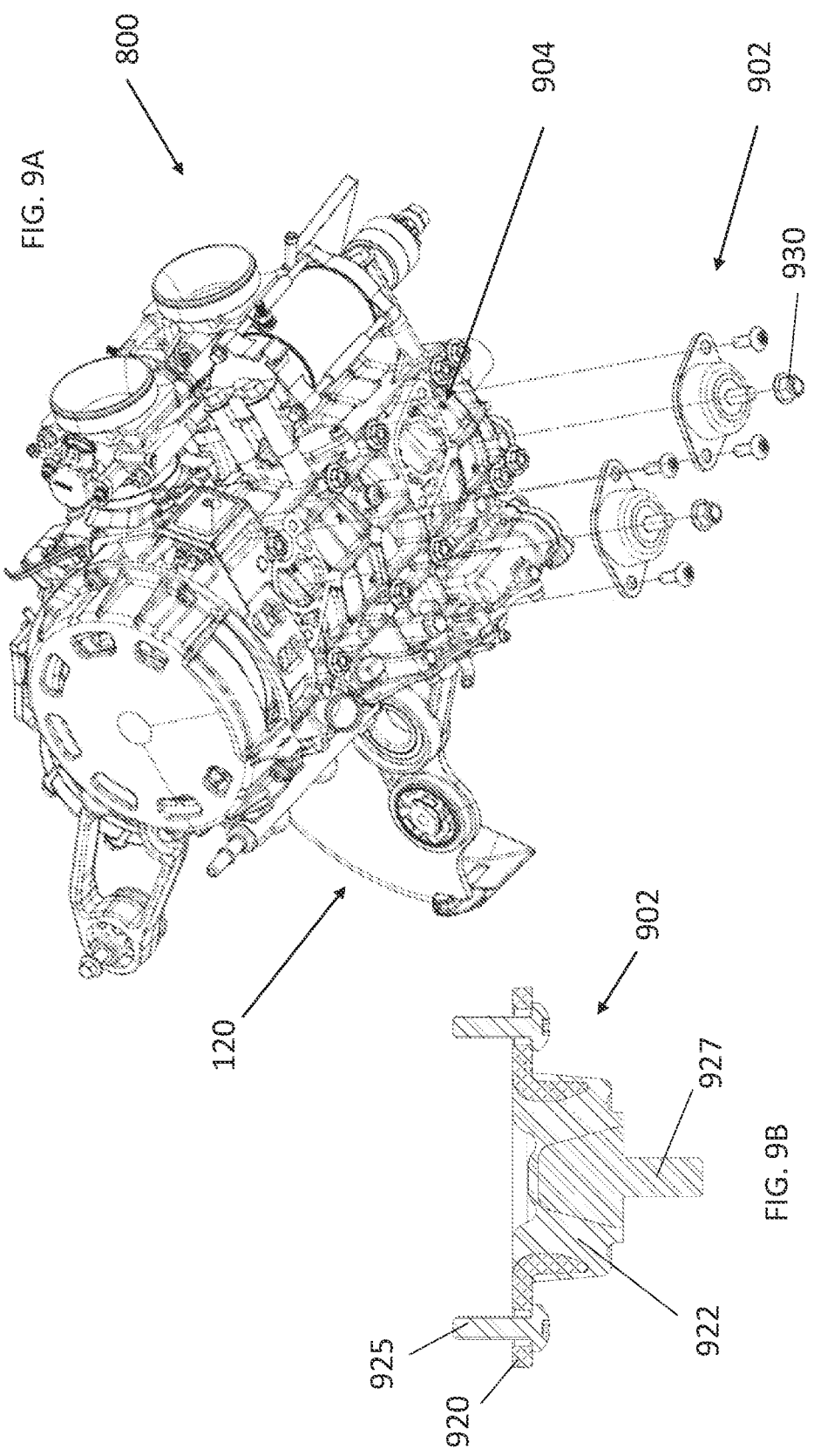

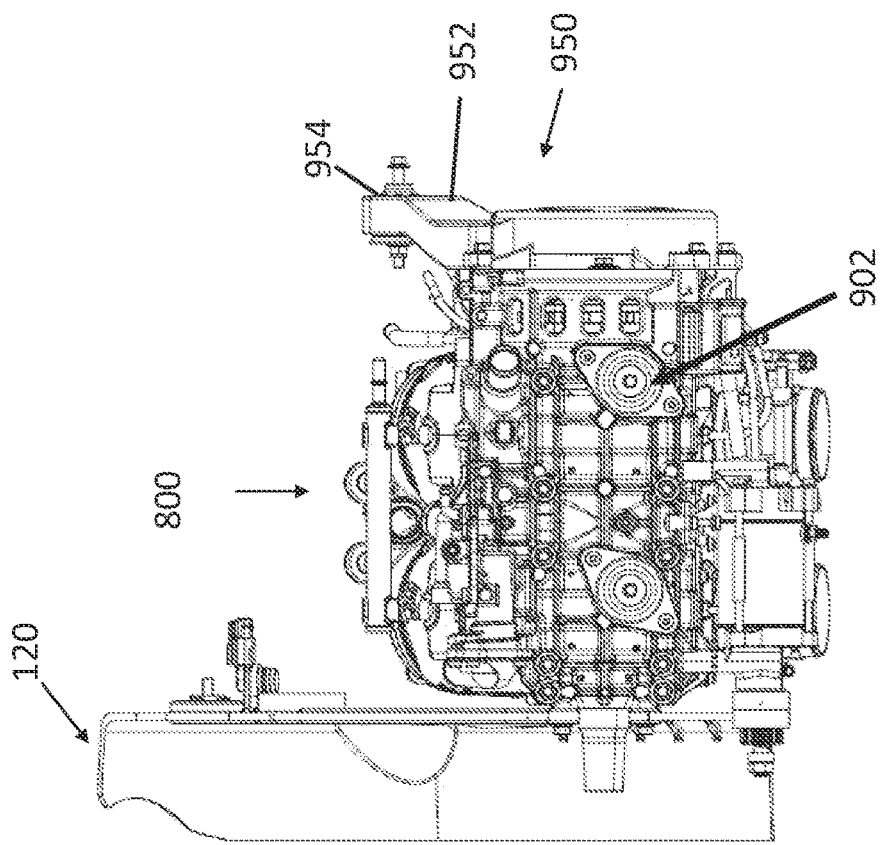
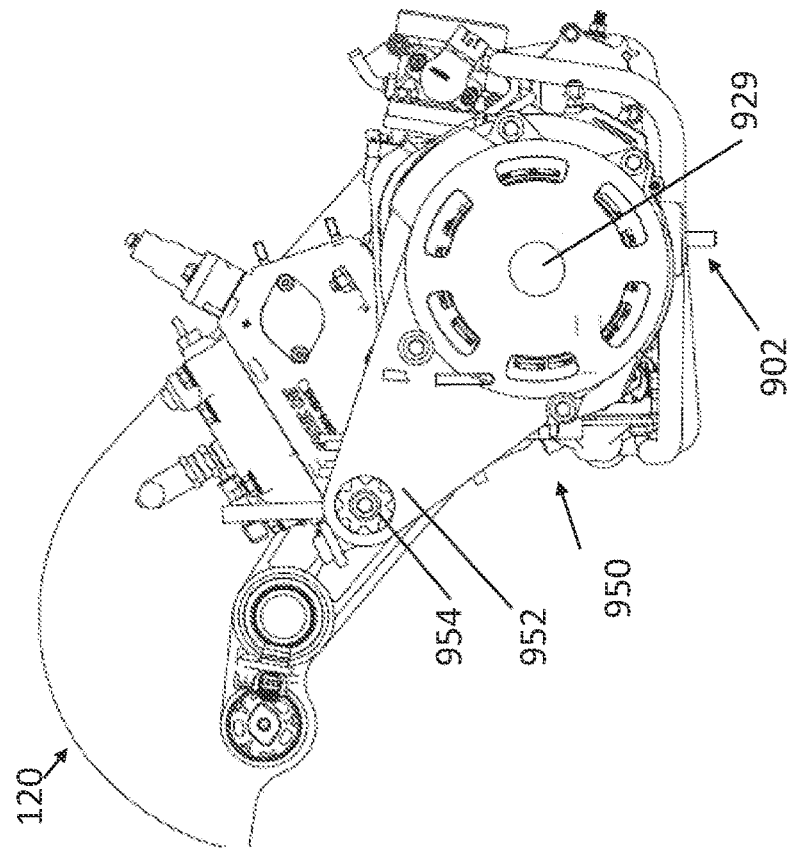
FIG. 11A
FIG. 11B

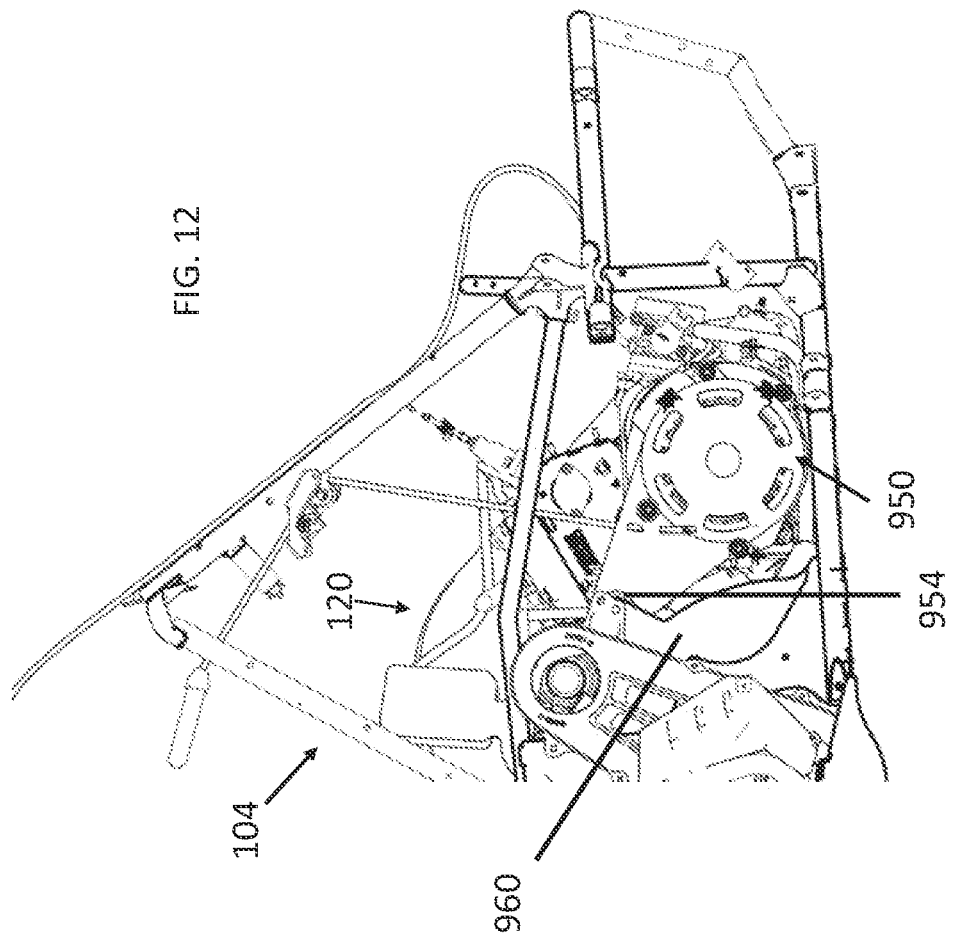

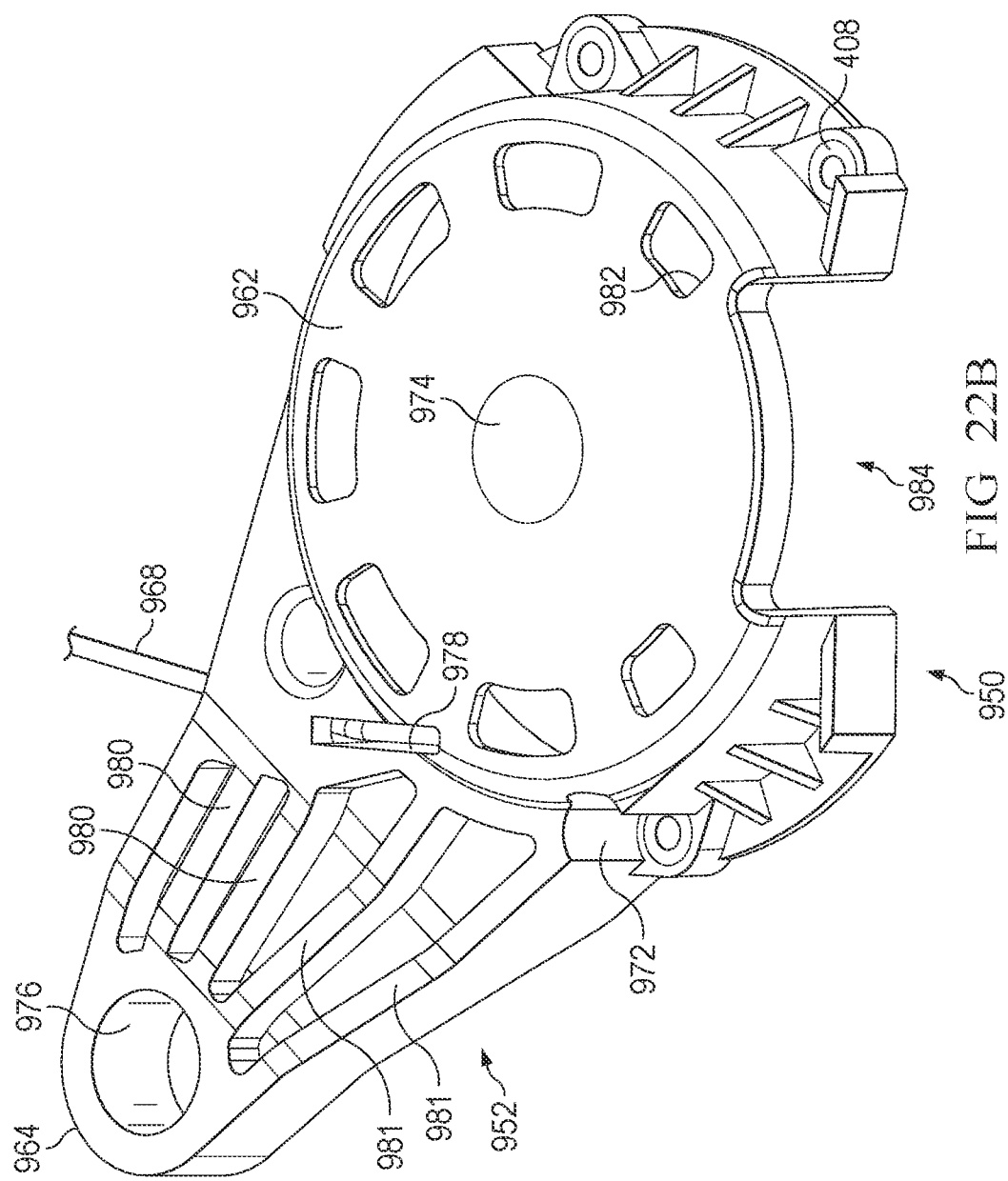

RECOIL HOUSING, ENGINE ASSEMBLY, AND METHOD OF ASSEMBLING ENGINE ASSEMBLY

CROSS REFERENCE TO RELATED APPLICATIONS

This application claims the benefit of and priority to U.S. Provisional Application No. 63/310,951, filed Feb. 16, 2022, and U.S. Provisional Application No. 63/404,822, filed Sep. 8, 2022. A claim of priority is made to the aforementioned applications. The disclosures of the above applications are incorporated herein by reference in their entirety.

BACKGROUND

Snowmobiles are popular land vehicles used as transportation vehicles or as recreational vehicles in cold and snowy conditions. Generally, snowmobiles are available for various applications such as deep snow, high performance, luxury touring, and trail riding, for example. In general, a snowmobile has a chassis on or around which the various components of the snowmobile are assembled. Typical snowmobiles include one or more skis for steering, a seat, handlebars, and an endless track for propulsion mounted to a central chassis. The engine drives a ground-engaging endless track disposed in a longitudinally extending drive tunnel. The skis serve to facilitate steering as well as to provide flotation of the front of the snowmobile over the snow in which it is operated. A handlebar assembly, positioned forward of the seat, is operatively linked to the skis for steering the snowmobile. The skis may be pivoted to steer the snowmobile, for example, by turning the handlebars.

At least some snowmobile frames include a tunnel and a front chassis portion which retains the power train, and a front suspension that mounts skis to the frame. A driveshaft is typically mounted to the front chassis portion and includes drive sprockets for powering a belt. A transmission component, such as a chain case, belt drive case, or gear box is also typically provided to transfer power from an engine or CVT (continuously variable transmission) to the drive shaft. A typical snowmobile may include a drivetrain with a drive shaft and an upper jack shaft that drives the drive sprocket(s) through the chain case, belt drive case, or gear box. CVTs are also utilized for snow bikes, motorcycles, and all-terrain vehicles (ATVs). The CVT includes a belt that is often shielded from a user by a clutch guard or clutch shield. A torque control link can optionally be utilized to control a center distance between components in a CVT. A snowmobile may include a recoil housing and starting cord for starting the engine.

SUMMARY

Embodiments include a recoil housing for an engine in a vehicle, comprising a housing portion including one or more engine fastening features; an arm, integrated with the housing portion; and a mounting portion integrated with the arm; wherein the mounting portion includes one or more mounting portion features.

Embodiments further include a snowmobile comprising an engine mounted on a chassis; and a recoil housing with a fiber reinforced polymer body including a housing portion in contact with the engine, wherein the housing portion includes one or more engine fastening features; an arm, integrated with the housing portion; and a mounting portion integrated with the arm; wherein the mounting portion includes one or more mounting portion features.

Embodiments further include a snowmobile comprising an engine mounted on a chassis; a clutch guard secured to both the chassis and the engine; and a single-piece construction recoil housing on an opposite side of the engine from the clutch guard, the single-piece construction recoil housing including a housing portion in contact with the engine, wherein the housing portion includes one or more engine fastening features; an arm, integrated with the housing portion; and a mounting portion integrated with the arm; wherein the mounting portion includes one or more mounting portion features.

Embodiments further include a snowmobile comprising a chassis including a first side and a second side; an engine; a first body comprising a polymer matrix composite secured to the engine on the first side of the chassis, the first body comprising an engine mount connected to the chassis; and a second body comprising a polymer matrix composite secured to the engine on the second side of the chassis, the second body comprising an engine mount connected to the chassis.

Embodiments further include a snowmobile comprising a chassis; an engine; a body comprising a polymer matrix composite secured to the engine, the body including a recoil housing; an arm extending from the recoil housing and defining a chamber therein; and a damping component housed in the chamber defined by the arm of the body, the damping component is secured to the chassis or a component connected to the chassis.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 6C illustrates a perspective view 600 of a clutch guard with integrated torque control link showing optional support components, according to some embodiments.

FIG. 9A illustrates a perspective view of engine 800 with engine mount assemblies, according to some embodiments.

FIG. 9B illustrates a cross sectional side view of the engine mount assembly of FIG. 9A, according to some embodiments.

FIG. 11A illustrates a side view of engine 800 with integrated torque control link, recoil housing, and cast mounting surfaces, according to some embodiments.

FIG. 11B illustrates a bottom view of engine 800 with integrated torque control link, recoil housing, and cast mounting surfaces, according to some embodiments.

FIG. 12 illustrates a perspective view of engine 800 with integrated torque control link, recoil housing, and cast mounting surfaces, positioned on a forward frame of a snowmobile according to some embodiments.

FIG. 22B illustrates a perspective view of an exterior surface of the recoil housing 950, according to some embodiments.

DETAILED DESCRIPTION

Embodiments of the present disclosure describe one or more components that may be operably connected to an engine or motor. Illustrative examples include one or more of a recoil housing, a clutch guard, an integrated engine mount, and motor or engine assemblies including one or more thereof. The recoil housing and the clutch guard may both comprise a composite material and may be secured on opposite sides of an engine positioned therebetween and cast engine mounts may be provided for securing the engine to the vehicle chassis. The recoil housing may include one or more of an integrated arm, housing portion, and mounting portion. The recoil housing can include a pathway for a starting cord and may be in contact with an engine. By integrating a recoil housing with an arm, housing portion, and mounting portion into a single component, a reduction of parts, a decrease in manufacturing cost, and a decrease in vibrational stress may be accomplished.

Figure 1A:
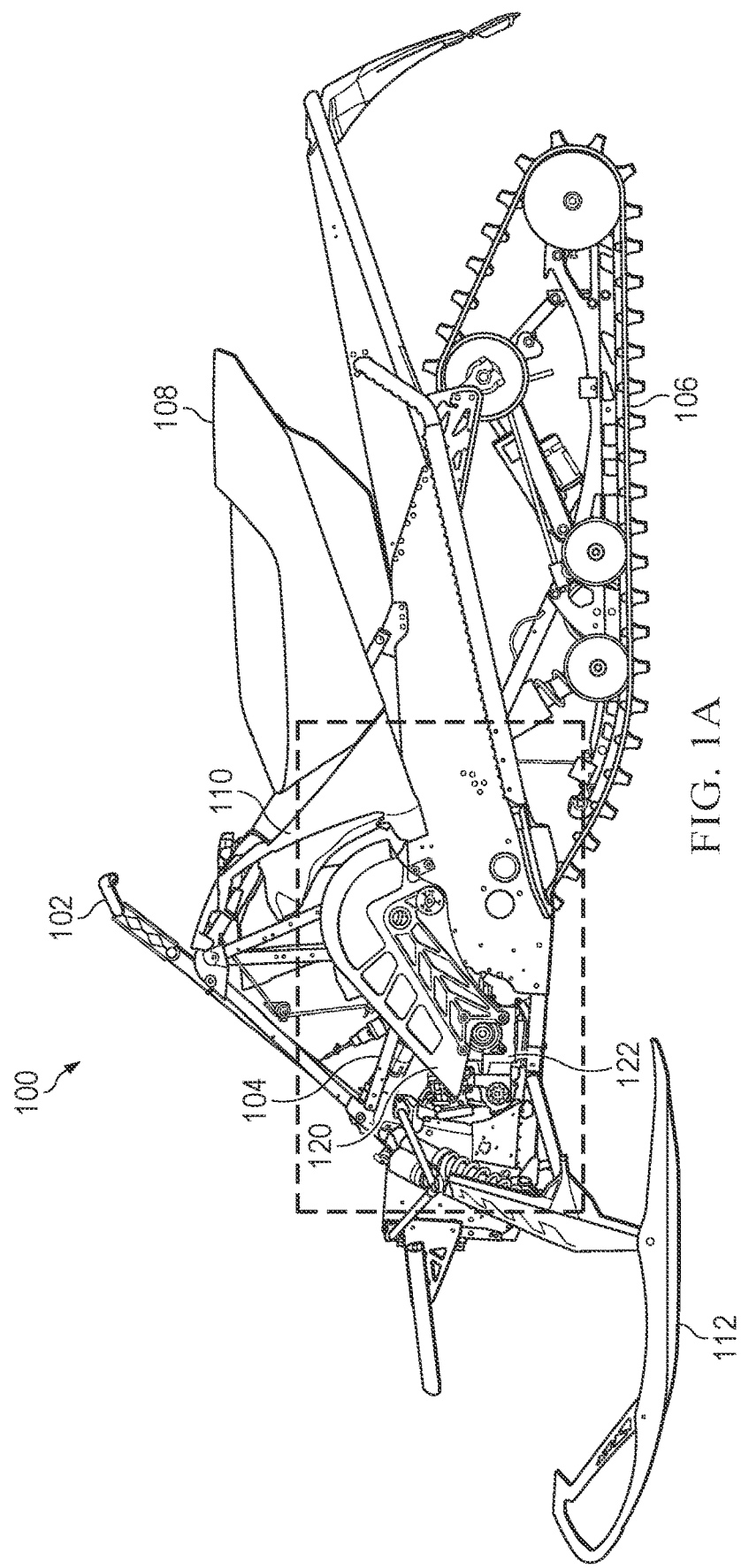
FIG. 1A illustrates a perspective view 100 of a snowmobile with partial shroud, according to some embodiments of this disclosure.

Referring to FIG. 1, a perspective view 100 of a snowmobile is shown, according to some embodiments. A chassis or frame 104 supports an engine 122, drive or power train 204 (see FIG. 2A), a drive track 106, handlebars 102 and skis 112. An illustrative example of the chassis 104 that may be used is shown in U.S. Provisional Application No. 63/344,165, filed on May 20, 2022, the contents of which are incorporated herein by reference in their entirety. A shroud 110 (partially shown in FIG. 1A) or fairing in contact with the chassis 104 covers and protects various components of the vehicle. A seat 108 is positioned rearward of the handlebars 102. A clutch guard with integrated torque control link 120 is shown, in contact with both the engine 122 and chassis 104.

Figure 1B:
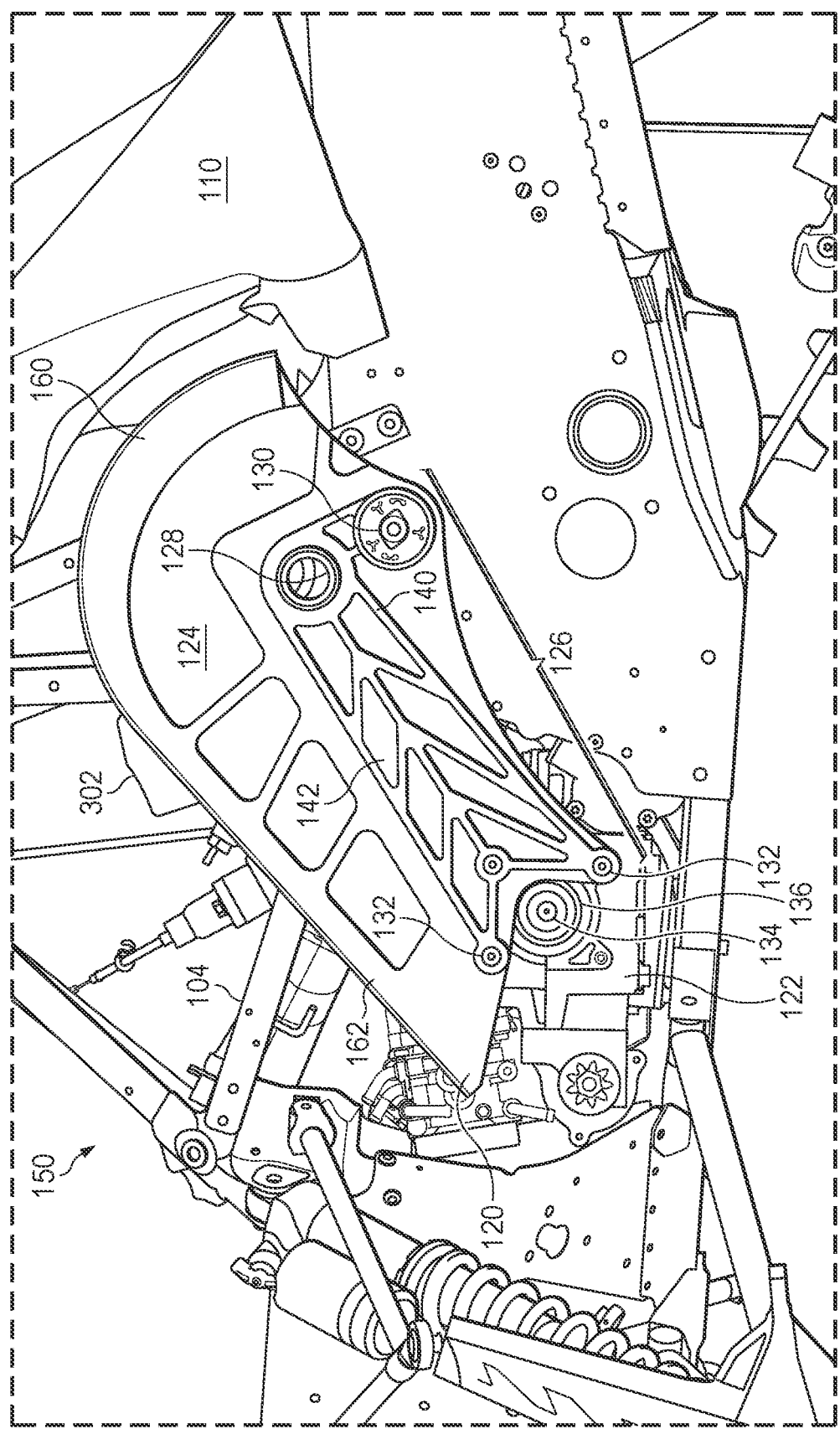
FIG. 1B illustrates a perspective view 150 of a snowmobile with partial shroud, according to some embodiments of this disclosure.
Figure 2A:
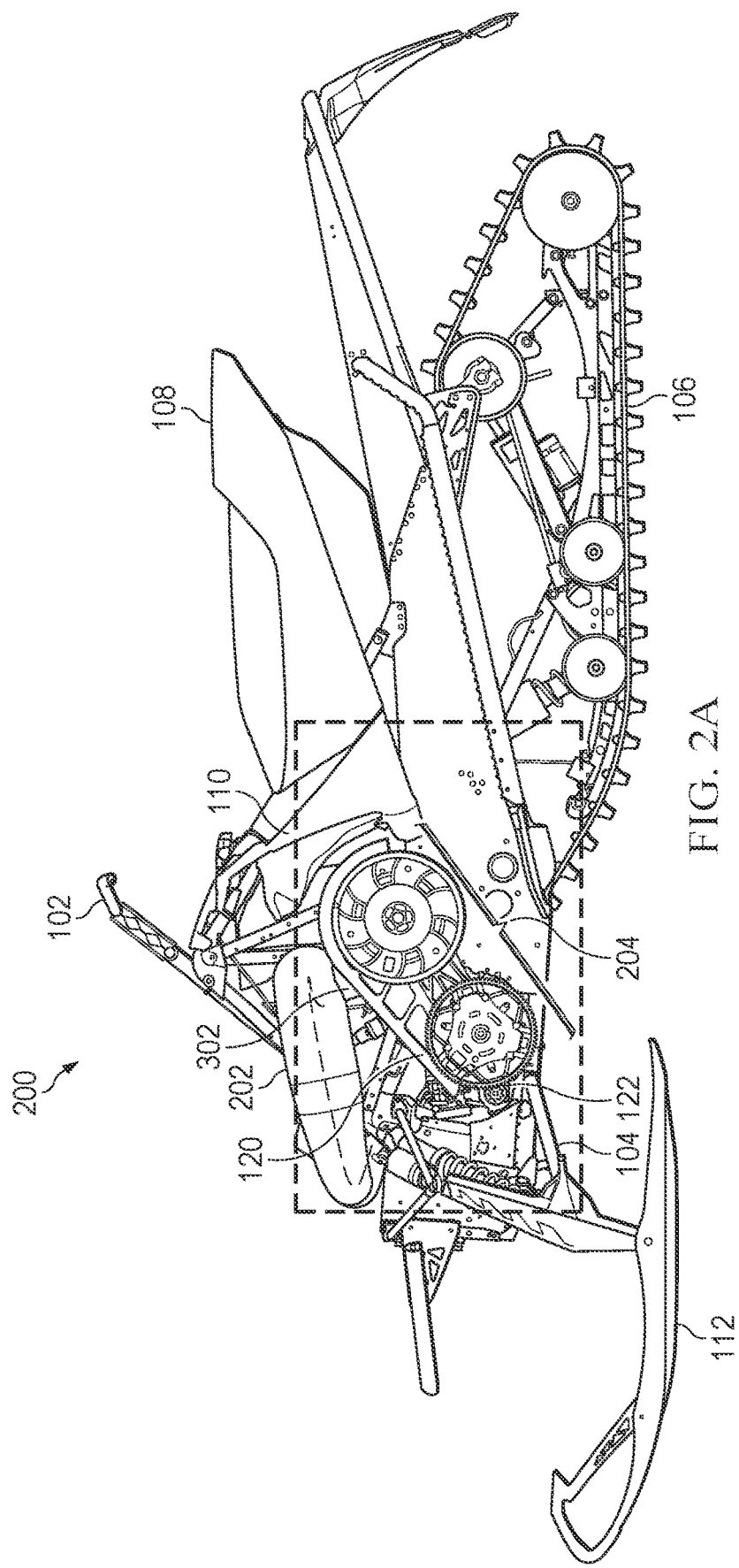
FIG. 2A illustrates a perspective view 200 of a snowmobile with exhaust system, according to some embodiments of this disclosure.

FIG. 1B shows a partial perspective view 150 of a snowmobile including a clutch guard with integrated TCL 120. The clutch guard 120 includes a shield body 124 (shield body portion or section) and integrated torque control link section 126 (or portion). The link section 126 includes one or more engine mounting features 132, one or more chassis mounting features 130, and jackshaft aperture 128. An output shaft clearance component 136 of the link section 126 is in proximity to an output shaft 134. The clearance component 136 may be shaped to provide clearance for the output shaft, for example. The shape may be triangular, circular, or custom shaped to provide for the operation of the output shaft without interference. The shield body 124 extends from the link section 126 to shield a rider or user from the moving parts of the drive train 204 (see FIG. 2A), including a moving belt. The shield body 124 includes an inboard side 164 (see FIG. 3A for example) and an outboard side 162, and a lip 160 extending from the outboard side 162 that with the outboard side partially houses the moving belt. In one embodiment, the engine power take off (PTO) could extend through the shield body 124. The shield body 124 encompasses an upper portion of the clutch guard 120 (in relation to the ground). Integrated with the shield body 124 is the link section 126, which generally includes the lower portion (in relation to the ground) of the clutch guard 120. The link section 126 maintains a stable center to center distance between clutches 206, 208 (see FIG. 2B), by locking in the position of the jackshaft (not shown) in the jackshaft aperture 128 and the output shaft 134 with the output shaft positioning feature 136. By securing this distance between clutches, belt tension is more consistently maintained and vibration and rocking is reduced. The link section 126 can include structural features 140, such as ribbing. The link section 126 can also include areas of recess or cutouts 142 to reduce the weight or size of the overall clutch guard 120. In at least some embodiments, for example where the clutch guard 120 is formed from a composite material, ribs are oriented to facilitate flow of material into a mold and/or align fibers to provide stiffness.

FIGS. 2A-D further include an exhaust system 202 (see views 200, 250, 260, 270). The exhaust system 202 is in contact with engine 122 and can be positioned to contact the clutch guard 120. The engine 122 is shown in contact with a drive train 204. The drive train 204 includes a continuously variable transmission (CVT), for transferring power from the engine 122 to the drive track 106. An engine 122 converts chemical energy to mechanical energy via a rotating input shaft in contact with a transmission or drive train 204, such as a CVT. The CVT includes a rotatable drive (or primary) clutch 206 connected to the output shaft from the engine 122. The CVT also includes a rotatable driven (or secondary) clutch 208 connected to an output shaft or jackshaft 210, the driven clutch 206 having a laterally stationary sheave and a laterally movable sheave that is normally biased toward the stationary sheave. An endless flexible drive belt (not shown) is disposed about the drive 206 and driven clutches 208. Typically, the CVT transmission is connected to the output shaft of the vehicle's engine, the transmission providing continuously variable gear reduction from the relatively higher rotation speed of the engine to the relatively lower rotation speed of the vehicle drive axle. A CVT may be used in conjunction with an additional gear box/transmission (not shown), if desired. For example, it may be desirable to provide a gear box to permit the driver to shift between forward and reverse gears. In such cases, a neutral position may also be provided, along with, e.g., an optional low gear for extra power at low speeds. Typically, such a gear box is connected to the jackshaft 210 of the CVT, the gear box in turn having a driveshaft connected by suitable linkages (sprockets, for example) to the drive track 106.

The endless, flexible, generally V-shaped drive belt is disposed about the clutches 206, 208. Each of the clutches has a pair of complementary sheaves, one of the sheaves being laterally movable with respect to the other. The effective gear ratio of the transmission is determined by the positions of the movable sheaves in each of the clutches. The secondary driven clutch 208 has its sheaves normally biased together (e.g., by a compression spring working in combination with a helix-type cam, as described below), so that when the engine is at idle speeds the drive belt rides near the outer perimeter of the driven clutch sheaves.

The spacing of the sheaves in the primary drive clutch 206 usually is controlled by centrifugal flyweights (such as a cam arm). As the drive clutch 206 rotates faster (in response to increased engine rpm) the flyweights urge the movable sheave toward the stationary sheave. This pinches the drive belt, causing the belt to begin rotating with the drive clutch 206, the belt in turn causing the driven clutch 208 to begin to rotate. Further movement of the drive clutch's 206 movable sheave toward the stationary sheave forces the belt to climb outwardly on the drive clutch sheaves, increasing the effective diameter of the drive belt path around the drive clutch 206. Thus, the spacing of the sheaves in the drive clutch 206 changes based on engine rpm. The clutch therefore can be said to be speed sensitive.

As the sheaves of the drive clutch 206 pinch the drive belt and force the belt to climb outwardly on the drive clutch sheaves, the belt (not being stretchable) is pulled inwardly between the sheaves of the driven clutch 208, decreasing the effective diameter of the drive belt path around the driven clutch 208. This movement of the belt inwardly and outwardly on the drive 206 and driven clutches 208 smoothly changes the effective gear ratio of the transmission in infinitely variable increments.

Figure 2B:
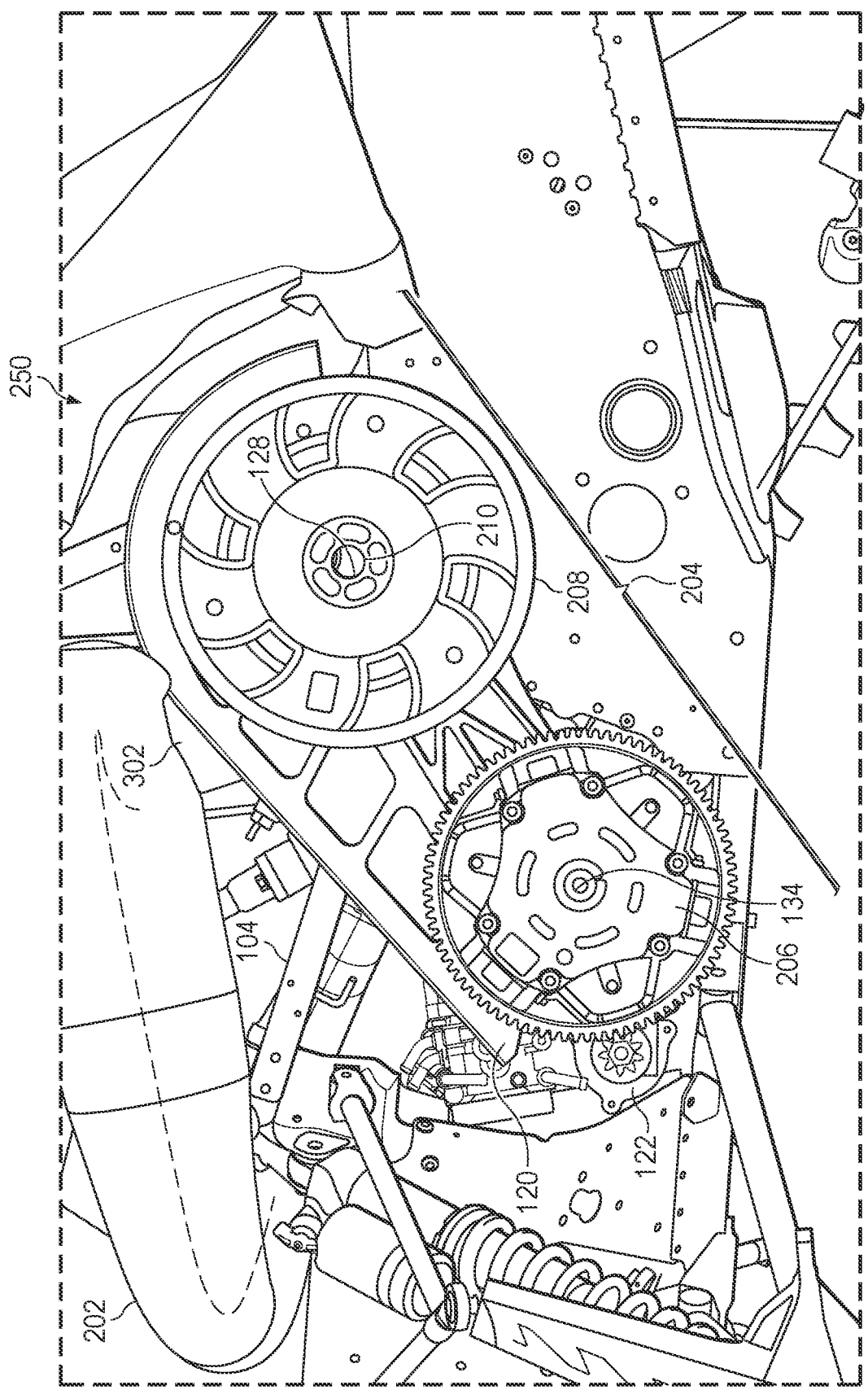
FIG. 2B illustrates a perspective view 250 of a snowmobile with exhaust system, according to some embodiments of this disclosure.
Figure 2C:
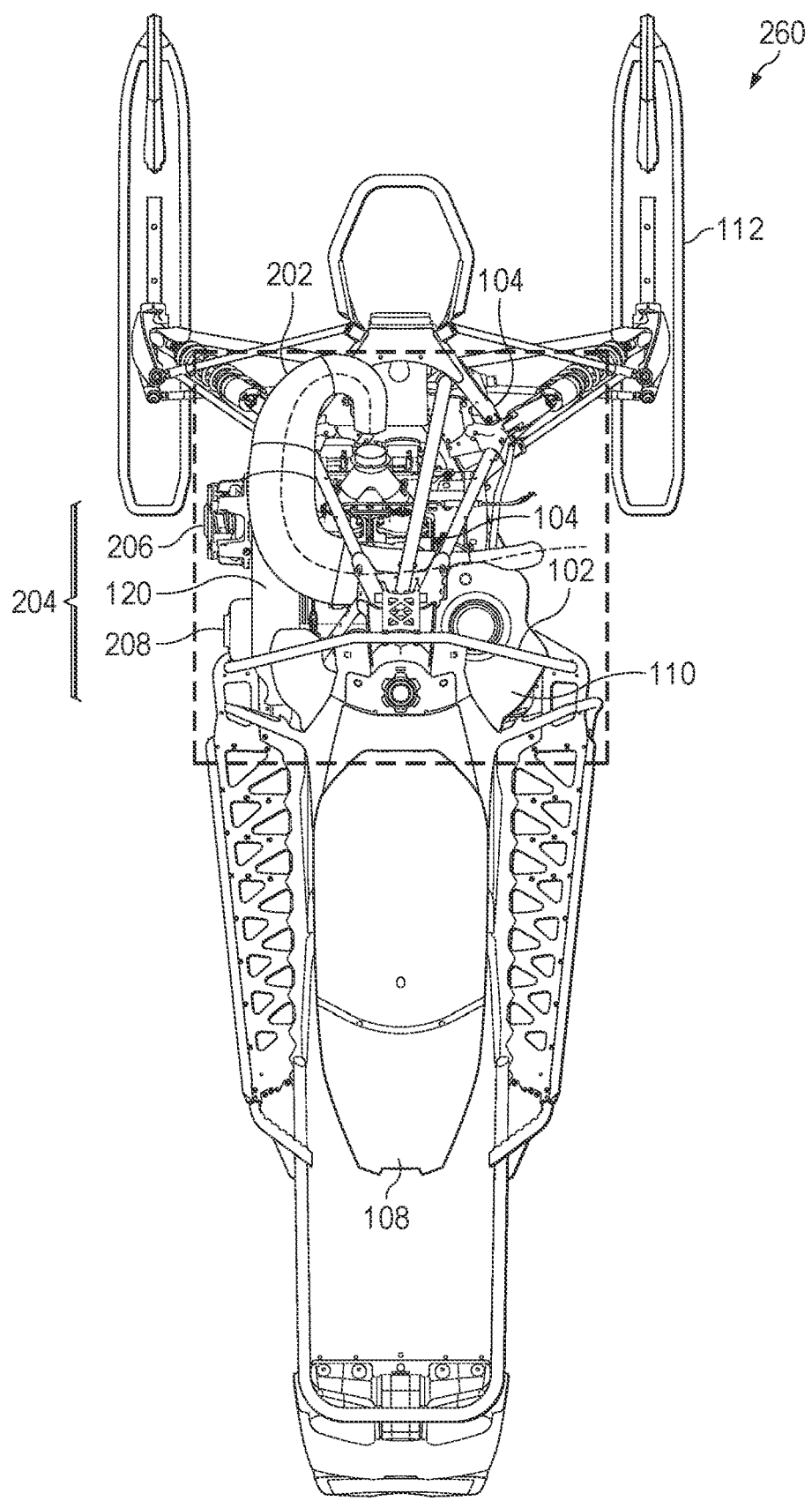
FIG. 2C illustrates a perspective view 260 of a snowmobile with exhaust system, according to some embodiments of this disclosure.
Figure 2D:
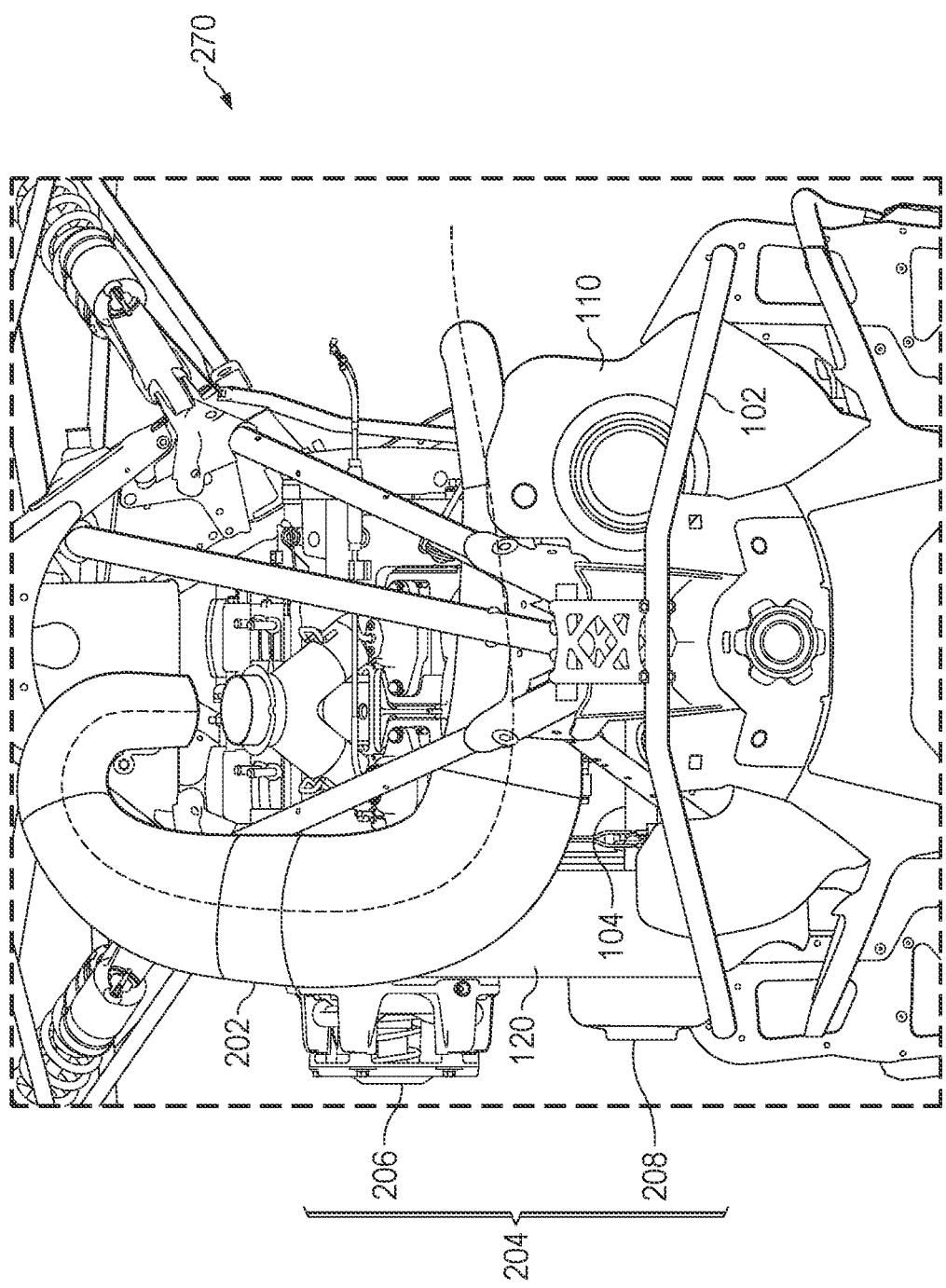
FIG. 2D illustrates a perspective view 270 of a snowmobile with exhaust system, according to some embodiments of this disclosure.
Figure 3A:
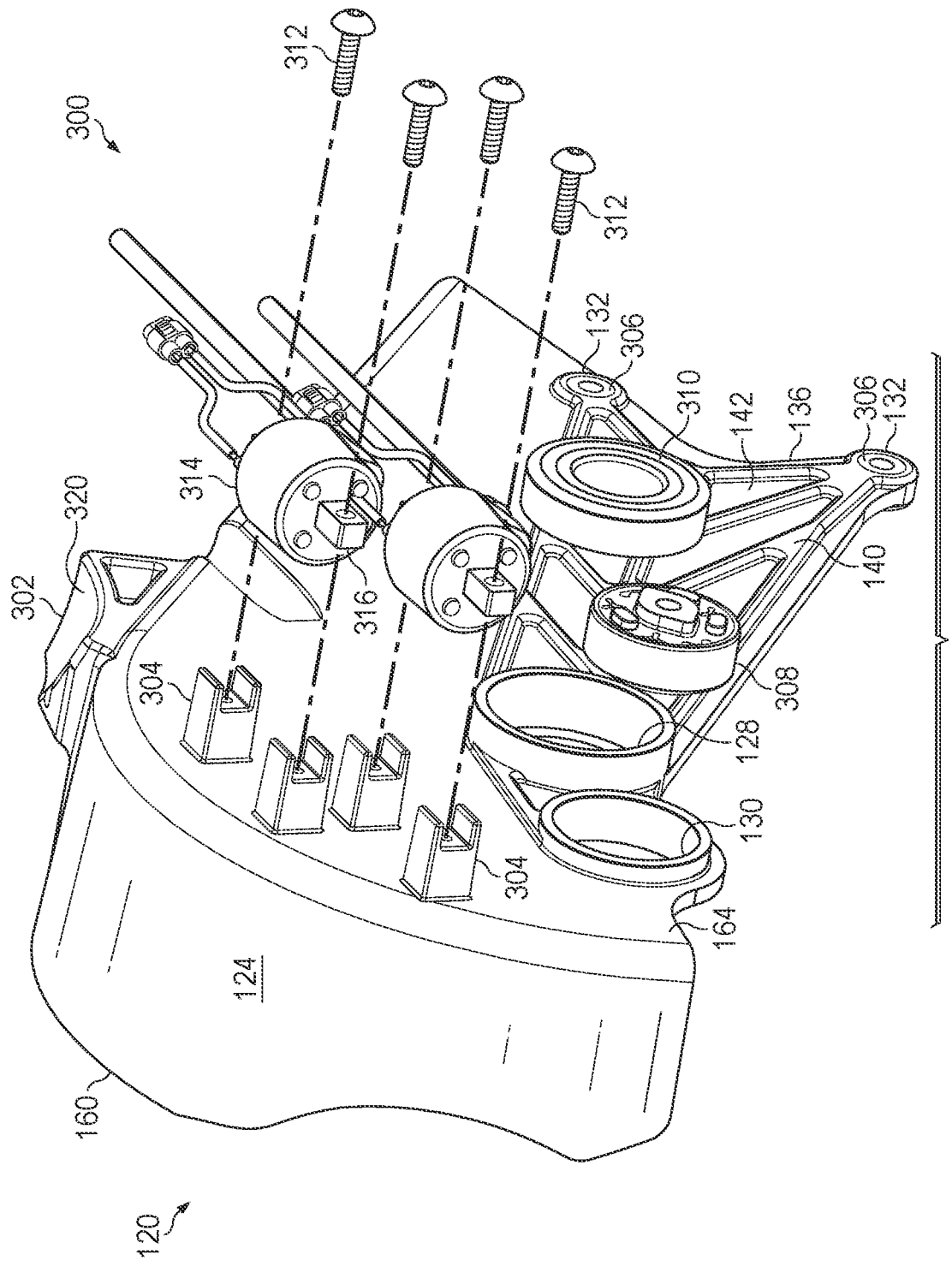
FIG. 3A illustrates an exploded and view 300 of a clutch guard with integrated torque control link, according to some embodiments of this disclosure.
Figure 3B:
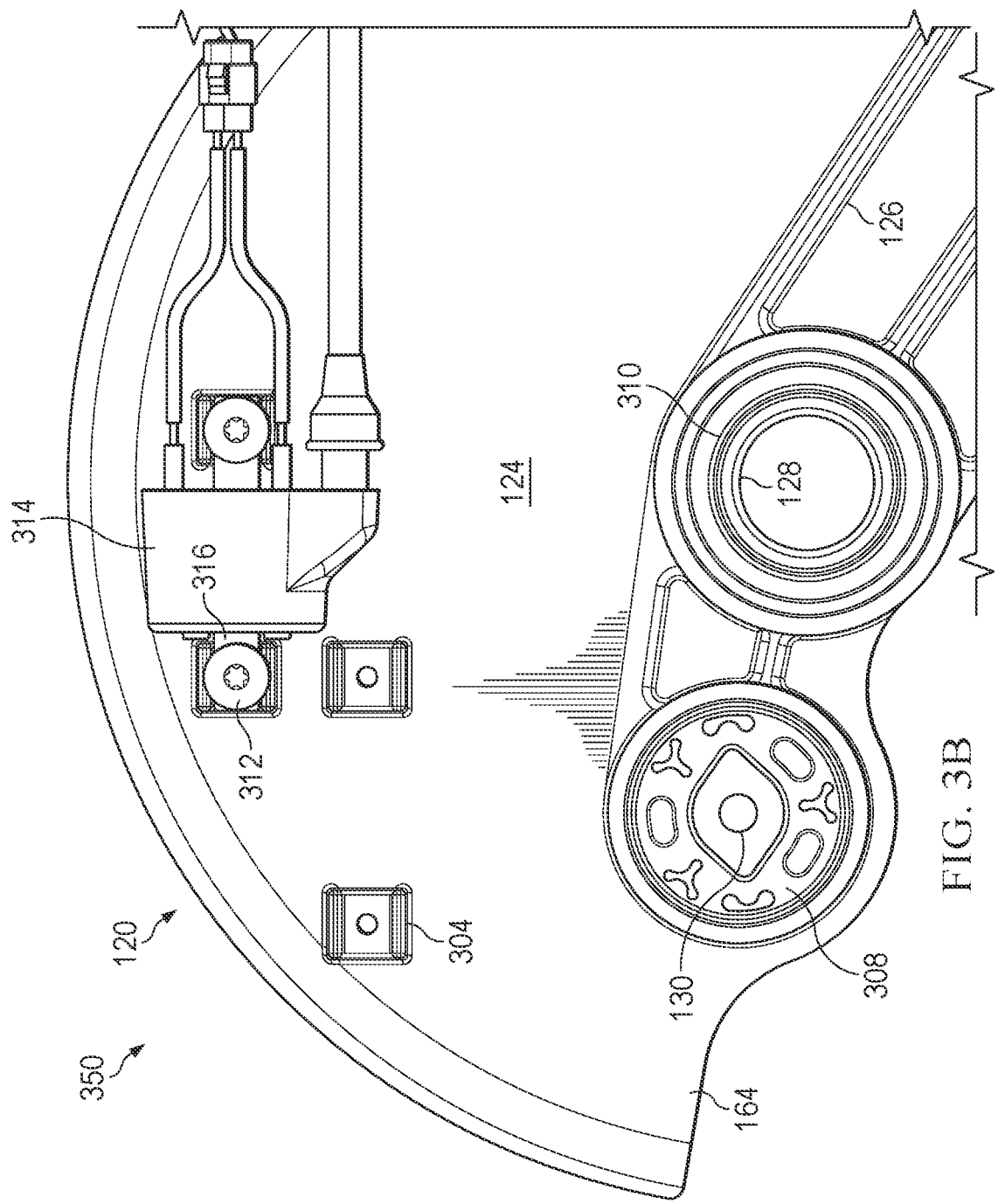
FIG. 3B illustrates a perspective view 350 of a clutch guard with integrated torque control link, according to some embodiments of this disclosure.

Referring to FIGS. 3A-B, exploded and perspective views 300, 350 of a clutch guard with integrated torque control link are shown, according to some embodiments of this disclosure. The clutch guard with integrated torque control link 120 can include an exhaust attachment feature 302 positioned on the shield body 124. The exhaust attachment feature 302 can be integrated into the shield body 124 during manufacture or can be subsequently attached. In a non-limiting example, the integrated torque control link 120 with the exhaust attachment feature 302 is a single injection-molded component. The feature 302 can include a standoff, bracket, hanger, brace, groove, channel, pedestal or any geometric feature that supports and effectively mates with an exhaust system 202 component, such as a pipe or tube. The exhaust system 202 can attach to or contact the feature 302 via one or more springs, for example. In an illustrative example as shown in FIG. 2B, the shield body 124 extends outward from the link section 126 and is spaced apart from the engine 122 and the chassis 104 without being directly secured to either. The feature 302 extends outward from the lip 160 and the inboard side 164 of the shield body 124 and defines a recess 320 that conforms to the shape of the outer surface of the exhaust system 202 for receiving and supporting the exhaust system 202. The absence of rigid fixtures on the shield body 124 or the feature 302 provides a flexible support for the exhaust system 202 allowing the exhaust system 202 to move with the engine 122. By coupling or securing the exhaust 202 to the integrated TCL 120, allows the parts to move together with the vibrations caused by the engine or movement imparted by use. This reduces the wear between rigid and fixed components and also allows for a more comfortable user experience in reducing these vibrations.

The shield body 124 can further include one more accessory attachment features 304. The features 304 can be integrated into the body 124 or subsequently attached. Such accessory attachment features 304 can include tapered bores, tabs, brackets, recesses, grooves, apertures, or any geometric shape adapted to attach an accessory to the body 124. Examples of accessories include electrical or fluid components. In FIG. 3A, an example accessory includes ignition coils 314 secured with fasteners 312 through an accessory recess 316 to the accessory attachment features 304 defined on the inboard side 164. The fasteners 312 can be self-tapping screws, for example. In a non-limiting example, the integrated torque control link 120 with the accessory attachment features 304 is a single injection-molded component. In some embodiments, the accessory attachment features 304 may define a first arm extending outward from an inboard end of a lip 160 and a second arm extending outward from an outboard end of the lip 160 to define an accessory retention feature therebetween.

The link section 126 of the clutch guard 120 includes a jackshaft aperture 128. The aperture 128 can support a bearing 310 in which a jackshaft 210 passes through and is supported. The torque control link section 126 holds the position between the jackshaft 210 and output shaft 134. The output shaft positioning feature 136 is adjacent the output shaft 134 and can be U-shaped, V-shaped, an aperture, or any geometric shape to securely hold the output shaft 134 in position (in relation to the jackshaft 210). The feature 136 may abut or include features that abut or are adjacent to shaft 134, such as a bearing, for example.

The link section 126 of the clutch guard with integrated torque control link 120 is mounted both on the chassis 104 at chassis mounting feature 130 and engine 122 at the engine mounting features 132. The chassis mounting feature 130 supports a damping component 308, such as a rubber or polymeric insert for example. The rubber can be 60 durometer, shore A for example. By way of example, the polymeric insert can have a shore A hardness between 40 and 80. The damping component 308 reduces vibration and provides a mechanism to absorb movement and prevent stress on both the chassis 104 and clutch guard 120. The link section 126 of the clutch guard 120 is mounted to the engine 122 at the plurality of engine mounting features 132. In this example, three engine mounting features 132 are utilized and are attached at the head pipe of the engine 122. The engine mounting features 132 can be apertures to support fasteners, for example. Additionally, the features 132 can support compression limiters 306.

The clutch guard with integrated torque control link 120 can be manufactured as single piece or one-piece construction. The clutch guard with integrated torque control link 120 can be manufactured of a single material, such as a polymer, a composite, or of metal. In an illustrative example, the clutch guard with integrated torque control link 120 comprises a polymer matrix composite. In some embodiments, a polymer composite includes polymeric material including, but not limited to, Nylon 6/6, Polyetheretherketone (PEEK), Polypropylene (PP), or Polyphthalamide (PPA) as a matrix material with glass, carbon, or ratio of both carbon and fiber material for fiber fill varying in percent volume from 10%-50%, optionally from 40%-60%, and in some embodiments, from 45%-55%. For example, the clutch guard 120 can be manufactured of a molded composite material, such as a glass filled long-fiber material. Portions of the clutch guard 120 can have differing thickness to optimize stiffness and weight. For example, the link section 126 may include more thickness and structural support ribbing as opposed to the shield portion 124 in order meet stiffness requirements due to engine thrust. In a non-limiting example, the clutch guard with integrated torque control link 120 is injection molded. In another illustrative example, the clutch guard with integrated torque control link 120 is formed by additive manufacturing. The shield portion 124 and the link section 126 may be comprised of the same, or different materials. In a non-limiting example, the link section 126 comprises a higher fiber loading amount or weight percent than the shield portion 124 to tailor the properties of each section.

Figure 4:
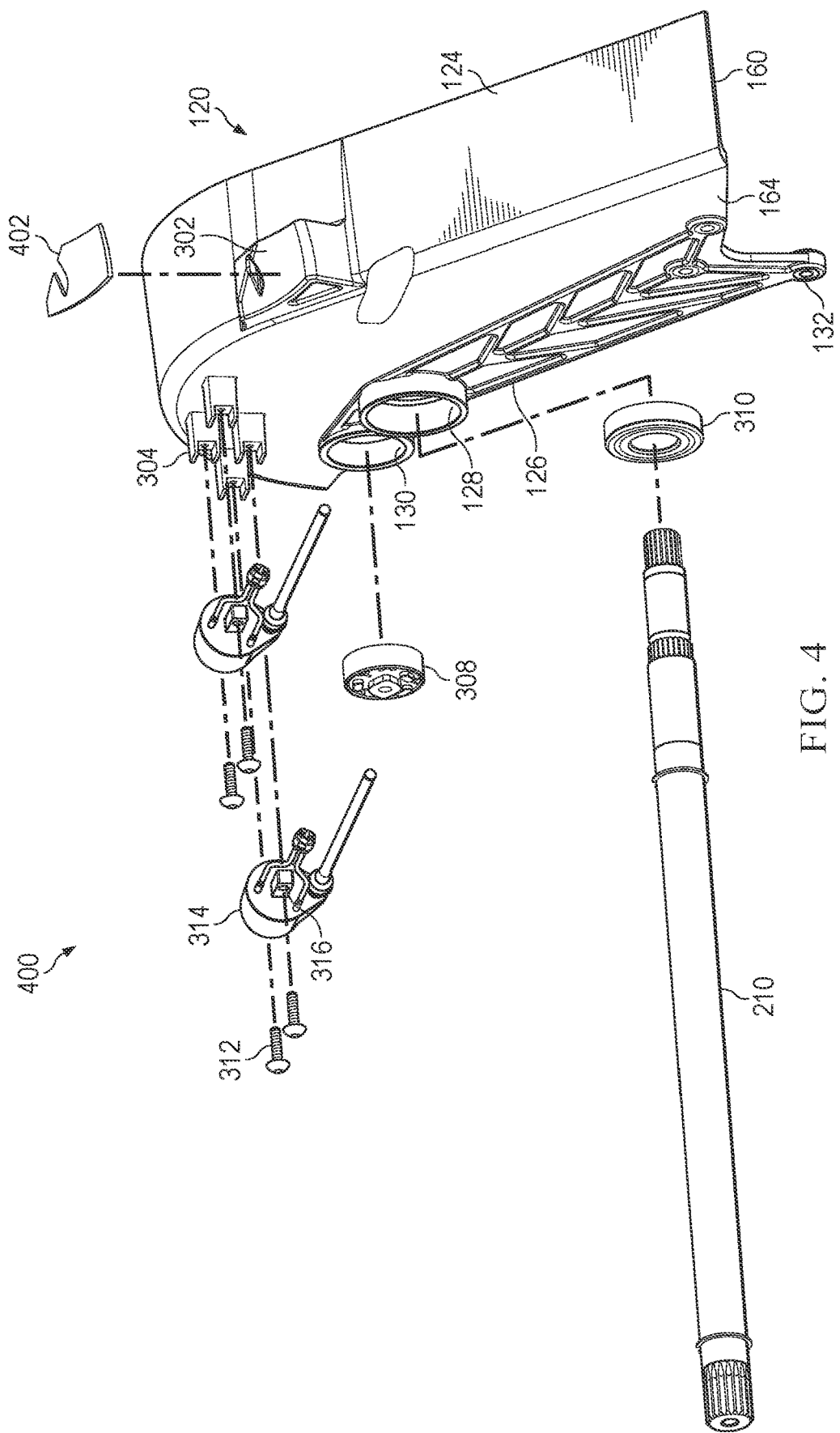
FIG. 4 illustrates a perspective view 400 of a clutch guard with integrated torque control link and jackshaft, according to some embodiments of this disclosure.

Referring to FIG. 4, a perspective view 400 of a clutch guard with integrated torque control link 120 and jackshaft 210 is shown, according to some embodiments of this disclosure. In this view, the exhaust attachment feature 302 further includes a heat shielding component 402. The component 402 can be silicone pad for preventing some portion of heat from the exhaust system 202 from transferring fully to the shield body 124. The heat shielding component 402 can be integrated into the body, such as heat sink, or subsequently attached, such as the silicone pad shown. The component 402 can be positioned across 25% of the contact surface area between exhaust 202 and component 302, about 50% across, about 75% across, or about 100% across the contact area, for example. In some embodiments, the heat shielding component 402 (e.g., pad such as a silicone pad) is between 0.25" in thickness to 2" in thickness. In some embodiments, the heat shielding component 402 is uniform in thickness, while in other embodiments the thickness varies. In some embodiments, the heat shielding component 402 is formed from a high temperature silicone with an adhesive backing to adhere to the clutch guard.

Figure 5:
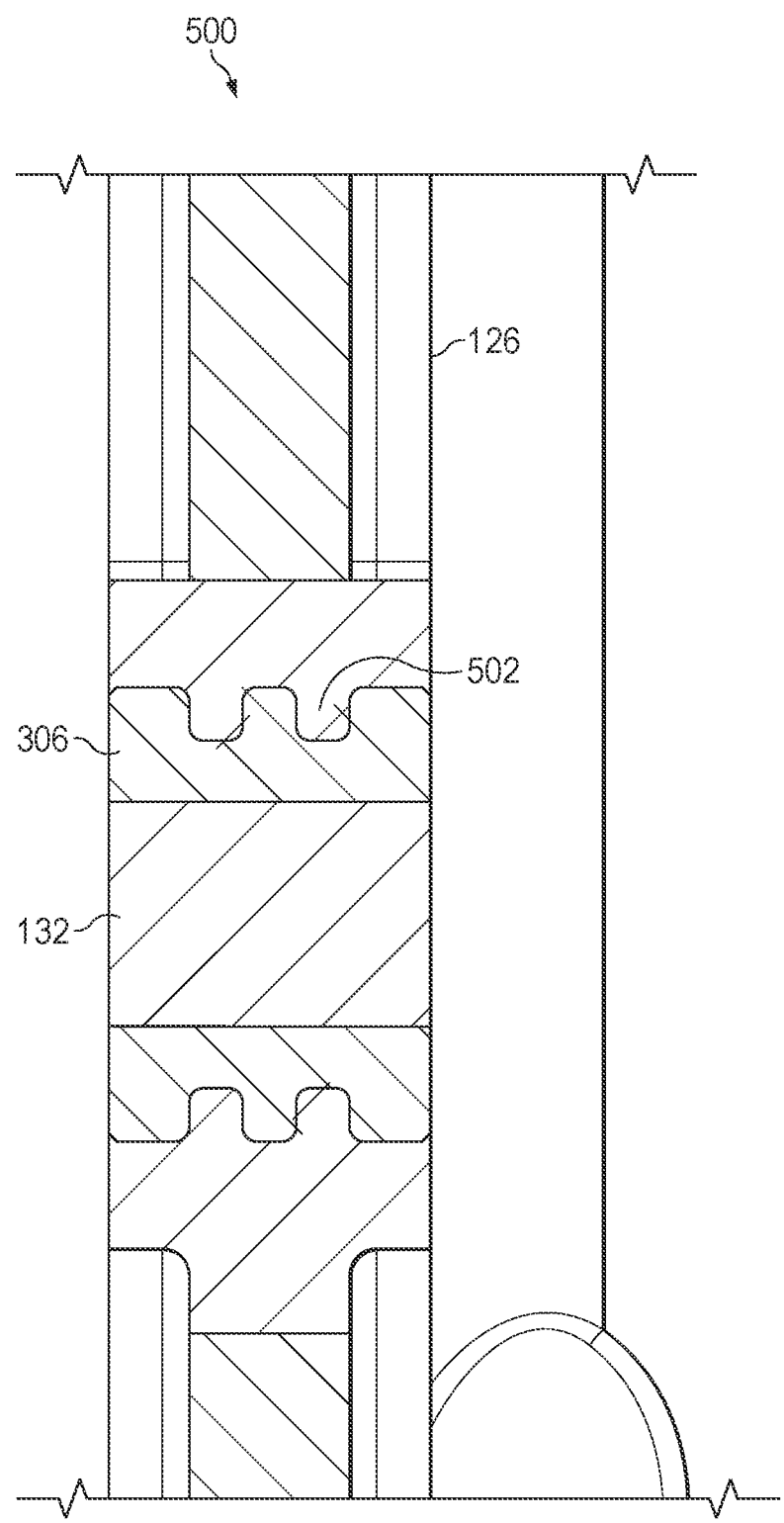
FIG. 5 illustrates a cross-sectional view 500 of an engine mounting with compression limiter, according to some embodiments of this disclosure.

FIG. 5 illustrates a cross-sectional view 500 of an engine mounting with compression limiter 306, according to some embodiments of this disclosure. Compression limiters 306 can include bushings to limit stress between the fasteners and torque control link section 126. The compression limiter 306 can be overmolded into the torque control link section 126. The limiter 306 can be a brass bushing for example. The limiters 306 can include grooves 502 such that the overmolding process creates a tighter fit via mechanical interlock and the limiter 306 supports higher torque for a longer period of time.

Figure 6A:
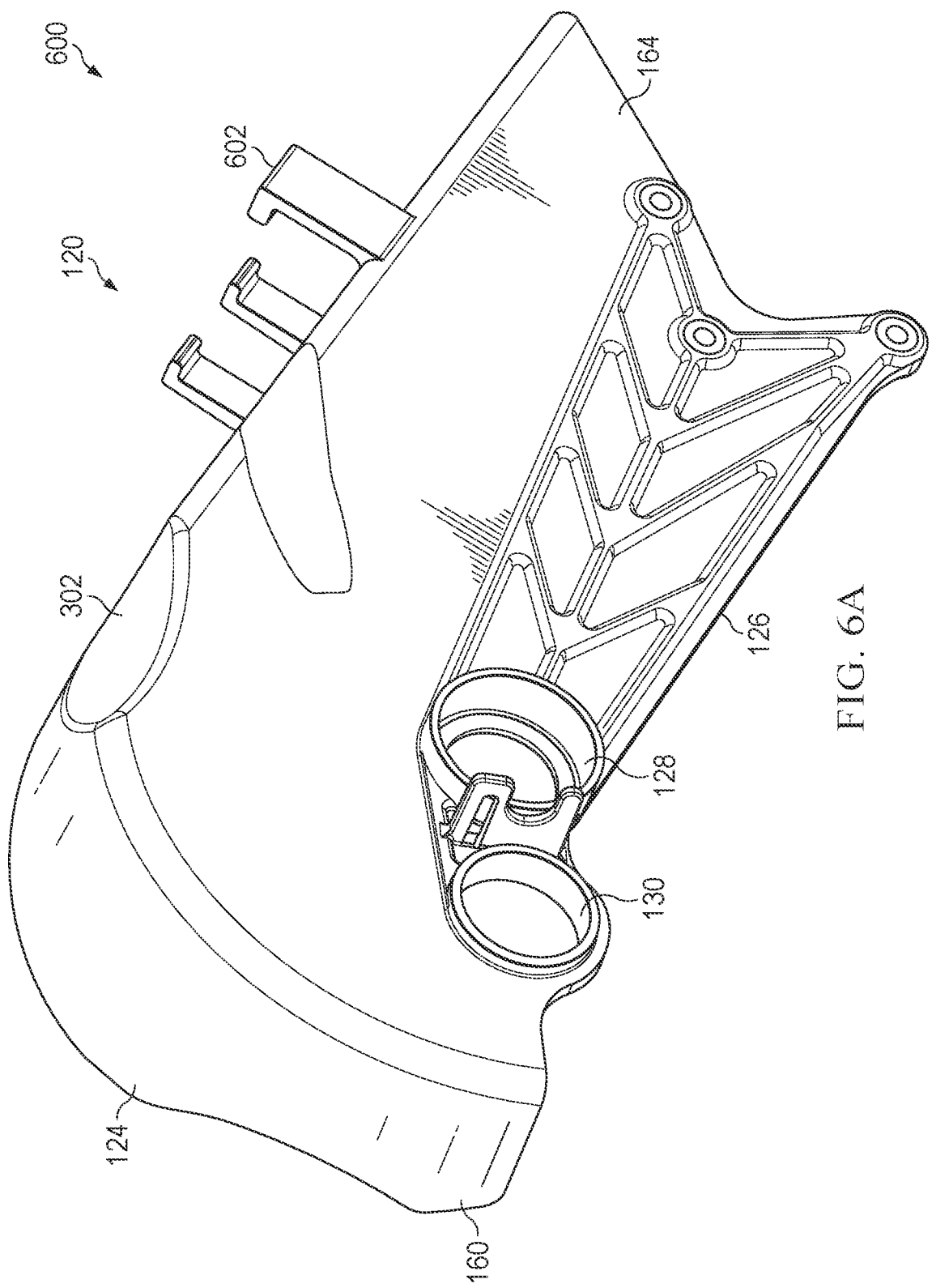
FIG. 6A illustrates a perspective view 600 of a clutch guard with integrated torque control link showing optional support components, according to some embodiments.
Figure 6B:
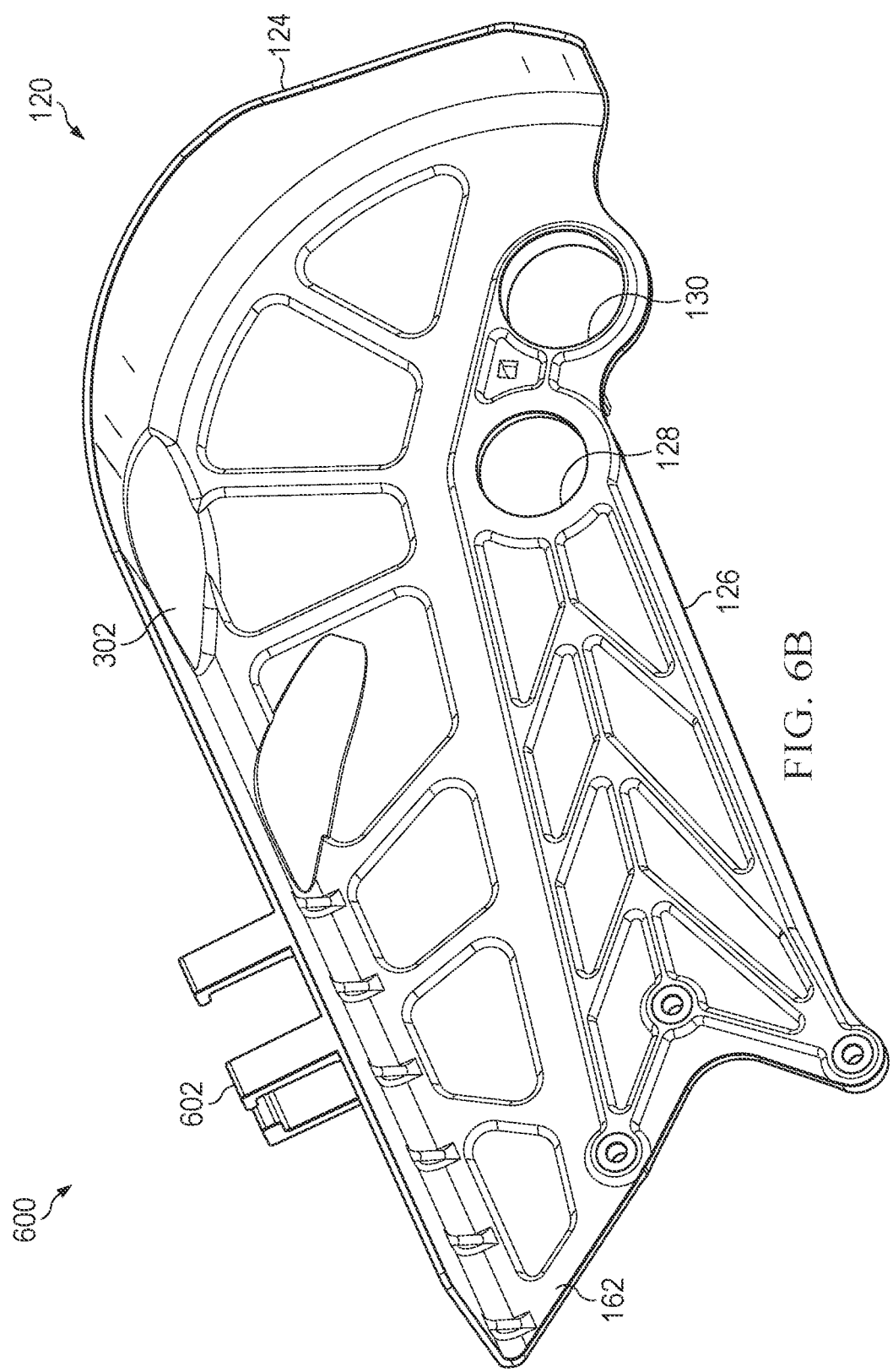
FIG. 6B illustrates a perspective view 600 of a clutch guard with integrated torque control link showing optional support components, according to some embodiments.
Figure 6E:
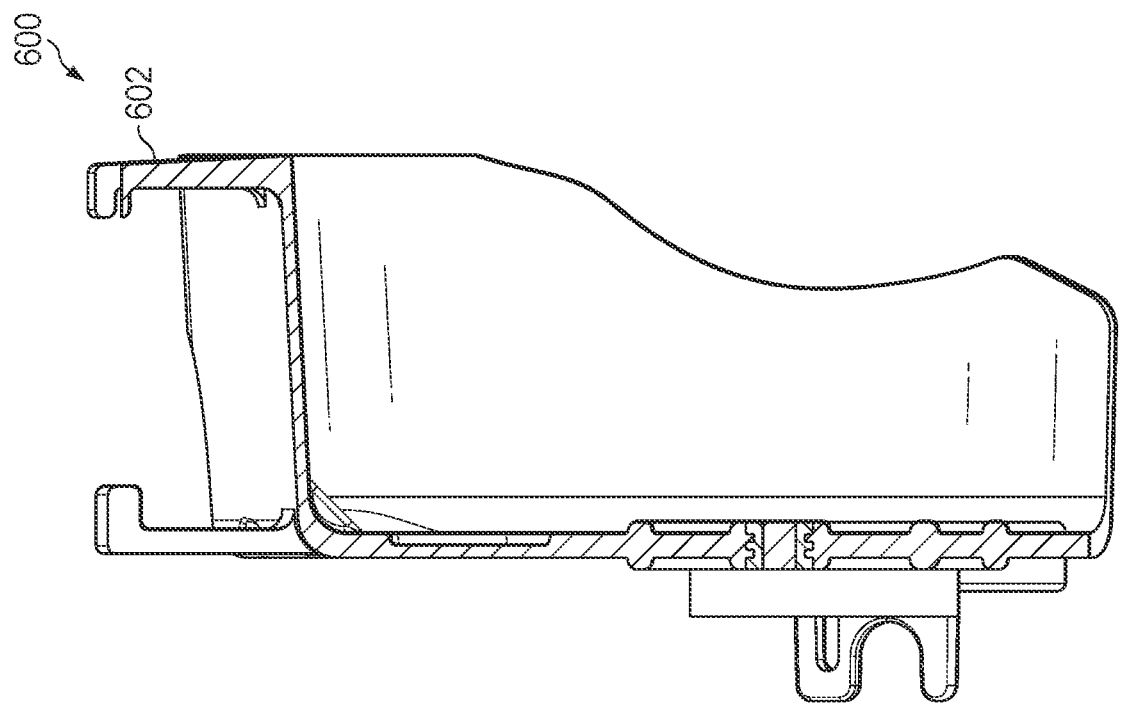
FIG. 6E illustrates a perspective view 600 of a clutch guard with integrated torque control link showing optional support components, according to some embodiments.
Figure 6D:
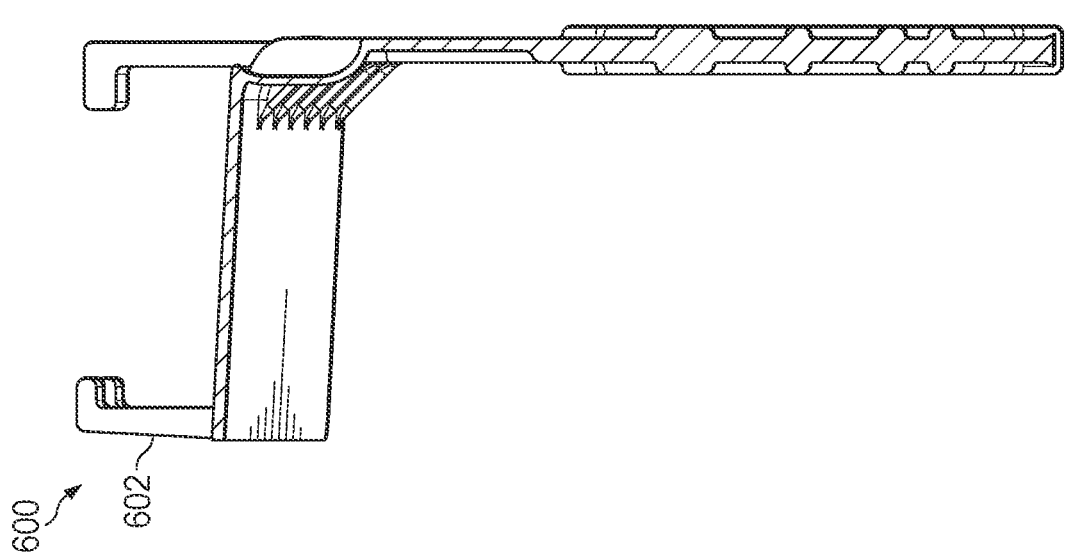
FIG. 6D illustrates a perspective view 600 of a clutch guard with integrated torque control link showing optional support components, according to some embodiments.

Referring to FIGS. 6A-6E, a perspective and cross-sectional views 600 of a clutch guard with integrated torque control link 120 are shown, according to some embodiments. Optional support components 602 provide securement and storage for a spare drive belt. In a non-limiting example, the integrated torque control link 120 with the support components 602 is a single injection-molded component. As shown in FIG. 6A, the support components may included one or more arms positioned along the inboard and outboard ends of an upper or exterior side of the lip 160. The arms may include projections at the end extending therefrom the retain any components, such as a spare drive belt, therebetween along the exterior surface of the lip 160. Although shown as having two arms positioned along the outboard end of the lip 160 and one arm positioned along the inboard end of the lip 160 (between the outboard arms along the length of the lip 160), the present disclosure is not limited to such configurations and number of arms. In another embodiment, support components 602 may provide for securement and storage of a belt changing tool 704 (see FIGS. 7A-H). In an illustrative example, the component 602 may include a first portion extending from the exterior or upper surface of the lip 160 that defines an aperture for receiving an end of the tool 704 therein. The tool 704 may then be rotated to a second portion of the component 602 that comprises three or more projections extending from the upper or exterior surface of the lip 160 that are offset from each other and can apply a biasing force to the tool 704 when it is rotated and inserted therebetween to retain the tool 704 on the lip.

Figure 7A:
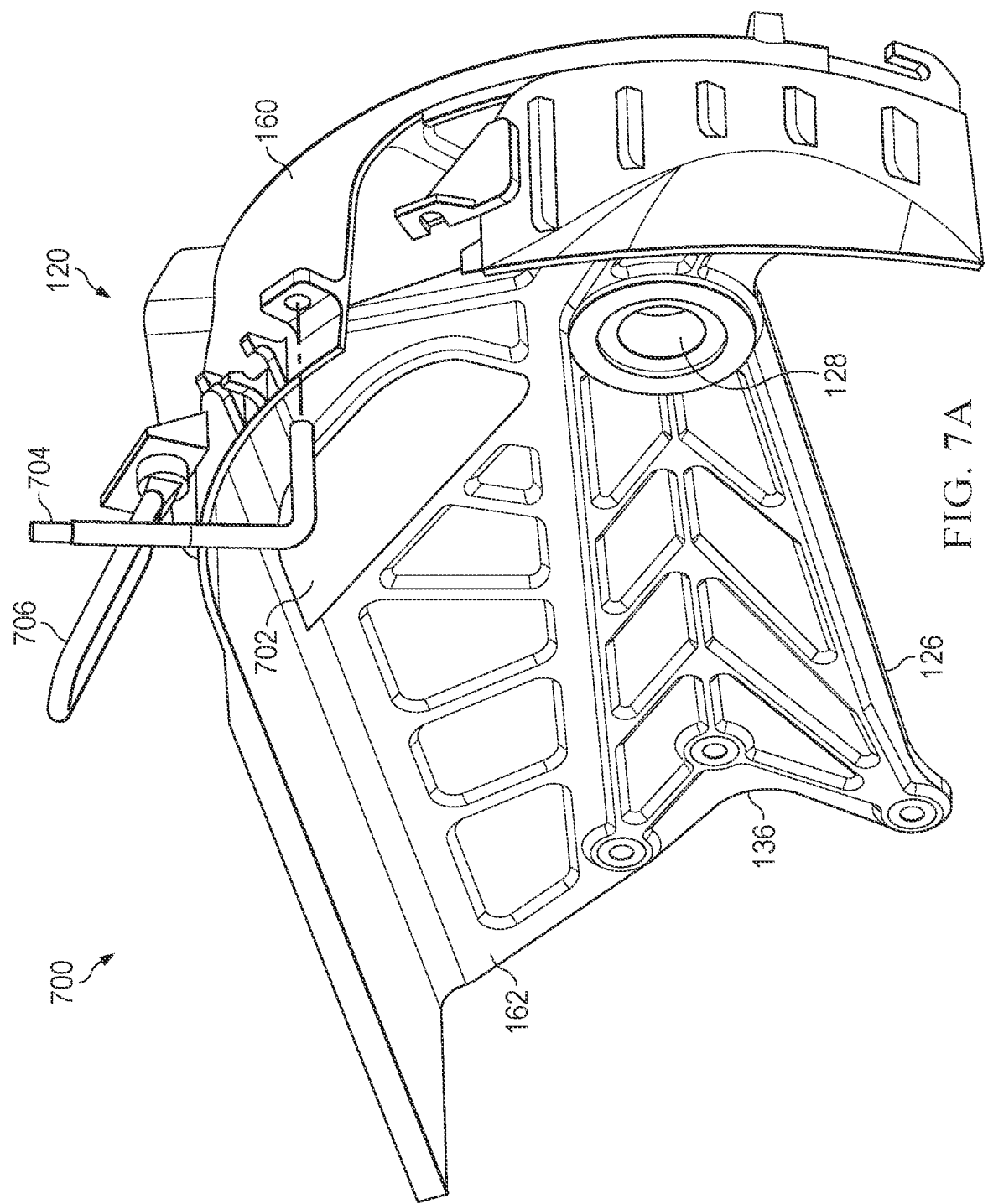
FIG. 7A illustrates a perspective view 700 of a clutch guard with integrated torque control link showing a clutch access section, according to some embodiments.
Figure 7B:
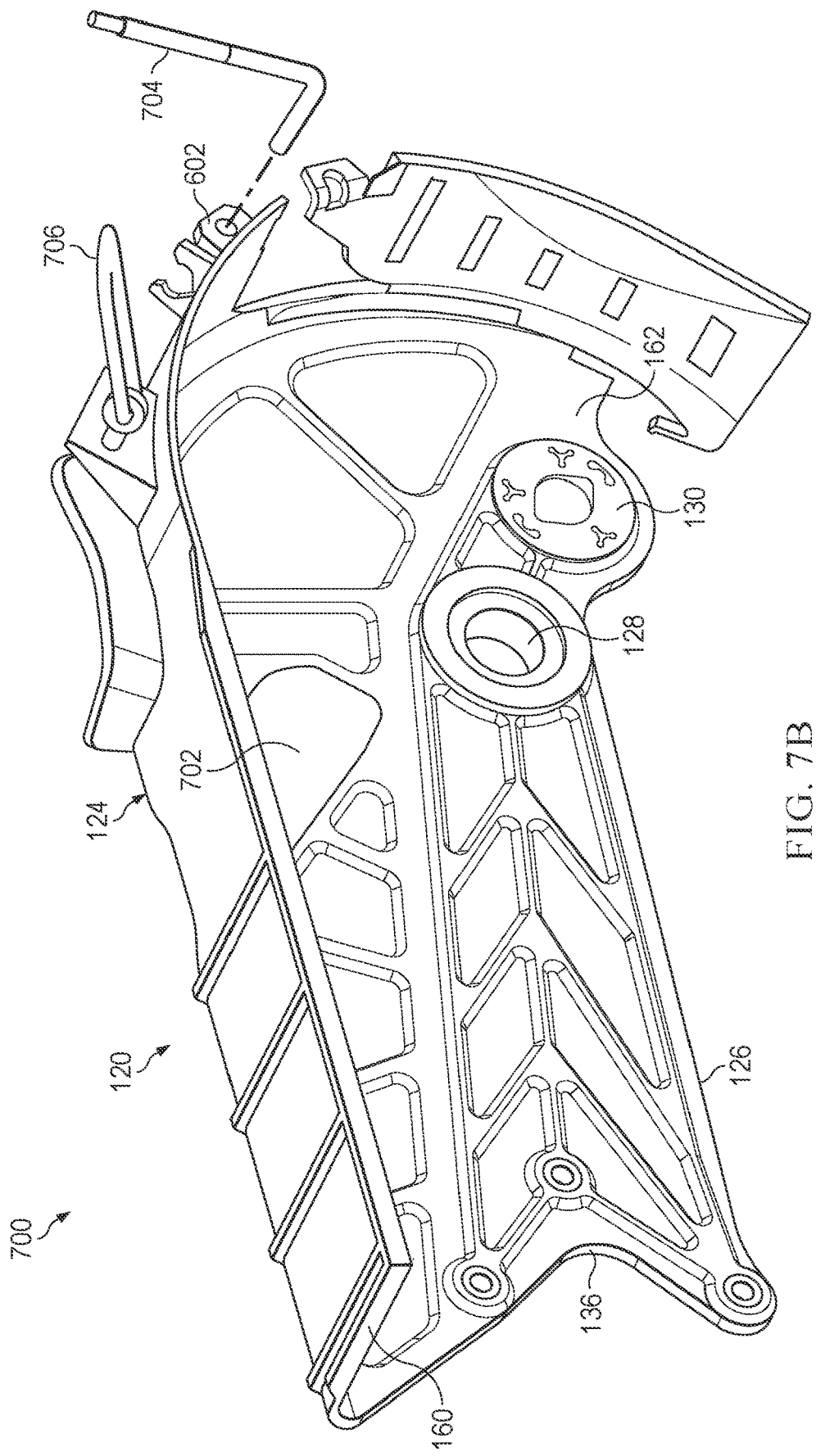
FIG. 7B illustrates a perspective view 700 of a clutch guard with integrated torque control link showing a clutch access section, according to some embodiments.
Figure 7C:
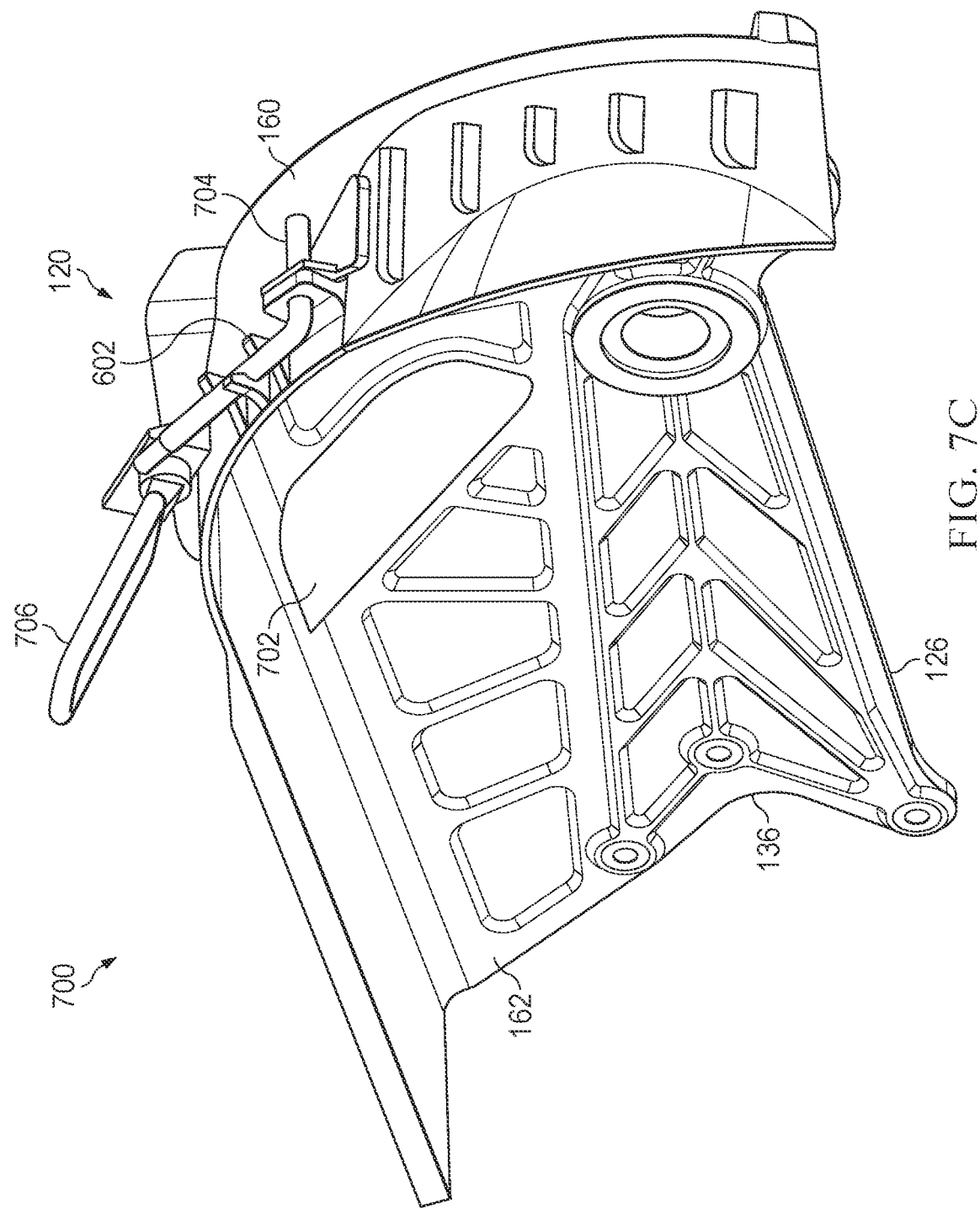
FIG. 7C illustrates a perspective view 700 of a clutch guard with integrated torque control link showing a clutch access section, according to some embodiments.
Figure 7D:
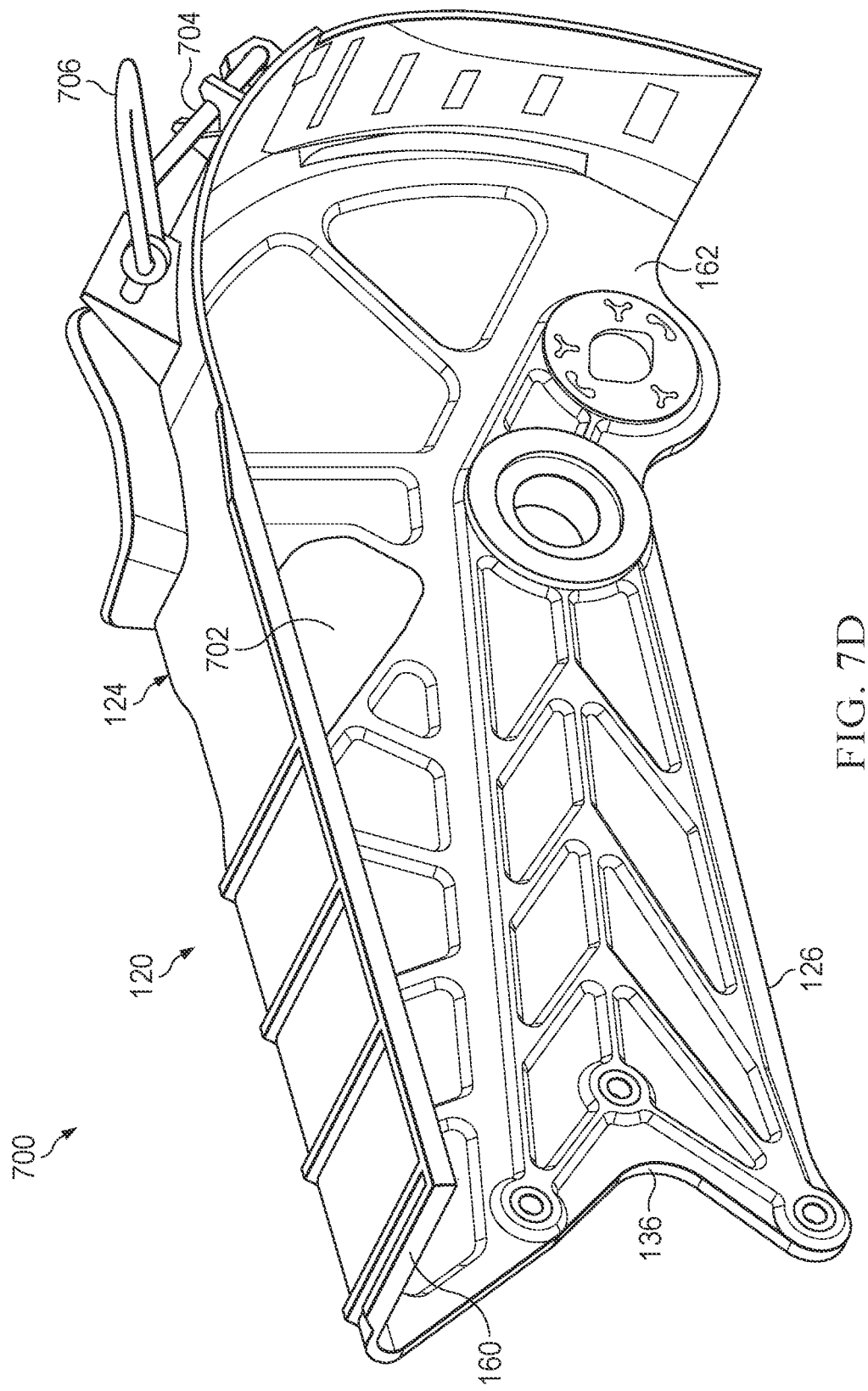
FIG. 7D illustrates a perspective view 700 of a clutch guard with integrated torque control link showing a clutch access section, according to some embodiments.
Figure 7E:
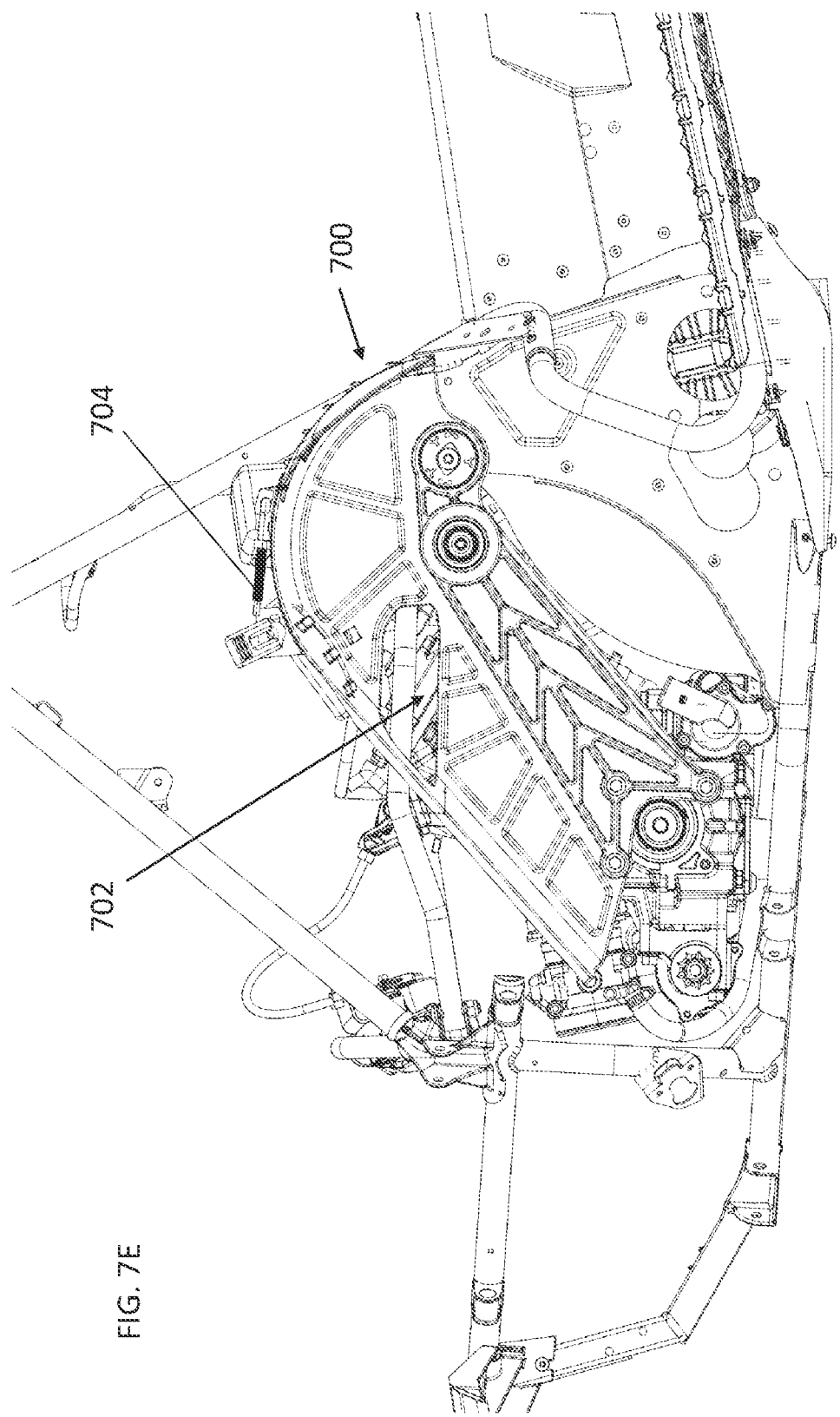
FIG. 7E illustrates a perspective view 700 of a clutch guard with integrated torque control link showing a clutch access section, according to some embodiments.
Figure 7F:
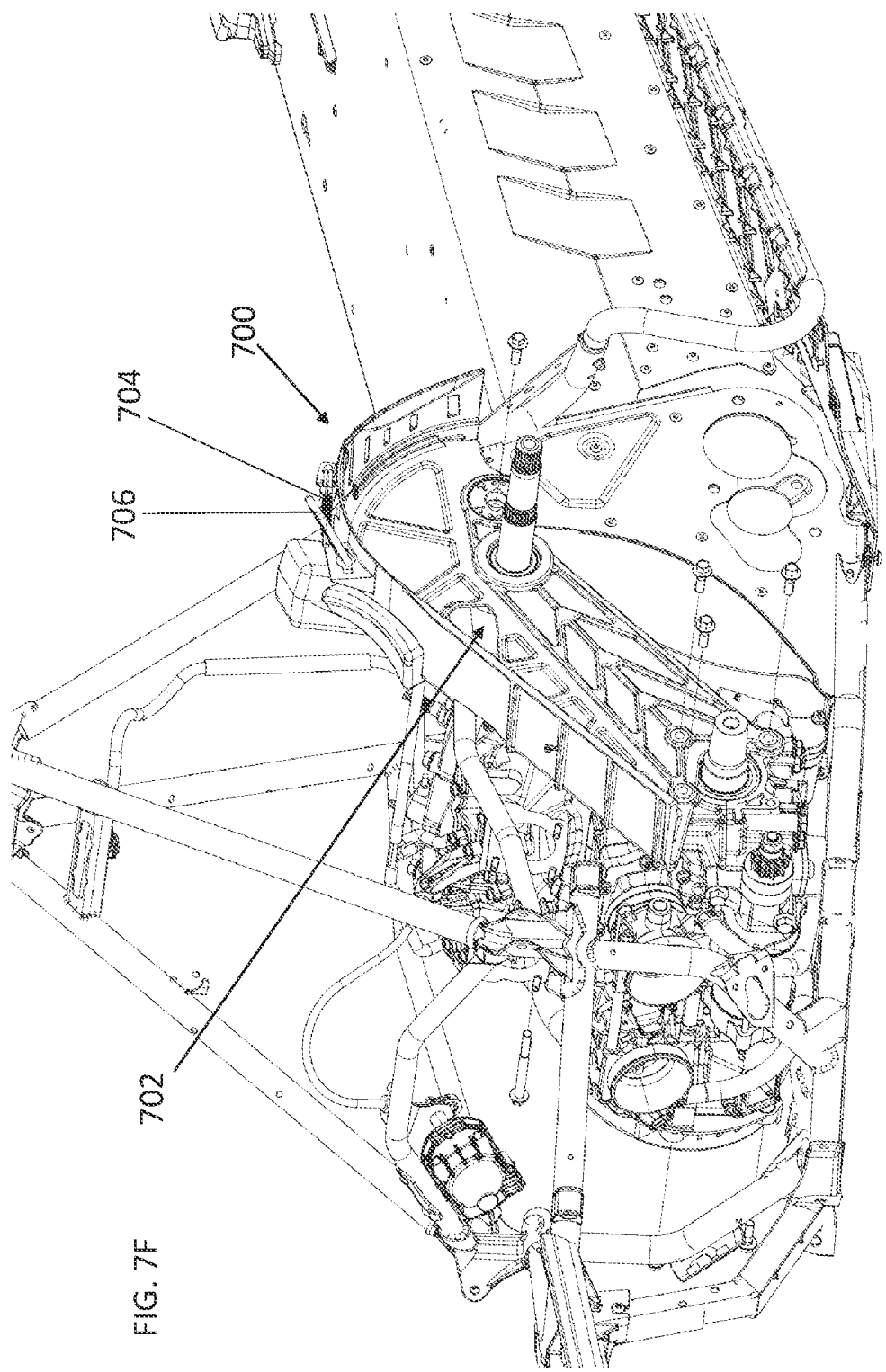
FIG. 7F illustrates a perspective view 700 of a clutch guard with integrated torque control link showing a clutch access section, according to some embodiments.
Figure 7G:
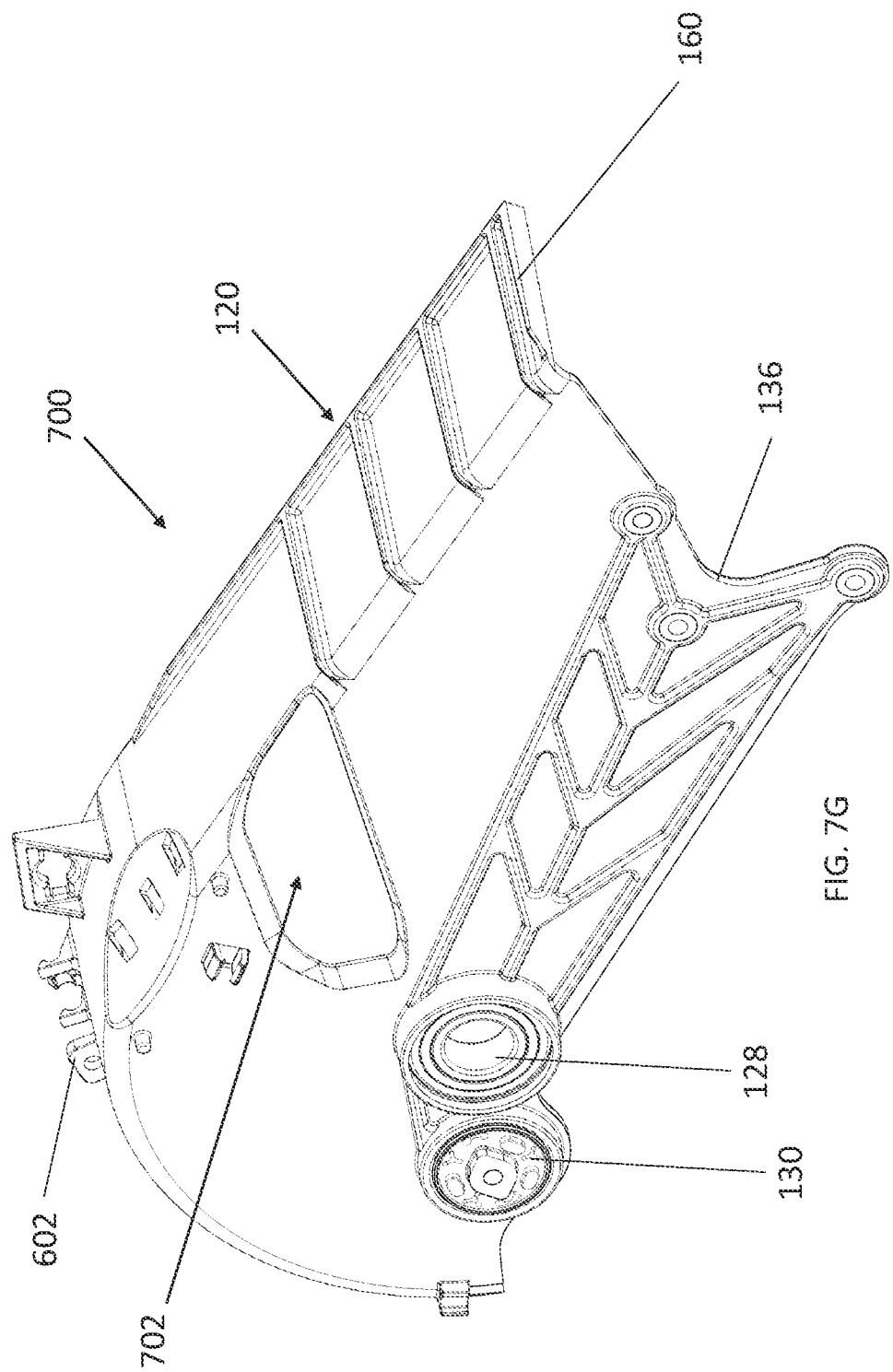
FIG. 7G illustrates a perspective view 700 of a clutch guard with integrated torque control link showing a clutch access section, according to some embodiments.
Figure 7H:
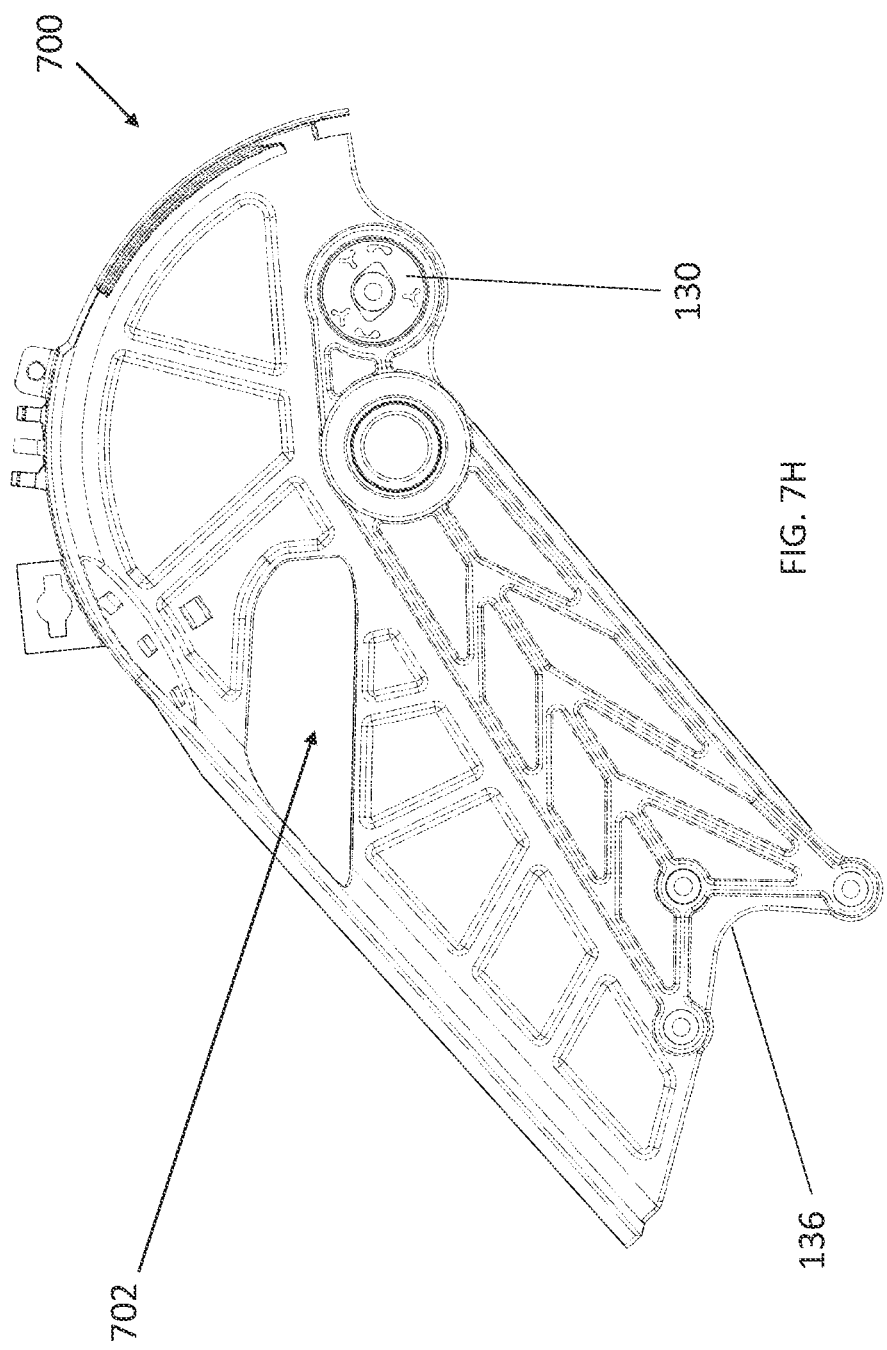
FIG. 7H illustrates a perspective view 700 of a clutch guard with integrated torque control link showing a clutch access section, according to some embodiments

Referring to FIGS. 7A-7H, perspective views 700 of a clutch guard with integrated torque control link showing a clutch access section are shown. The shield portion 124 may include removal sections, such as removed section 702 for ease of access to vehicle components, such as the clutch components. Strap 706 can be used to secure the exhaust components 202 to the shield 124. The strap 706 can be manufactured of silicone, for example, or any material that has the flexibility to stretch over an exhaust pipe and still withstand the heat and friction of being in contact with the pipe. In some embodiments, a spring retention feature (not shown) may be used to secure the exhaust components 202 to the shield 214. As illustrated in FIG. 7E, the frame 104 may include a frame mount feature 750 configured to secure a liner assembly (e.g., a liner assembly 760 as illustrated in FIGS. 23A-23D).

Figure 8:
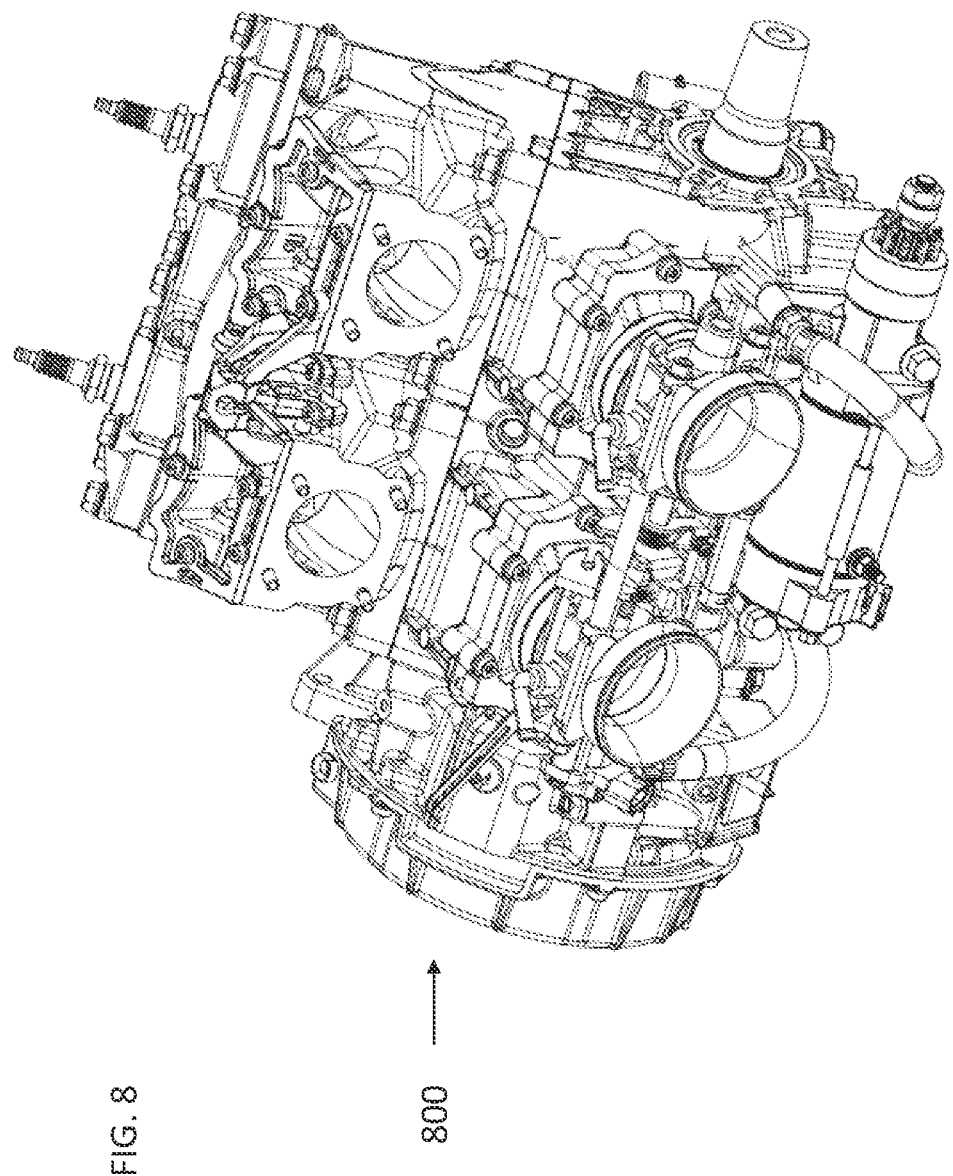
FIG. 8 illustrates a perspective view of engine 800, according to some embodiments.
Figure 9C:
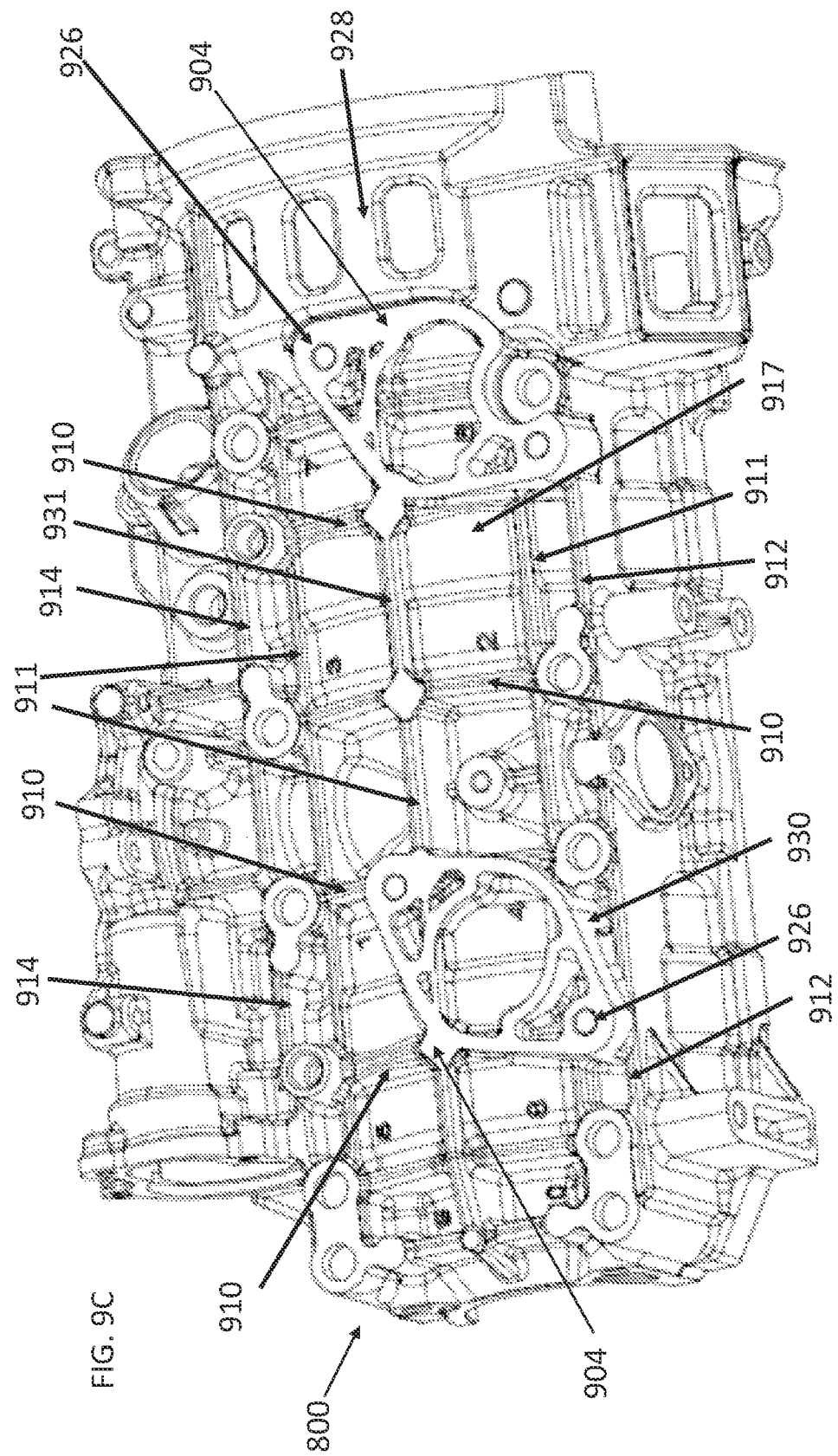
FIG. 9C illustrates a perspective view of a lower half of a crankcase for the engine 800 with cast mounting surfaces, according to some embodiments.
Figure 9D:
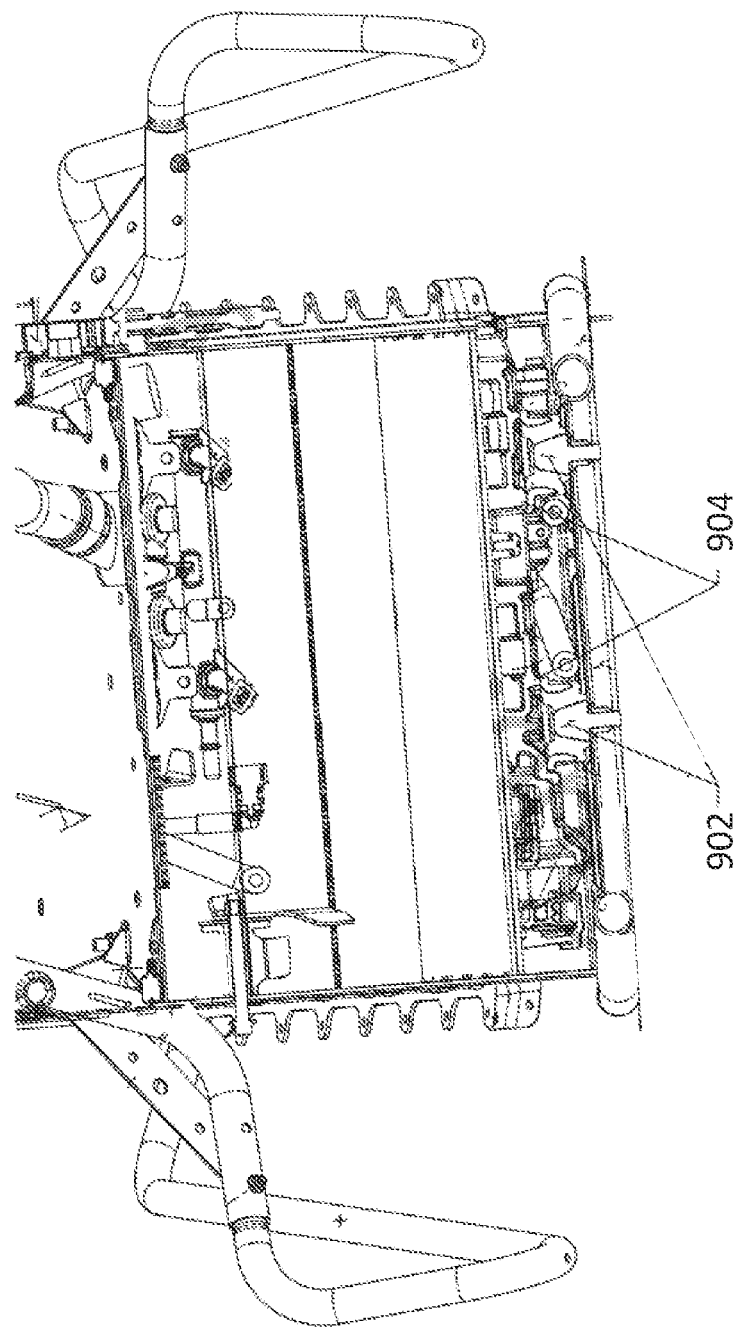
FIG. 9D illustrates a perspective view of engine 800 with engine mount assemblies secured to the cast mounting surfaces, according to some embodiments.
Figure 9E:
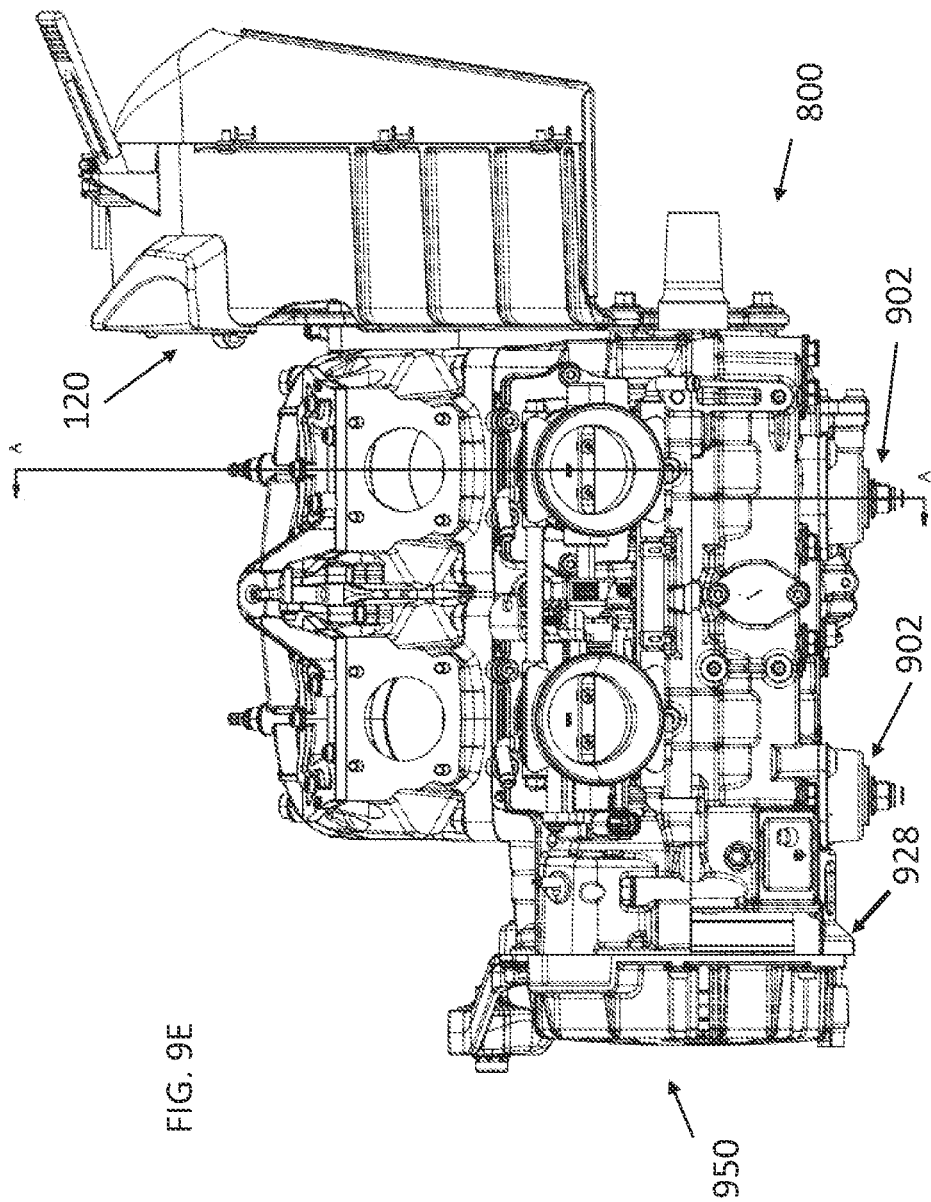
FIG. 9E illustrates a perspective view of engine 800 with engine mount assemblies secured to the cast mounting surfaces, according to some embodiments.
Figure 9F:
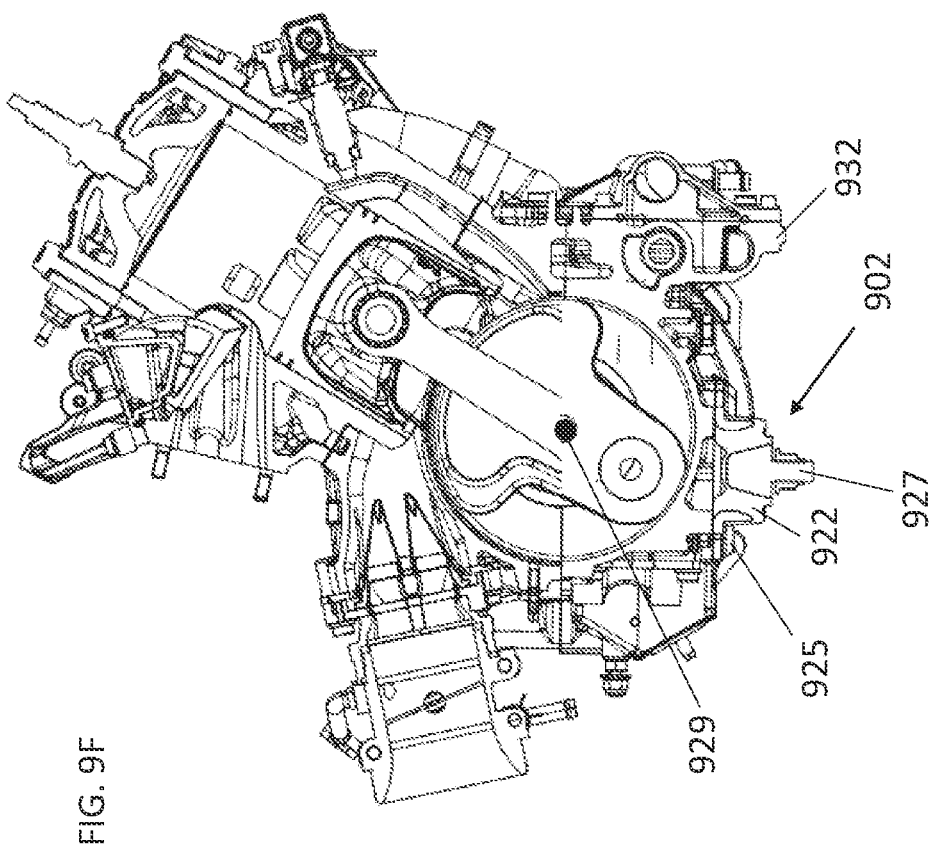
FIG. 9F illustrates a perspective view of engine 800 with engine mount assemblies secured to the cast mounting surfaces, according to some embodiments.

FIG. 8 illustrates a perspective view of engine 800, that may be a 2-stroke engine according to some embodiments. FIGS. 9A-F illustrate perspective views of engine 800 with engine mount assemblies 902 and cast engine mounting surfaces 904 that are integral with the lower exterior surface of the lower crankcase of the engine 800 to lower the center of gravity of the vehicle, according to some embodiments. It is to be appreciated that even though the mounting surface 904 may be machined or treated to provide a smooth surface for securing an engine mount assembly 902 thereto, the mounting surface 902 is still considered to be "cast" as defined by this disclosure. The engine 800 may comprise an upper crankcase and a lower crankcase, and the engine mounting surfaces 904 are included on the lower crankcase. As best shown in FIG. 9C, the underside of the engine crankcase is provided with one or more cast bulkheads 910 that extend across the width of the crankcase, optionally one or more bulkheads 911 that extend across the length of the crankcase, and one or more cast structural walls 912, 914. A first structural wall 912 is provided that extends substantially perpendicular to the longitudinal centerline of the snowmobile. A second structural wall 914 may extend substantially perpendicular to the longitudinal centerline of the snowmobile. A panel 917 extends between the first and the second structural walls 912, 914 and defines a curved surface. In a non-limiting example, the panel 917 may be a non-structural wall or skin. The mounting surfaces 904 extend from the first structural wall 912 and across at least a portion of the panel 917. The engine mount assembly 902 comprises a housing 920 and a damper 922. The housing 920 is secured to the mounting surface 904 with one or more fasteners 925 that extend into one or more apertures 926 in the mounting surface 904 to position the damper 922 opposite one or more of the panel 917, the bulkhead 910, and the magneto housing 928. A threaded portion 927 of the damper 922 may extend through a portion of the chassis and be secured thereto with a removable fastener, such as a nut 930. As best shown in FIG. 9F, the engine mount assembly comprises a crankshaft axis of rotation 929.

At least one of the fasteners 925 used to secure the housing 920 to the mounting surface 904 may extend into an aperture 926 that extends into or adjacent the first structural wall 912. One or more of the bulkheads 910 may extend between the first and the second structural walls 912, 914 in a direction that may be parallel or substantially parallel to the longitudinal centerline of the snowmobile. The housing 920 may be secured to the mounting surface 904 with a fastener 925 that extends into one of the bulkheads 910.

In an illustrative example, the mounting surface 904 may be a planar surface on the end of a wall 930 that extends outward from the panel 917 and along the panel 917 from the first structural wall 912 to the bulkhead 910. The wall 930 may at least partially define an oblong perimeter about a portion of the panel 917. It is to be understood, however, that the perimeter and the mounting surface 904 is not limited to such shapes. The portion of panel 917 positioned inside the perimeter may be positioned opposite the damper 922 when the engine mount assembly 902 is secured to the mounting surface 904. In a non-limiting example as shown in FIGS. 9C and 11B, at least a portion of the engine mount assembly 902 and at least a portion of the mounting surface 904 extends into an outboard region of the crankcase that may define a magneto housing 928. At least a portion of the magneto housing 928 may extend below the mounting surface 904 when, for example, the engine 800 is secured to the snowmobile. Although referred to as a magneto housing 928 it is to be understood that the magneto housing is not limited to housing a magneto, and may house one or more components including, but not limited to, a magneto, an alternating current generator, a recoil starter, ignition timing sensors, and combinations thereof.

In an illustrative example, the first structural wall 912 is positioned forward of the second structural wall 914 along the longitudinal centerline of the snowmobile. One of the fasteners 925 may be positioned a first distance from the longitudinal centerline, and a second fastener 925 may be positioned a second distance from the longitudinal centerline that is different than the first distance. The second fastener 925 may be positioned between the first structural wall 912 and the second structural wall 914. Accordingly, the fasteners 925 are positioned away from a lower apex 931 of the curved surface (in this case the lowest point of the panel 917 when positioned on the vehicle), thereby offsetting the damper 922 from the apex 931 and allowing the apex 931 to be positioned closer to the lowest part of the chassis, thereby lowering the center of gravity of the vehicle. The apex 931 may be positioned midway between the first and the second structural walls 912, 914, and may be defined by a bulkhead 911.

Figure 9G:
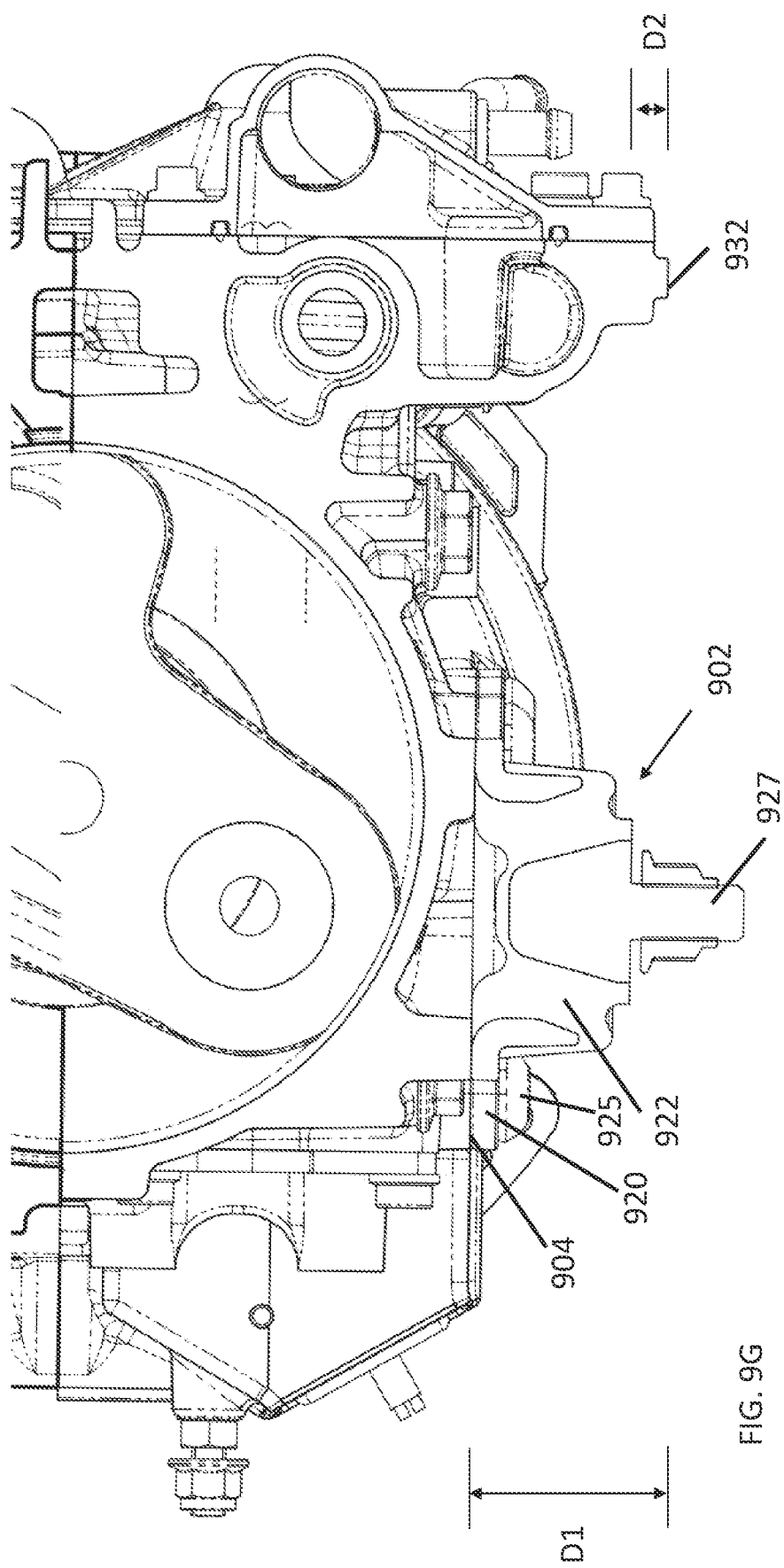
FIG. 9G illustrates a portion of the view of FIG. 9E enlarged for magnification purposes, according to some embodiments.

Optionally, at least a portion of the engine crankcase extends below one or all of the mounting surfaces 904 when the engine is positioned on the vehicle. Optionally, the mounting surface 904 is positioned below an outboard side of the crankcase, such as a magneto housing 928. Optionally, the mounting surface 904 is positioned below a water pump housing of the crankcase, such as the one shown adjacent the structural wall 914. Optionally, the mounting surface is positioned below a rearward side of the crankcase. In an illustrative example, at least a portion of the recoil housing 950 extends below one or all of the mounting surfaces 904 when the engine is positioned on the vehicle. In a non-limiting example as shown in FIG. 9G, the lowest portion 932 of the lower crankcase is positioned a distance D1 below the mounting surface 904 or the mounting face of the housing 920, and optionally the lowest portion 932 is positioned a distance D2 below the damper 922, and optionally below all but the threaded portion of 927 on engine mount assembly 902.

In an illustrative example, the housing 920 of the engine mount assembly 902 is directly secured to the mounting surface 904.

Figure 9I:
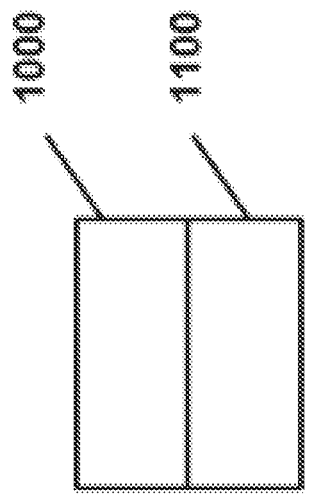
FIG. 9I shows a diagrammatic illustration of a die casting of the lower crankcase, according to some embodiments.
Figure 9H:
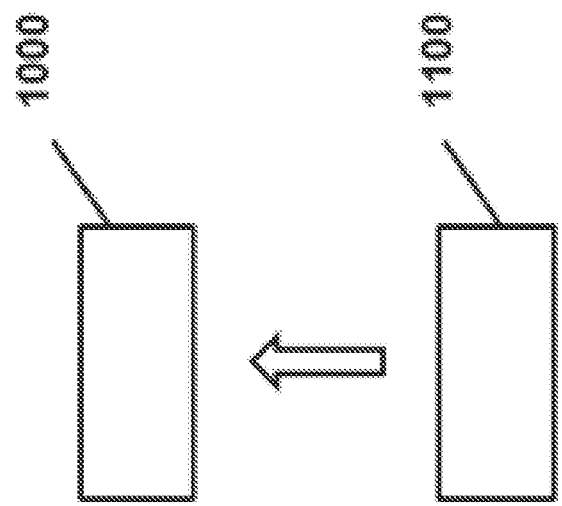
FIG. 9H shows a diagrammatic illustration of a die casting of the lower crankcase, according to some embodiments.
Figure 10:
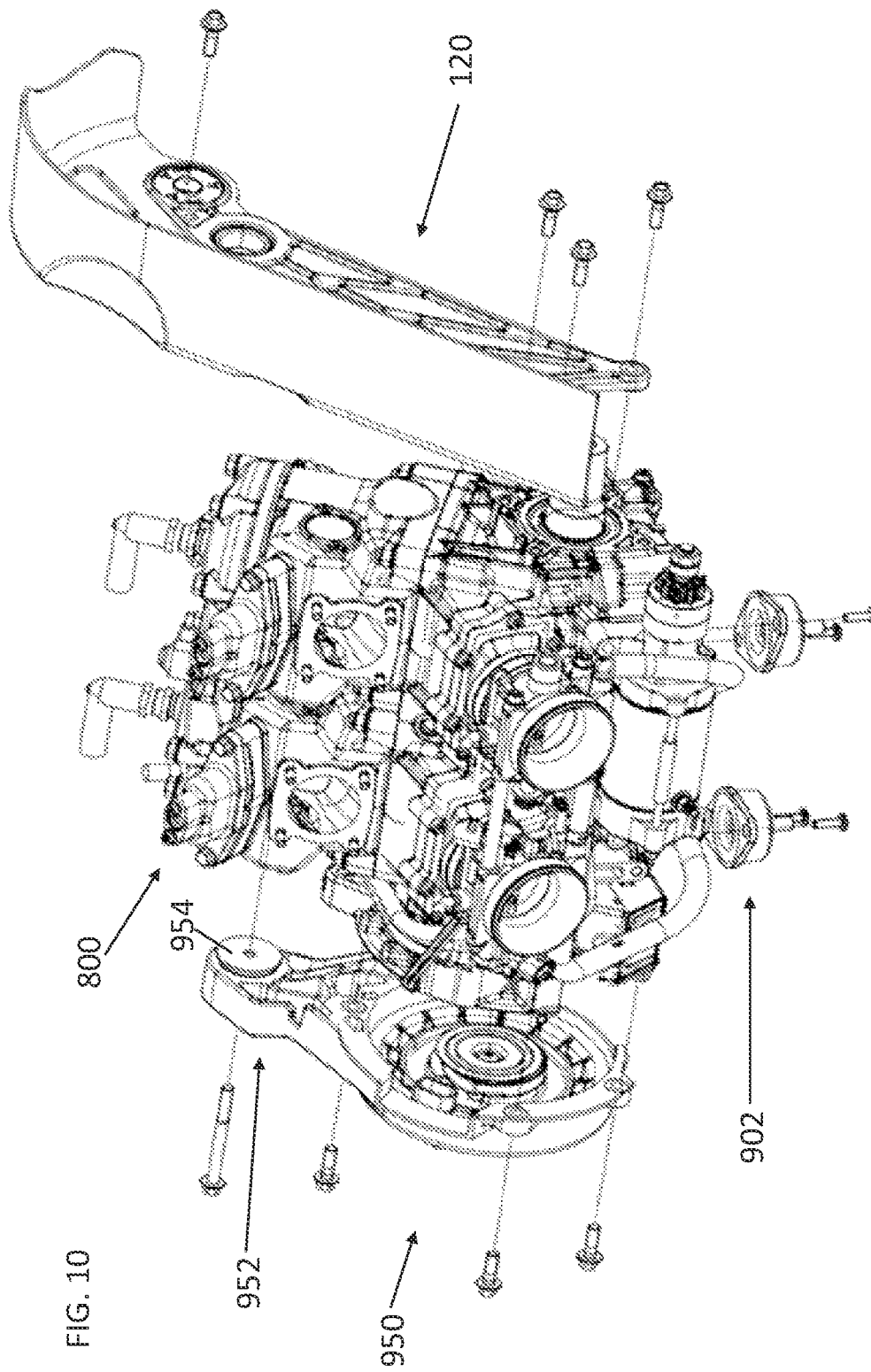
FIG. 10 illustrates a perspective view of engine 800 with integrated torque control link, recoil housing, and cast mounting surfaces, according to some embodiments.

In a non-limiting method, the lower half of the engine crankcase as described above may be formed by die casting, and optionally by high pressure die casting. The lower half of the engine crankcase may be comprised of a metal or a metal alloy, including, but not limited to, aluminum and aluminum alloys. FIGS. 9H-9I show a diagrammatic illustration of a die casting of the lower crankcase. A method for die casting the lower crankcase for a snowmobile engine may include providing a die cast mold including a first mold half 1000 and a second mold half 1100 each including a cavity that combine to provide a mold cavity, wherein the mold cavity is shaped to form the lower crankcase, and the first mold half is shaped to form a mounting surface on a lower surface of an exterior of the lower crankcase, providing a molten metal or metal alloy to the mold cavity after the first mold half and the second mold half are combined, solidifying the lower crankcase; and moving the first mold half away from the second mold half in a direction perpendicular to, or substantially perpendicular to, the mounting surface on the lower surface of the exterior of the lower crankcase to remove the lower crankcase from the die cast mold. In a non-limiting example, the direction is within ±5° of perpendicular, and optionally within ±3° of perpendicular. Optionally, the first mold half is moved away from the second mold half in a direction that is parallel to, or substantially parallel to, the walls 930 extending from the lower surface of an exterior of the lower crankcase that define the mounting surface 904. In a non-limiting example, the direction is within ±5° of parallel, and optionally within ±3° of parallel. The method optionally includes securing an engine mount to the mounting surface 904 and a snowmobile chassis. Optionally, the engine is a 2-stroke engine. Optionally, the first mold half is an upper mold half, and the second mold half is a lower mold half.

FIGS. 10, 11A, 11B and 12 illustrate views of engine 800 with integrated torque control link 120, recoil housing 950, and engine mount assemblies 902, according to some embodiments.

In a non-limiting example, one or more of the engine 800, integrated torque control link 120, recoil housing 950, engine mount assembly 902, and frame 104 may be configured to lower the center of gravity of the snowmobile, centralize mass of the snowmobile, and reduce weight. Integration of one or more of these features may reduce part count and, in some cases, heavier components. Integration of one or more of these features may allow for the repositioning of components, and more efficient packaging within the vehicle frame to centralize the mass of the snowmobile to improve ergonomics and handling, thereby providing a more rider-focused design.

The recoil housing 950 may include a composite material including structural composite with a polymer matrix and a reinforcement including, but not limited to, one or more types of fibers. Recoil housing 950 may include a fiber reinforced polymer matrix with fiber fill varying in percent volume from 10%-50%, optionally from 40%-60%, and in some embodiments, from 45%-55%. In a non-limiting example, the fibers may be a glass fiber. Without being limited to any theory, the use of a long fiber may improve vibration damping characteristics over a conventional die cast aluminum or other metal recoil housing. In the illustrative example shown in FIG. 10, the recoil housing 950 may include an arm 952 extending therefrom towards an end with a damping component 954 positioned therein. The arm 952, and optionally the damping component 954, may extend along the same plane as the recoil housing 950, or may be offset to an inboard or outboard side thereof along the vehicle. In any event, shifting the damping component 954 to outboard of the engine 800 or motor provides flexibility in mounting options and allows for the damping component 954 to be positioned outboard of the engine 800 or motor. The damping component 954 may secured to another mount 938 extending from the frame 104, from the heat exchanger 939 positioned forward of the tunnel, or any component of the heat exchanger assembly including the end cap 960, or may extend from a part of the chassis or the tunnel. The mount 938 may be positioned rearward from the crankcase of the engine 800. In an illustrative example, the damping component 954 is secured to the heat exchanger end cap 960 with a removable fastener. In one example, damping component 954 may be in contact with a belt case and any portion of heat exchanger 939. In another example, damping component 954 is substantially between a belt case and a portion of heat exchanger 939. Although the damping component 954 is shown in FIG. 12 as being positioned inboard of the portion of the vehicle (heat exchanger end cap 960) that it is secured to, it is to be understood that the damping component 954 may be positioned outboard of the portion of the vehicle that it is secured to.

Figure 13:
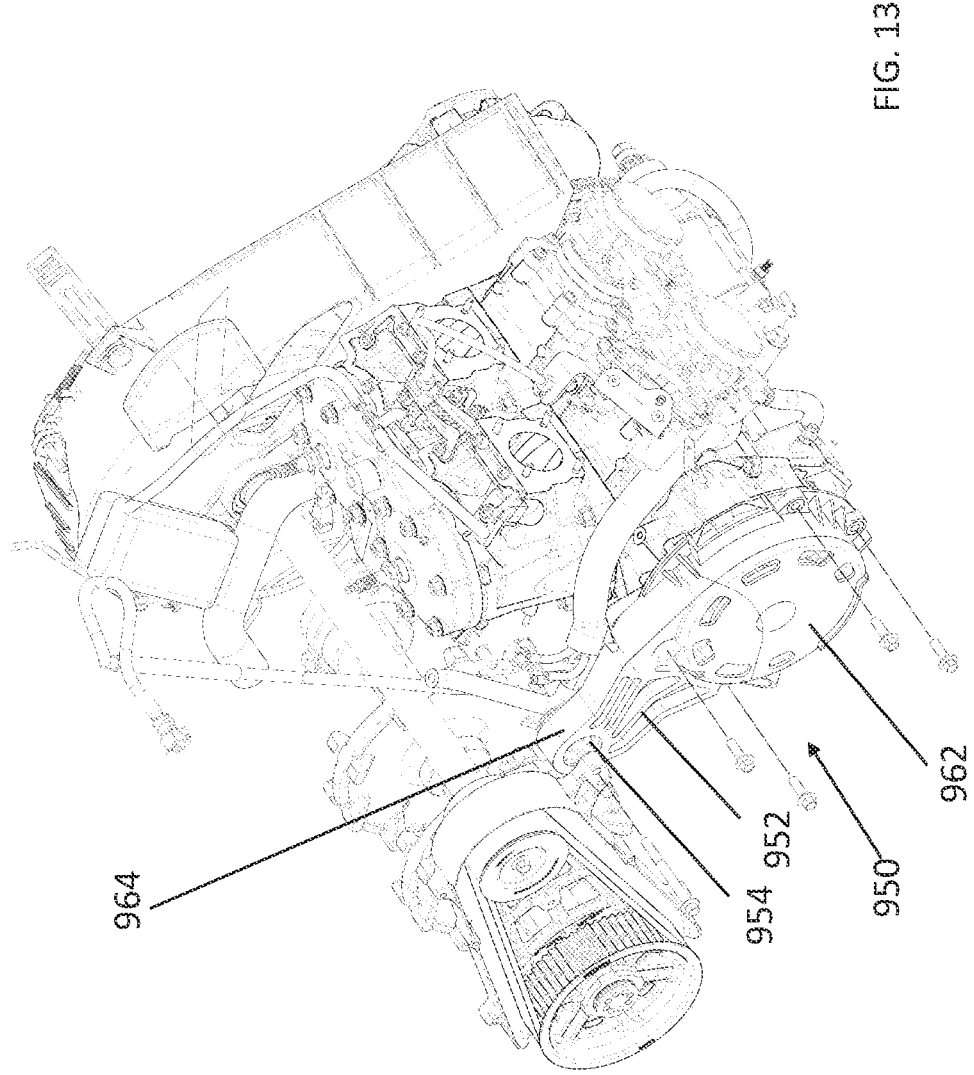
FIG. 13 illustrates a perspective view of engine 800 with recoil housing, according to some embodiments.
Figure 14:
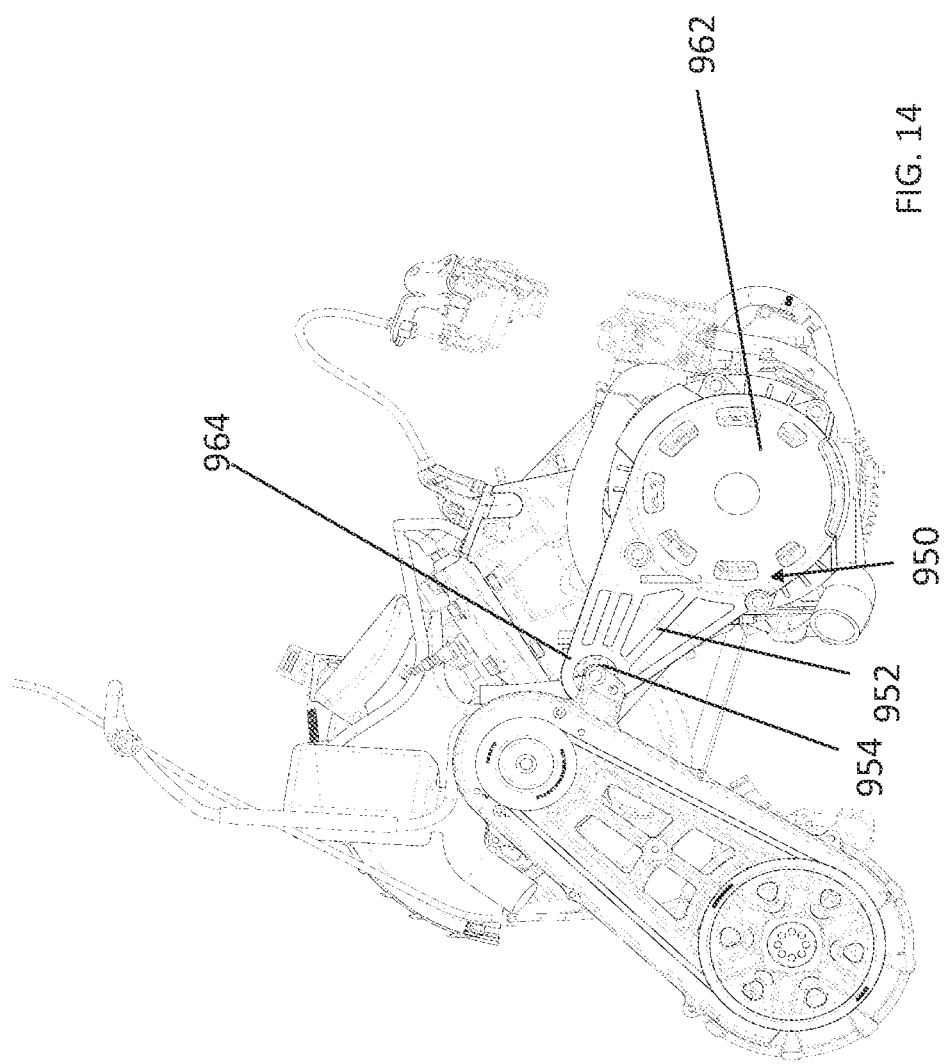
FIG. 14 illustrates a perspective view of engine 800 with recoil housing, according to some embodiments.

FIGS. 13-14 illustrate perspective views of engine 800 with recoil housing 950 and damping component 954, according to some embodiments. FIGS. 13-14 illustrate a recoil housing 950 with arm 952, housing portion 962, and mounting portion 964. Recoil housing 950 may be in contact with engine 800, and in some embodiments, the housing portion 962 may be configured to at least partially house the crankcase of the engine 800. Arm 952 may be integrated with housing portion 962 and mounting portion 964. As an option, the arm 952, damping component 954, and mounting portion 964 may extend along the same plane as housing portion 962 or may be offset to an inboard or outboard side thereof along the vehicle. As shown in FIG. 11B, the arm 952 may include at least a portion thereof positioned outboard of the housing portion 962.

Optionally, damping component 954 may be integrated with mounting portion 964. Mounting portion 964 may be in contact with damping component 954. Further, mounting portion 964 is shaped to receive, and optionally may substantially surround, damping component 954. The damping component 954 may be secured to the frame 104, mounting portion 964, the heat exchanger 939 or any component of the heat exchanger assembly including the end cap 960, or tunnel. In an illustrative example, the damping component 954 is secured to the heat exchanger end cap 960 with a removable fastener. Damping component 954 may be the same or different materials as damping component 308. Damping component 954 may have at least one similar material to damping component 308. In one example, damping component 954 may be rubber and steel. In another example, damping component 954 is substantially rubber. In one non-limiting example, damping component 954 may be a steel ring with overmolded rubber. Damping component 954 may have the same or similar shape and structure as damping component 308. The recoil housing 950 may be manufactured as single piece or one-piece construction. Recoil housing 950 as a single piece or one-piece construction may decrease weight, simplify manufacturing and assembly, and reduce parts.

Figure 15:
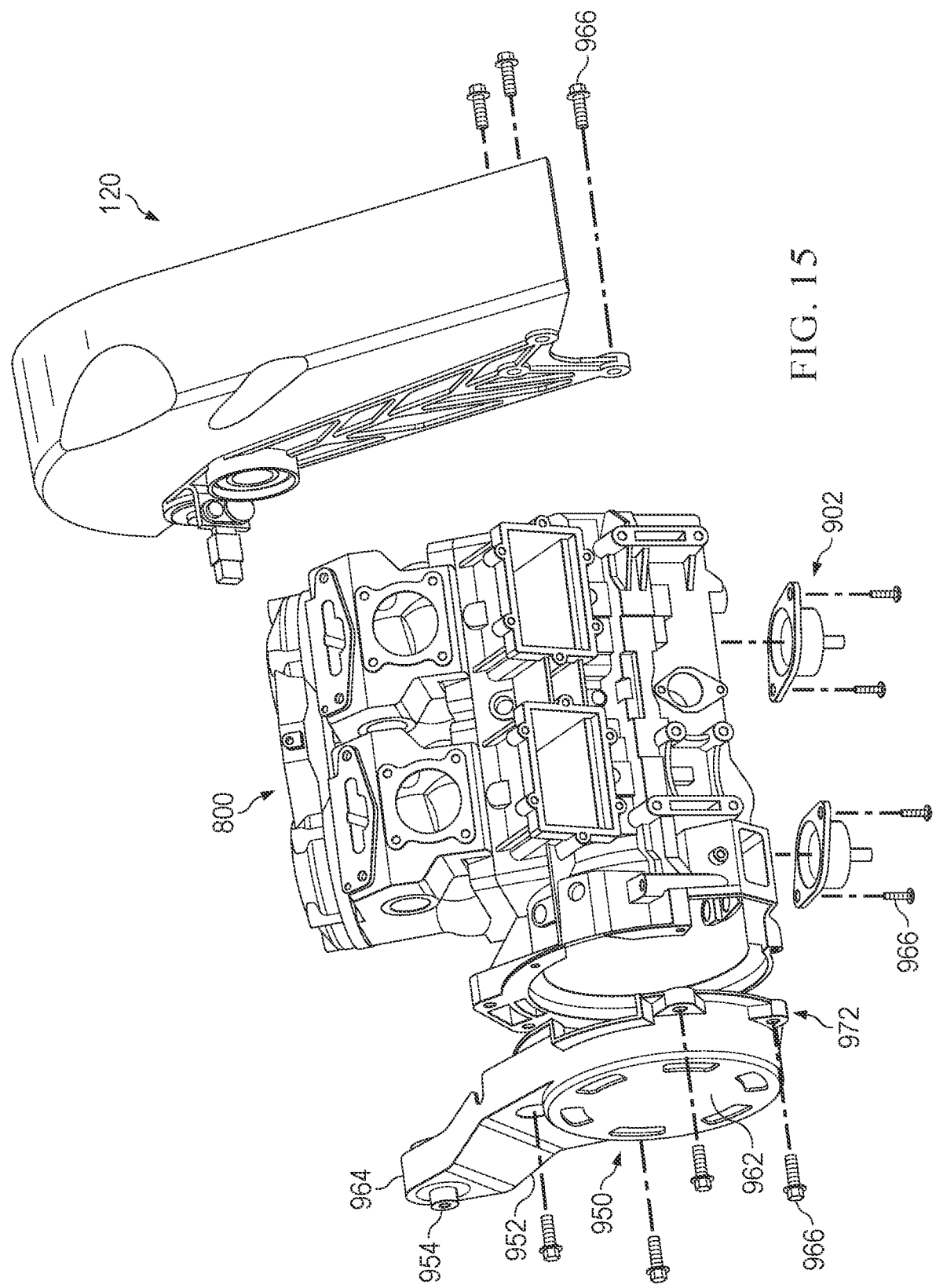
FIG. 15 illustrates an exploded view of engine 800 with recoil housing, clutch guard, and cast mounting surfaces according to some embodiments.

FIG. 15 illustrates an exploded view of engine 800 with clutch guard 120, engine mount assemblies 902, recoil housing 950, damping component 954, fastening component 966, and engine fastening feature, comprising a first aperture, 972', according to some embodiments. Recoil housing 950 may include arm 952, damping component 954, housing portion 962, and mounting portion 964. Any portion of recoil housing 950 may be in contact with engine 800. Recoil housing 950 may be substantially secured to engine 800 with housing portion 962. For example, housing portion 962 may be the only portion of recoil housing 950 in contact with engine 800. Further, any portion of clutch guard 120 may be in contact with engine 800. Recoil housing 950 and clutch guard 120 may be on opposite sides of engine 800 from one another. Recoil housing 950 may be secured to engine 800 with one or more fastening components 966 utilizing engine fastening feature 972. In one non-limiting example, recoil housing 950 may be secured to engine 800 with four fastening components 966. Fastening components 966 may extend through engine fastening feature 972 to secure engine 800 to recoil housing 950. In an illustrative example, both the clutch guard 120 and the recoil housing 950 comprise of a composite including a fiber material in a polymer matrix. The composite material may be the same or different for the clutch guard 120 and the recoil housing 950, and the fiber material may comprise long fibers. As the composite clutch guard 120 and the composite recoil housing 950 each houses an engine mount on opposite sides of the engine 800, the vibration damping characteristics may be improved over a conventional die cast aluminum or other metal components used to mount an engine to a vehicle chassis.

Engine fastening feature 972 may have a large enough diameter sufficient for fastening component 966 to extend through engine fastening feature 972. Engine fastening feature 972 may have any cross-sectional shape sufficient for fastening component 966 to extend through engine fastening feature 972. Engine fastening feature 972 may have a cross-sectional shape of a square, rectangle, triangle, or polygon. In one non-limiting example, engine fastening feature 972 is substantially tubular-shaped. In some embodiments, one or more engine fastening features 972 may be configured to secure to the upper crankcase and one or more engine fastening features 972 may be configured to secure to the lower crankcase. For example, FIG. 15 illustrates two bolts (or fasteners 966) inserted through the engine fastening features 972 and into the lower crankcase, and two bolts (or fasteners 966) inserted through the engine fastening features 972 and into the upper crankcase. In some embodiments, the one or more engine fastening features 972 may not be threaded or tapped. The engine fastening features 972 may be configured to receive self-tapping fasteners and/or threaded fasteners without pre-tapping the engine fastening features 972, and thus, reduce manufacturing time, cost, and part requirements.

Fastening component 966 may be any type of component used for securing two components together, such as a bolt, screw, pin, rivet, or other fastener. For example, fastening component 966 may be substantially cylindrical. Fastening component 966 may be used in conjunction with a washer, nut, or anchor. In one non-limiting example, fastening component 966 is configured to removably secure the recoil housing 950 to the engine 800 and may comprise a machine screw. In another non-limiting example, fastening component 966 is an M8 fastener. In yet another non-limiting example, fastening component 966 is a bolt. Housing the damping component 954 in the recoil housing 950 may decrease cost and assembly time due to fewer fastening components 966 being necessary to separately secure the recoil housing 962 and an engine mount to the engine 800. Fewer fastening components 966 leads to a decrease in necessary material on engine 800 for mounting purposes.

Figure 16:
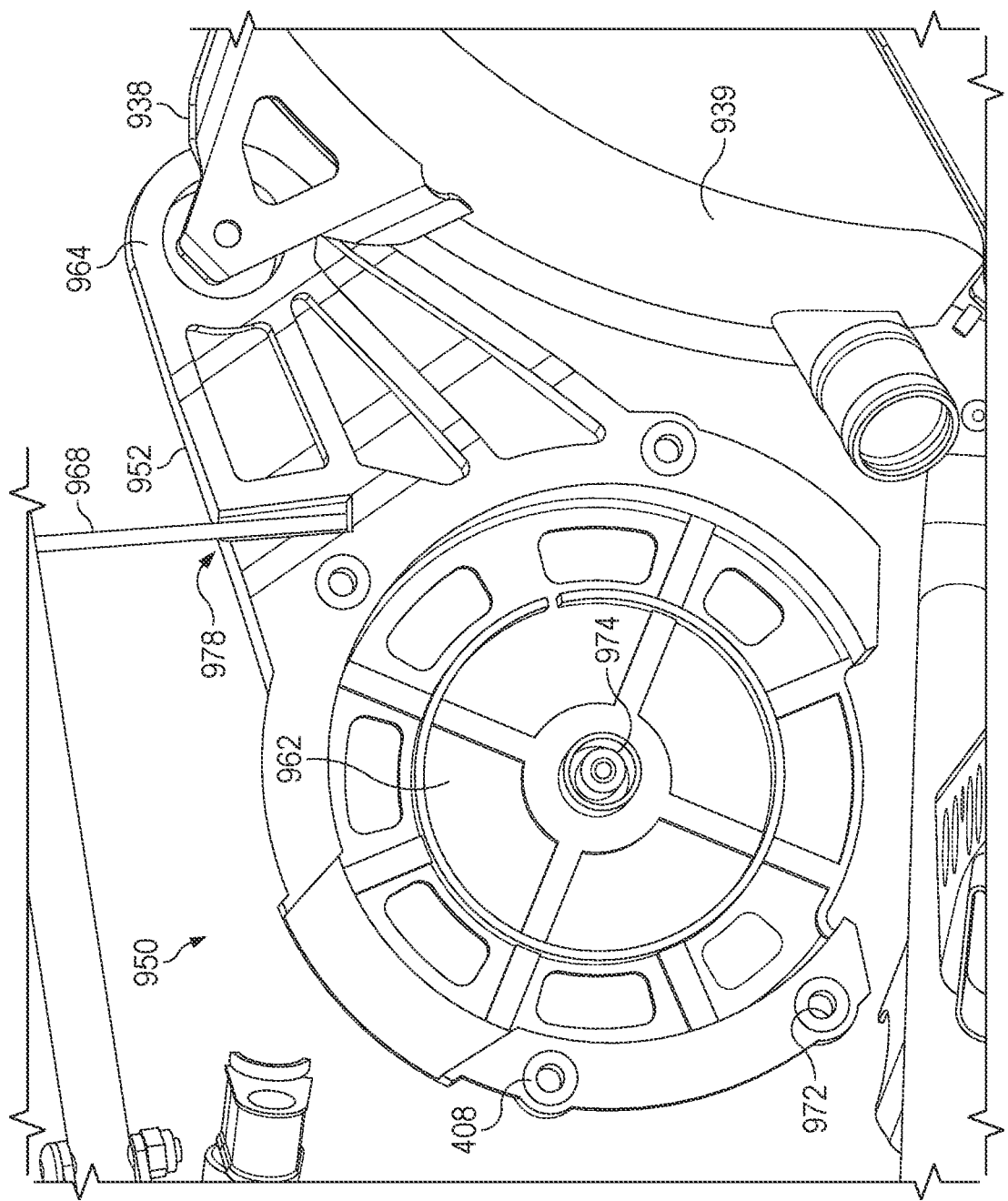
FIG. 16 illustrates a perspective view of recoil housing 950 positioned near the forward frame of a snowmobile, according to some embodiments.

FIG. 16 illustrates a perspective view of recoil housing 950 and starting cord 968, positioned near the forward frame of a snowmobile, according to some embodiments. Recoil housing 950 may include damping feature 408, arm 952, housing portion 962, mounting portion 964, engine fastening feature 972, fastening featuring, comprising a third aperture, 974', and starting cord pathway 978. Damping feature 408, engine fastening feature 972, and starting cord pathway 978 may be included in any portion of recoil housing 950. In one example, starting cord pathway 978 is at least partially defined by an inboard side of the arm 952 and may be sufficiently wide enough for starting cord 968 to extend through. In one non-limiting example, starting cord pathway 978 is sufficient to allow starting cord 968 to enter recoil housing 950 through an opening in the housing portion 962 that is aligned with the starting cord pathway 978 in arm 952. Starting cord pathway 978 may serve as a pathway for starting cord 968 between arm 952 and housing portion 962.

Starting cord pathway 978 may have any cross-sectional shape sufficient for starting cord 968 to extend through starting cord pathway 978. Starting cord pathway 978 may have varying diameters in different portions of recoil housing 950. Starting cord pathway 978 may have a cross-sectional shape of a square, rectangle, triangle, or polygon. In one non-limiting example, starting cord pathway 978 is substantially tubular-shaped. Starting cord 968 may be a cord, rope, string, cable, or other device sufficient for an engine starting assembly. In one non-limiting example, starting cord 968 is substantially cylindrical. As shown in FIGS. 21A, 21B, 22A and 22B, the starting cord 968 may enter the starting cord pathway 978 on an inboard side of the arm 952, and exit the starting cord pathway 978 on an outboard side of the arm as the starting cord 968 extends through the opening and into the housing portion 962.

Recoil housing 950 can be secured to engine 800 utilizing one or more of damping feature 408 and engine fastening feature 972. Recoil housing 950 and engine fastening feature 972 support damping feature 408, such as a rubber or polymeric insert for example. In one non-limiting example, engine fastening feature 972 supports damping feature 408. Damping feature 408 may be in contact with one or more of housing portion 962, engine fastening feature 972, and fastening component 966. The rubber can be 60 durometer, shore A for example. By way of example, the polymeric insert can have a shore A hardness between 40 and 80. Damping feature 408 may be any material sufficient to decrease vibration. The damping feature 408 may reduce vibration and provide a mechanism to absorb movement and prevent stress on one or more of engine 800 and recoil housing 950. As an example, one possible orientation of recoil housing 950 in relation to mount 938 and heat exchanger 939 is shown in FIG. 16. In some embodiments, the damping feature 408 may limit compression of the engine fastening feature 972 and/or the housing 962. The damping feature 408 may limit or prevent creep (i.e., slow shifting or deformation due to mechanical stress) of the recoil housing 950.

Housing portion 962 can substantially surround, protect, or enclose engine starting components and engine components such as starting cord 968, starting pulley, catch wheel, recoil cup, fly wheel, and starting tabs. Further, housing portion 962 can be substantially circular or cylindrical. An internal starting component may be secured to housing portion 962 with fastening feature 974. In one non-limiting example, a recoil rope starting mechanism may be secured to housing portion 962 with fastening feature 974. Fastening feature 974 can be in any portion of housing portion 962. In one example, fastening feature 974 is substantially located in the center of housing portion 962. Fastening feature 974 may be tubular-shaped. For example, fastening feature 974 may have a cross-sectional shape of a square, rectangle, triangle, or polygon. In some embodiments, the fastening feature 974 may accept a self-tapping screw or machine screw. Accepting a self-tapping screw can reduce total assembly cost and decrease assembly time.

Figure 17:
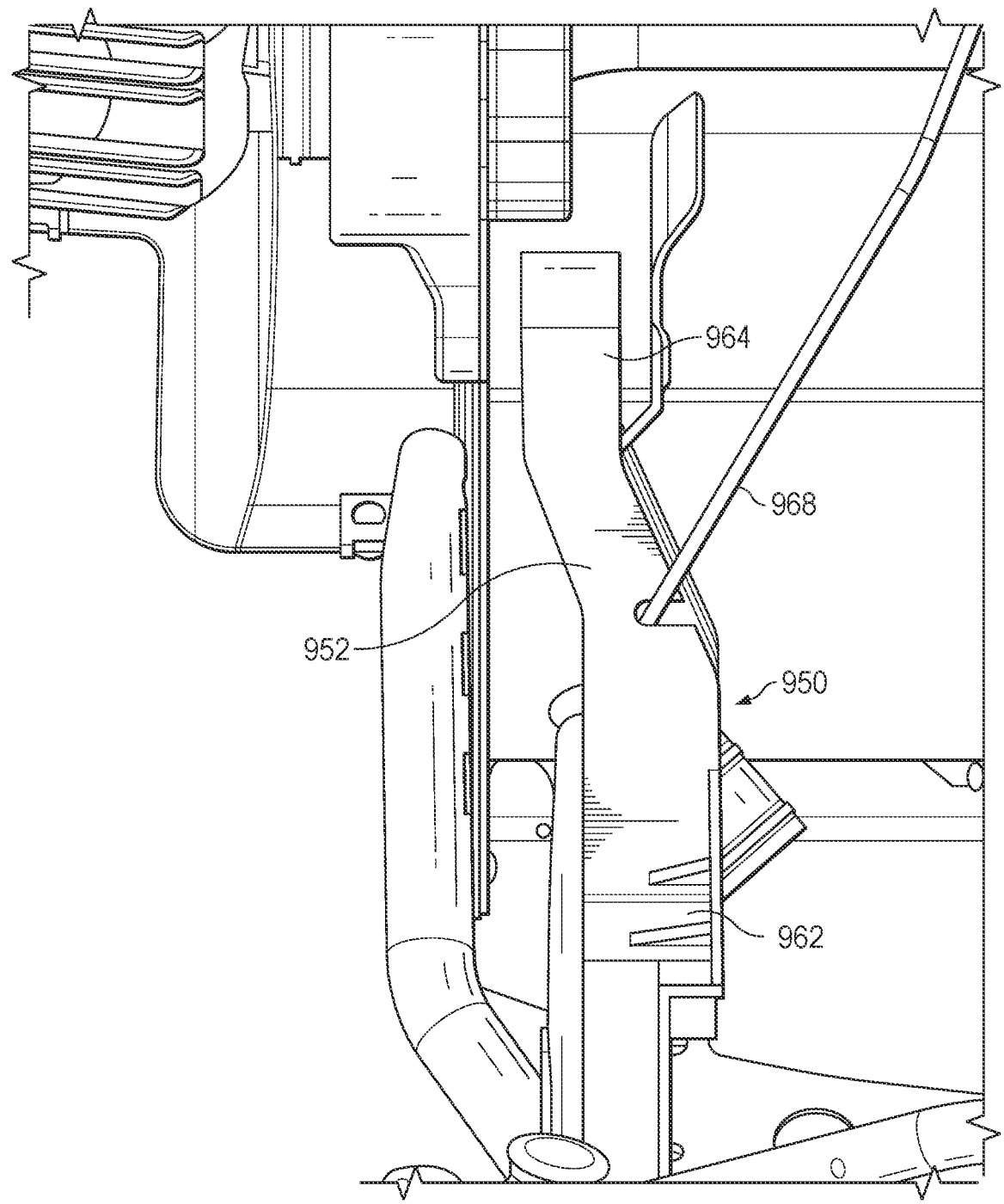
FIG. 17 illustrates a perspective view of recoil housing 950 positioned near the forward frame of a snowmobile, according to some embodiments.

FIG. 17 illustrates a perspective view of recoil housing 950 and starting cord 968, positioned near the forward frame of a snowmobile, according to some embodiments. Recoil housing 950 may include arm 952, housing portion 962, and mounting portion 964. One or more of arm 952 and mounting portion 964 may be offset to an inboard or outboard side of a snowmobile from housing portion 962. FIG. 17 illustrates an example of mounting portion 964 offset to an outboard side of a snowmobile from housing portion 962. FIG. 17 also illustrates an example of the plane of arm 952 being at a different angle from the plane of housing portion 962. Arm 952 may be angled from housing portion 962 sufficient to offset mounting portion 964 to an inboard or outboard side of a vehicle from housing portion 962 or engine 800. In one example, arm 952 may be straight or angled from the plane of housing portion 962 by 0° to 90°. For example, mounting portion 964 may be offset from housing portion 962 by 1 mm to 200 mm. In another example, mounting portion 964 may be offset from housing portion 962 by 5 mm to 50 mm.

Figure 18:
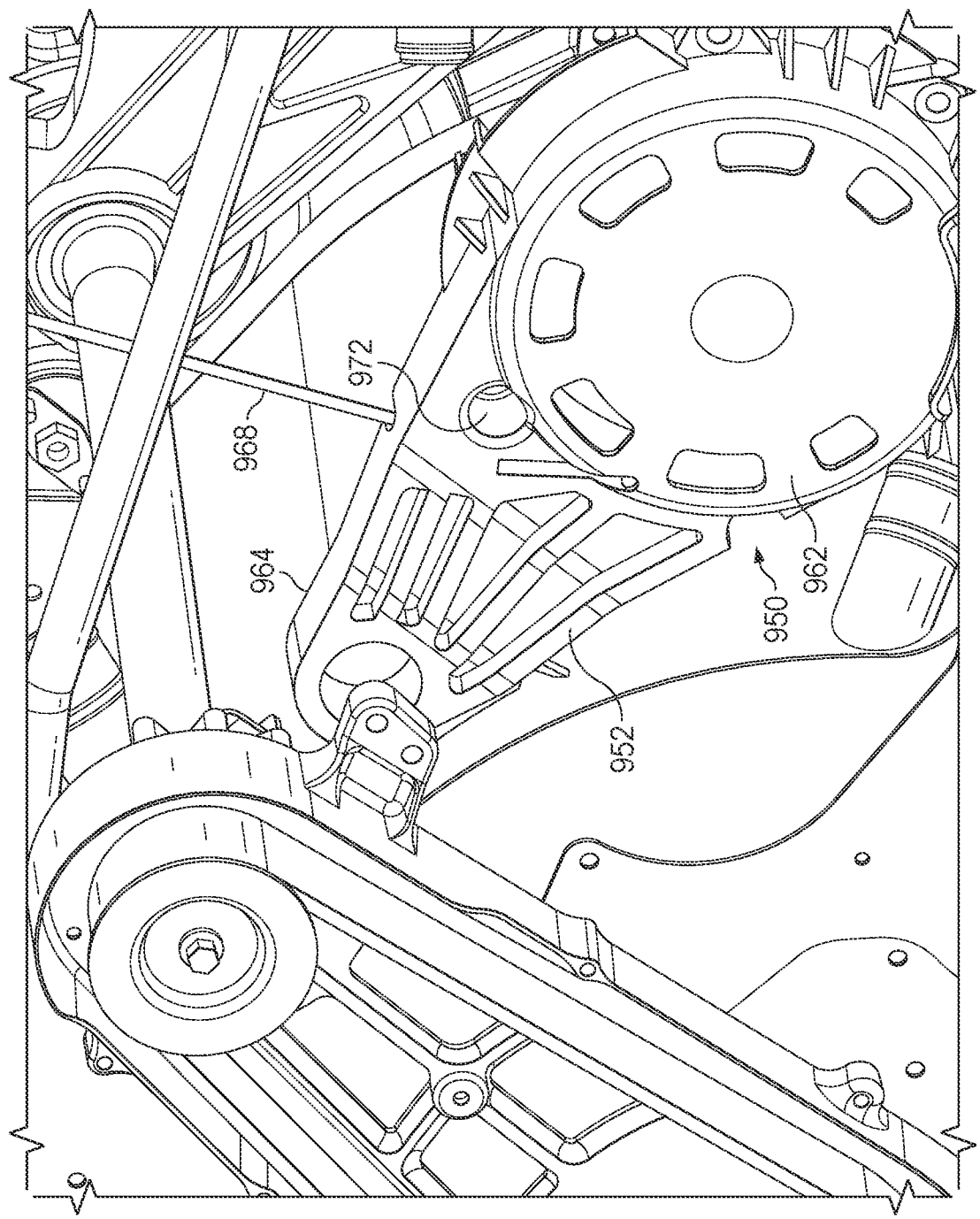
FIG. 18 illustrates a perspective view of recoil housing 950 positioned near the forward frame of a snowmobile, according to some embodiments.

FIG. 18 illustrates a perspective view of recoil housing 950 and starting cord 968, positioned near the forward frame of a snowmobile, according to some embodiments. Recoil housing 950 may include arm 952, housing portion 962, mounting portion 964, and engine fastening feature 972.

Figure 19:
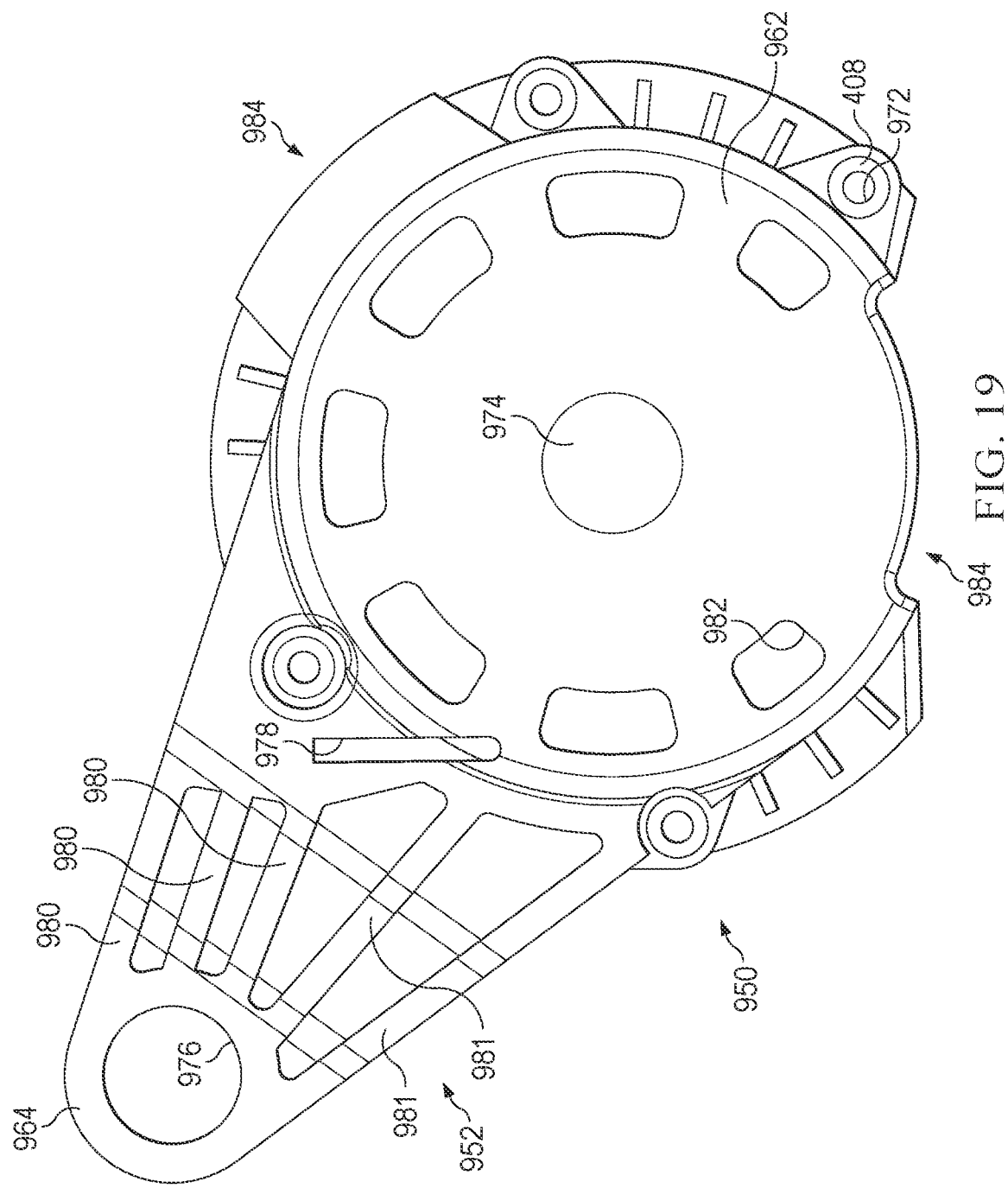
FIG. 19 illustrates a side-view of recoil housing 950, according to some embodiments.
Figure 20:
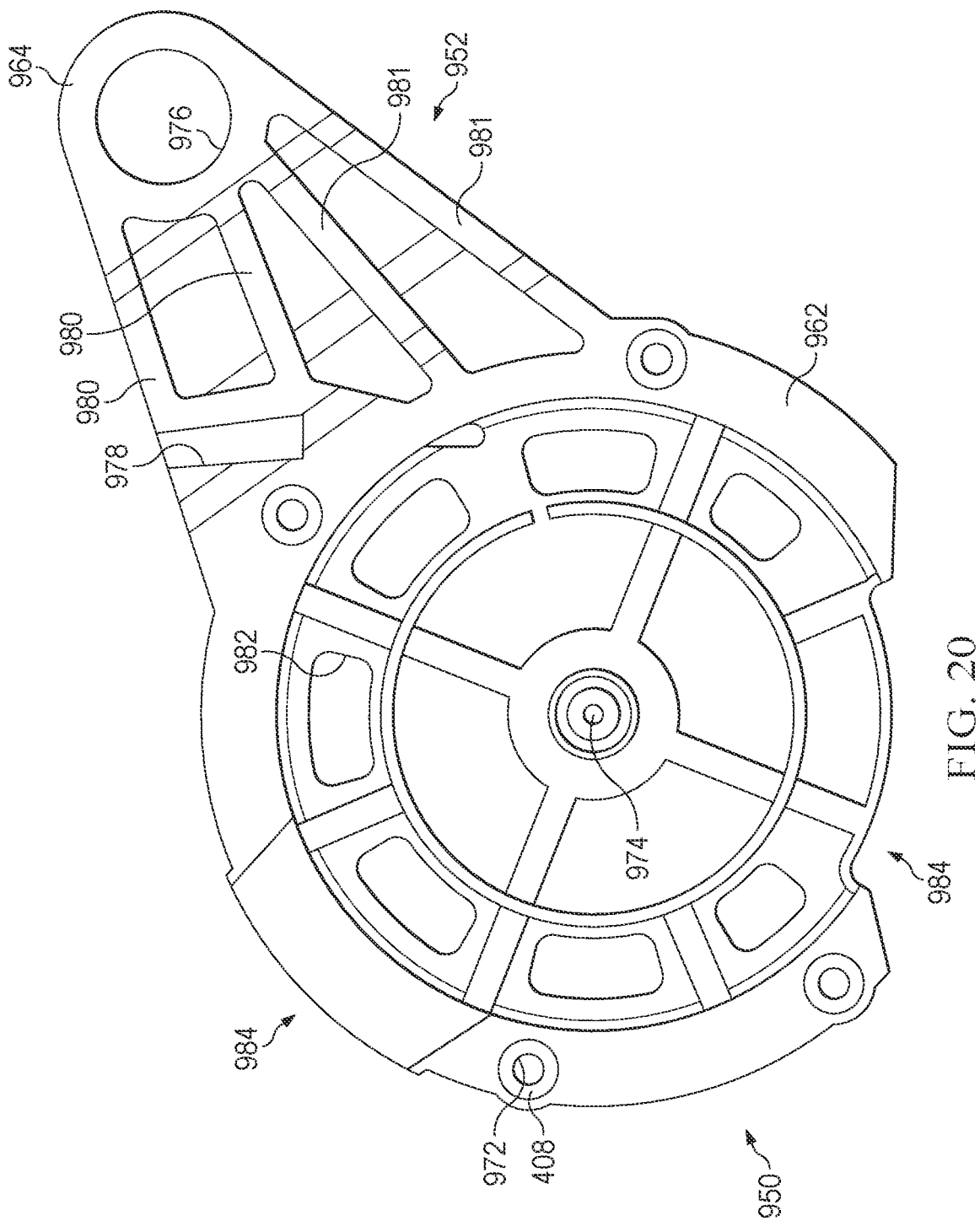
FIG. 20 illustrates a side-view of an interior surface of the recoil housing 950, according to some embodiments.

FIGS. 19-20 illustrate side-views of recoil housing 950, according to some embodiments. Recoil housing 950 may include damping feature 408, arm 952, housing portion 962, mounting portion 964, engine fastening feature 972, fastening feature 974, mounting portion feature, comprising a second aperture, 976', starting cord pathway 978, first ribs 980, second ribs 981, housing portion feature 982, and airflow component 984. In one non-limiting example, mounting portion feature 976 is a circular cutout. Mounting portion feature 976 can allow for mounting portion 964 to accept damping component 954. In another example, damping component 954, mounting portion 964, and mounting portion feature 976 are integrated.

Figure 21A:
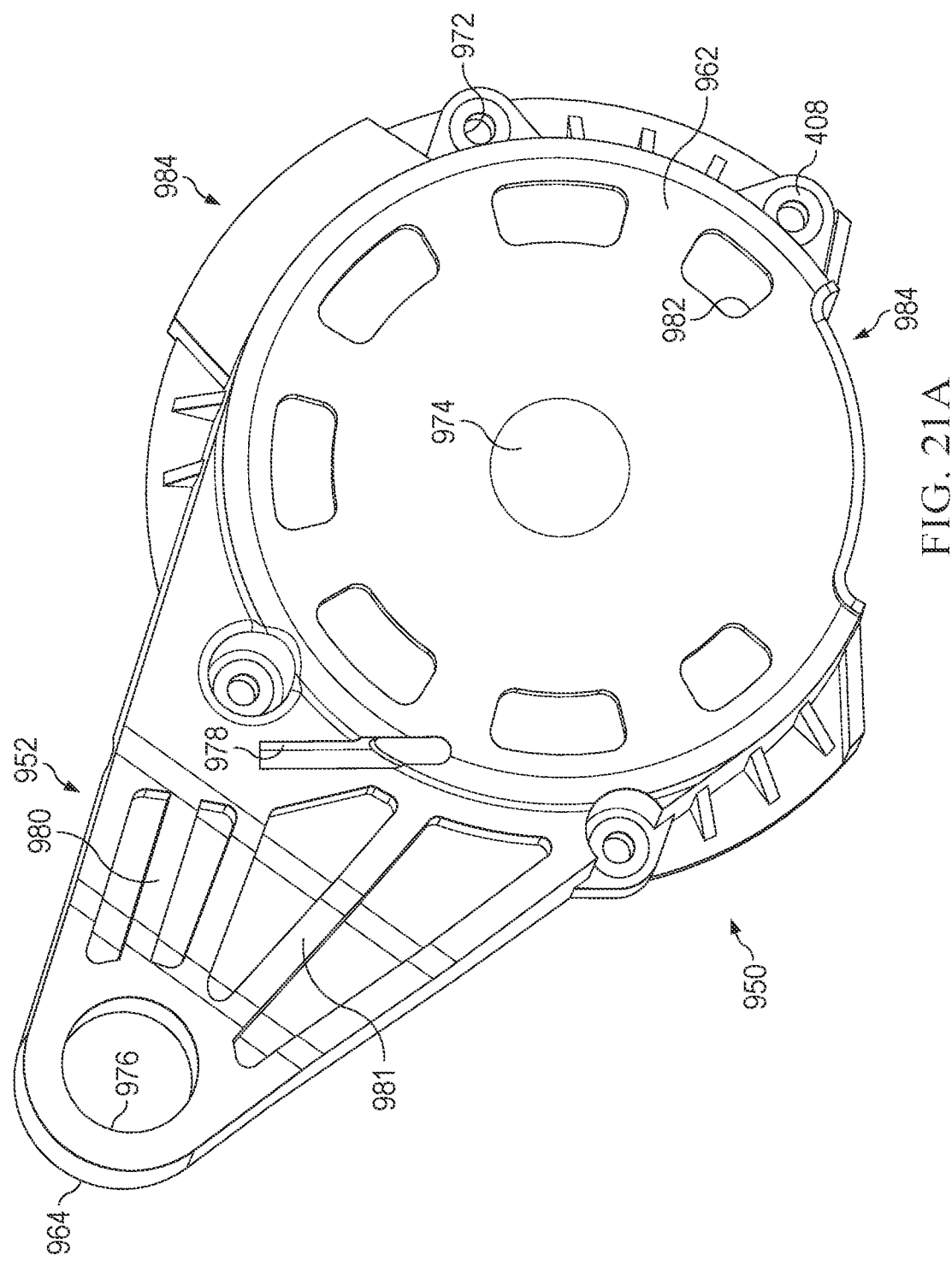
FIG. 21A illustrates a side-view of an exterior surface of the recoil housing 950, according to some embodiments.
Figure 21B:
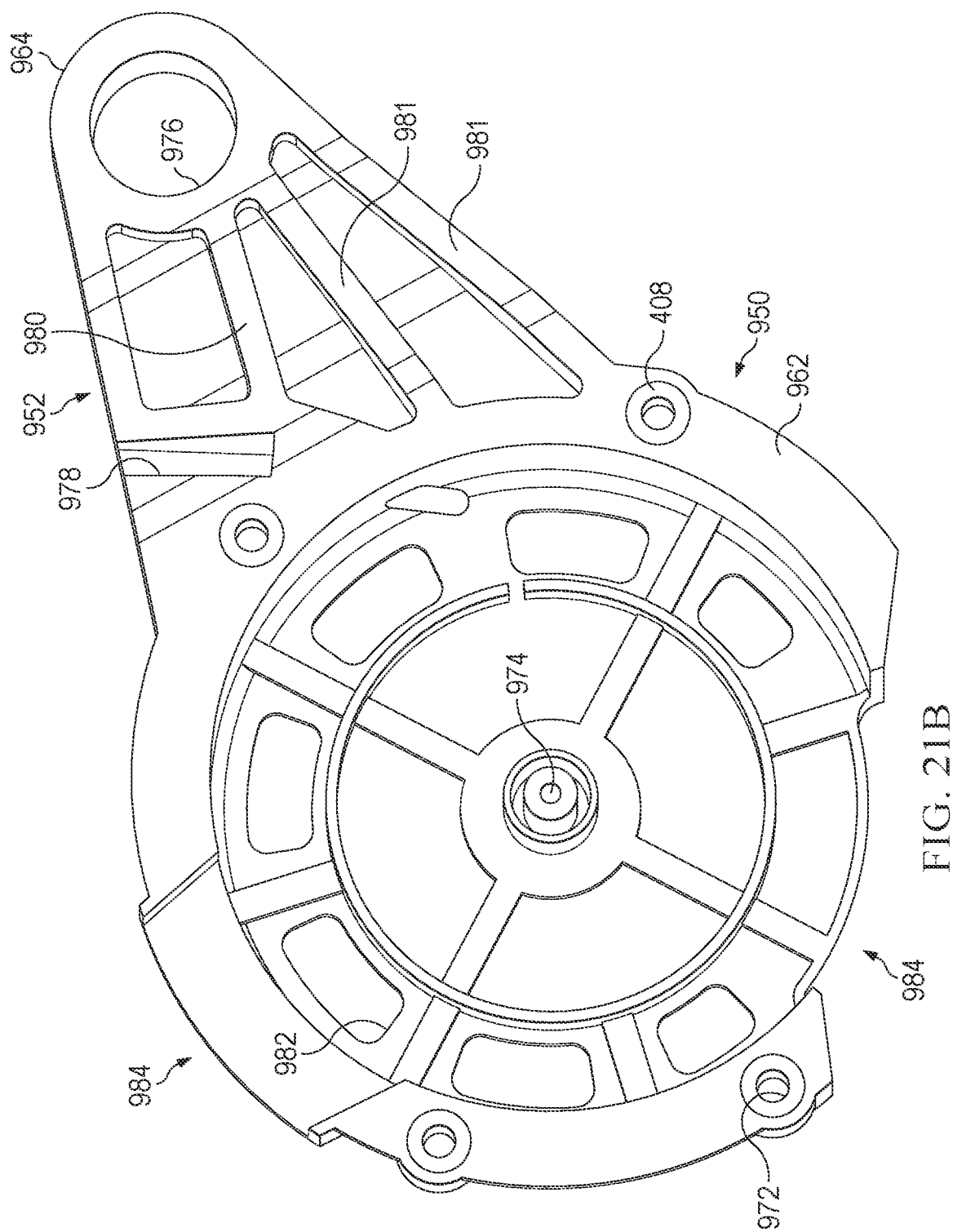
FIG. 21B illustrates a side-view of an interior surface of the recoil housing 950, according to some embodiments.

The arm 952 may be provided with one or more reinforcement members to provide structural support to one or more features on the recoil housing 950. In an illustrative example, the recoil housing 950 includes one or more first ribs 980 extending from the starting cord pathway 978 to the mounting portion 964 that houses the damping component 954. Structural integrity of the arm 952 in the region of the starting cord pathway 978 may be maintained by positioning the starting cord pathway 978 between the first ribs 980 and a fastening feature 972. A lower one of the first ribs 980 abut a portion of the wall that defines the starting cord pathway 978 that extends to the outer perimeter of the housing portion 962 as shown in FIG. 21B. The first ribs 980 may be positioned entirely or substantially entirely along a portion of the arm that extends outboard from the outboard side of the housing portion 962. In addition to, or alternatively, the recoil housing includes one or more second ribs 981 positioned below the first ribs 980 that extend across the entire length of the arm 952 between the housing portion 962 and the mounting portion 964. A first portion of the second ribs 981 may extend rearward of the housing portion 962, and a second portion of the second ribs 981 may extend rearward and outboard from the first portion of the second ribs to the mounting portion 964. Such reinforcement structures provide tailored strength and rigidity across the arm from one or both of the starting cord pathway 978 and the housing portion 962 to the mounting portion 964. In some embodiments, the starting cord pathway 978 may be formed in an injection molding process and does not require additional machining to be formed.

The recoil housing 950 may include one or more housing portion features 982 which may be apertures or cutouts in housing portion 962. In one non-limiting example, housing portion 962 has seven housing portion features 982. In one example, housing portion features 982 may be molded-in. In another example, housing portion features 982 may be post machined. Housing portion feature 982 may decrease the overall weight of recoil housing 950. In another example, housing portion feature 982 increases airflow around engine 800 and improves cooling in a vehicle. Housing portion feature 982 may be substantially contained within housing portion 962. Housing portion feature 982 may extend into one or more of arm 952, mounting portion 964, mounting portion feature 976, first ribs 980, and second ribs 981. The recoil housing 950 may include a fiber reinforced polymer matrix with fiber fill varying in percent volume from 10%-50%, optionally from 40%-60%, and in some embodiments, from 45%-55%. In some embodiments, the fiber structure may be oriented parallel to, or substantially parallel with the first ribs 980 and the second ribs 981.

Airflow component 984 may be a cutout in housing portion 962. In one example, airflow component 984 increases airflow around engine 800 of a vehicle. Airflow component 984 may also decrease the overall weight of recoil housing 950. First ribs 980, second ribs 981, housing portion feature 982, and airflow component 984 may reduce the material required for manufacturing, FIG. 21A-B illustrate side-views of recoil housing 950, according to some embodiments. Recoil housing 950 may include damping feature 408, arm 952, housing portion 962, mounting portion 964, engine fastening feature 972, fastening feature 974, mounting portion feature 976, starting cord pathway 978, first ribs 980, second ribs 981, housing portion feature 982, and airflow component 984.

Recoil housing 950 can be manufactured of a single material, such as a polymer, a composite, or of metal. In one example, recoil housing 950 can be manufactured from one or more of a composite and a polymer. In some embodiments, a polymer composite includes Nylon 6/6, Polyetheretherketone (PEEK), Polypropylene (PP), or Polyphthalamide (PPA) matrix material with glass, carbon, or ratio of both carbon and fiber material for fiber fill varying in percent volume from 10%-50%, optionally from 40%-60%, and in some embodiments, from 45%-55%. For example, the recoil housing 950 can be manufactured of a molded composite material, such as a glass filled long-fiber material. In a non-limiting example, the recoil housing 950 may be made by injection molding or additive manufacturing. In some embodiments, the polymer and/or composite material of the recoil housing 950 may have one or more elastic characteristics configured to enhance the vibrational damping characteristics of the recoil housing 950. The recoil housing 950 may include a non-metallic path from the housing 962 to the damping component 954. Portions of the recoil housing 950 can have differing thickness to optimize stiffness and weight. For example, the housing portion 962 can be thicker than arm 952 for structural support. In another example, mounting portion 964 may be thicker than arm 952 to account for mounting requirements of damping component 954. The recoil housing 950 may be a single-piece construction, which reduces assembly time, manufacturing costs, and required materials. The term "single-piece construction" as described herein refers to a single, indivisible component formed from a single mold, cast, injection, extrusion, etc. In other words, a "single-piece construction" is not a combination of two or more distinct components with a weld, fastener, adhesive, or fit, but rather, is a single, integrated construction.

Figure 22A:
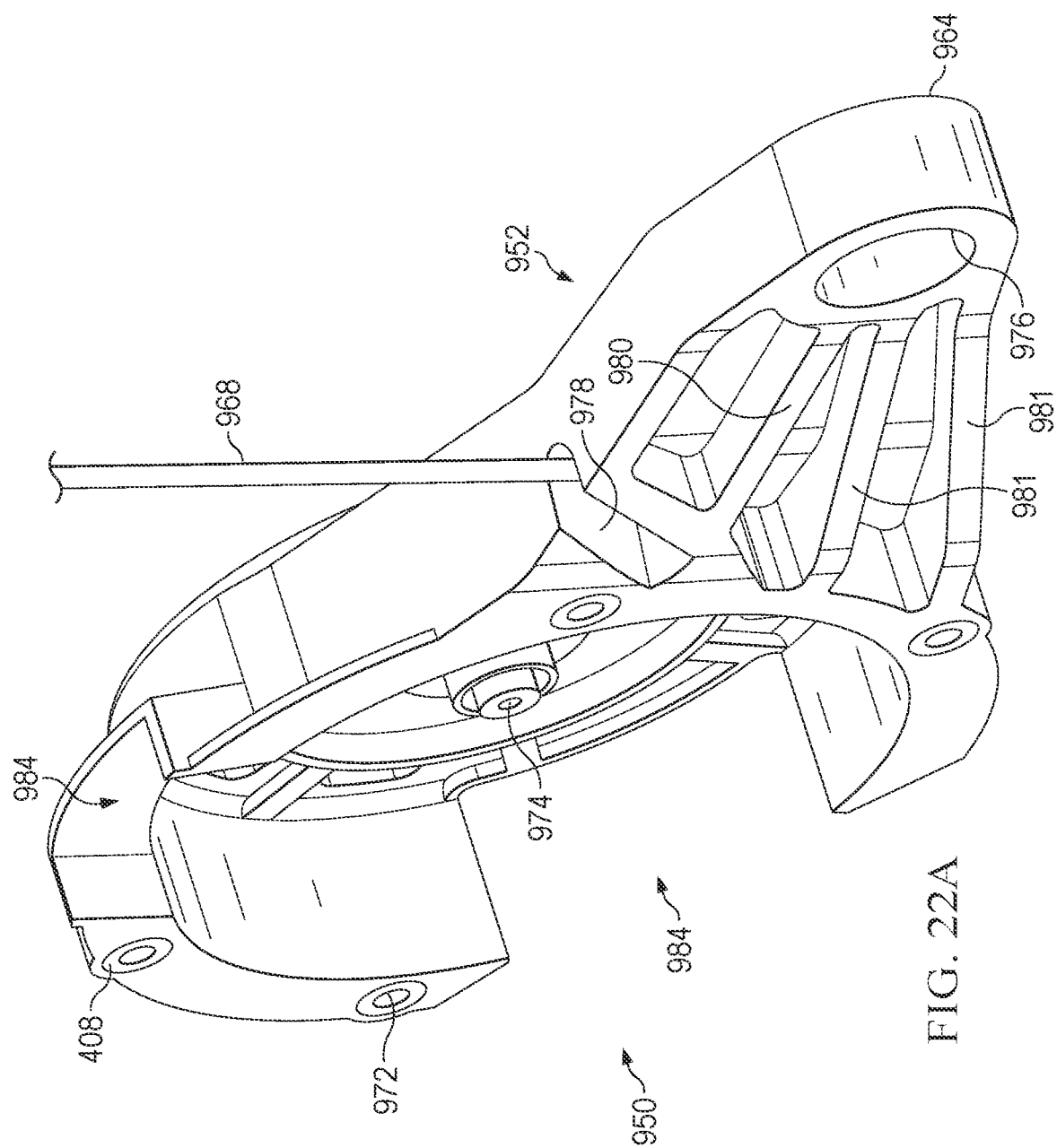
FIG. 22A illustrates a perspective view of an interior surface of the recoil housing 950, according to some embodiments.
Figure 23A:
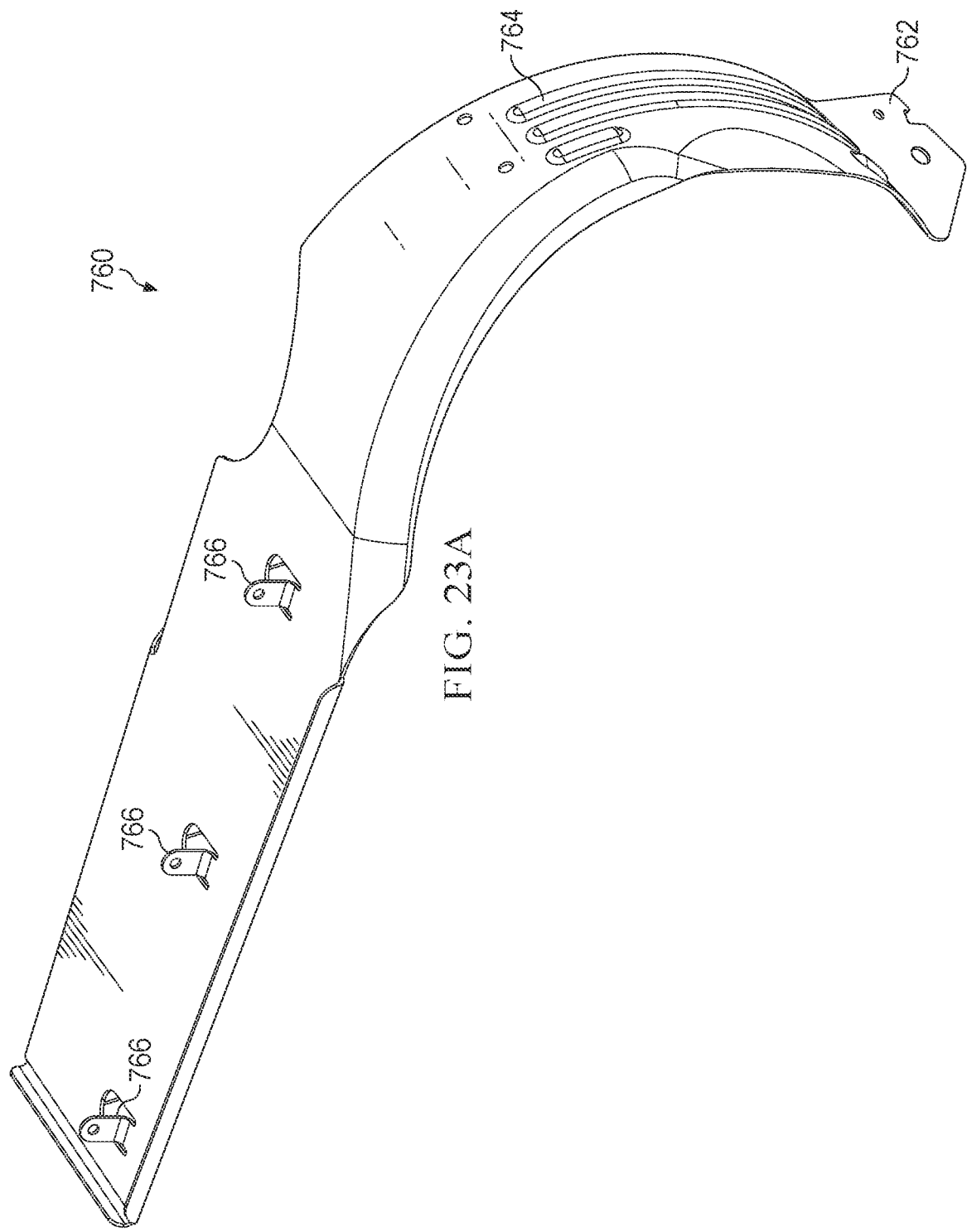
FIG. 23A illustrates an isometric view of a liner assembly 760, according to some embodiments.
Figure 23B:
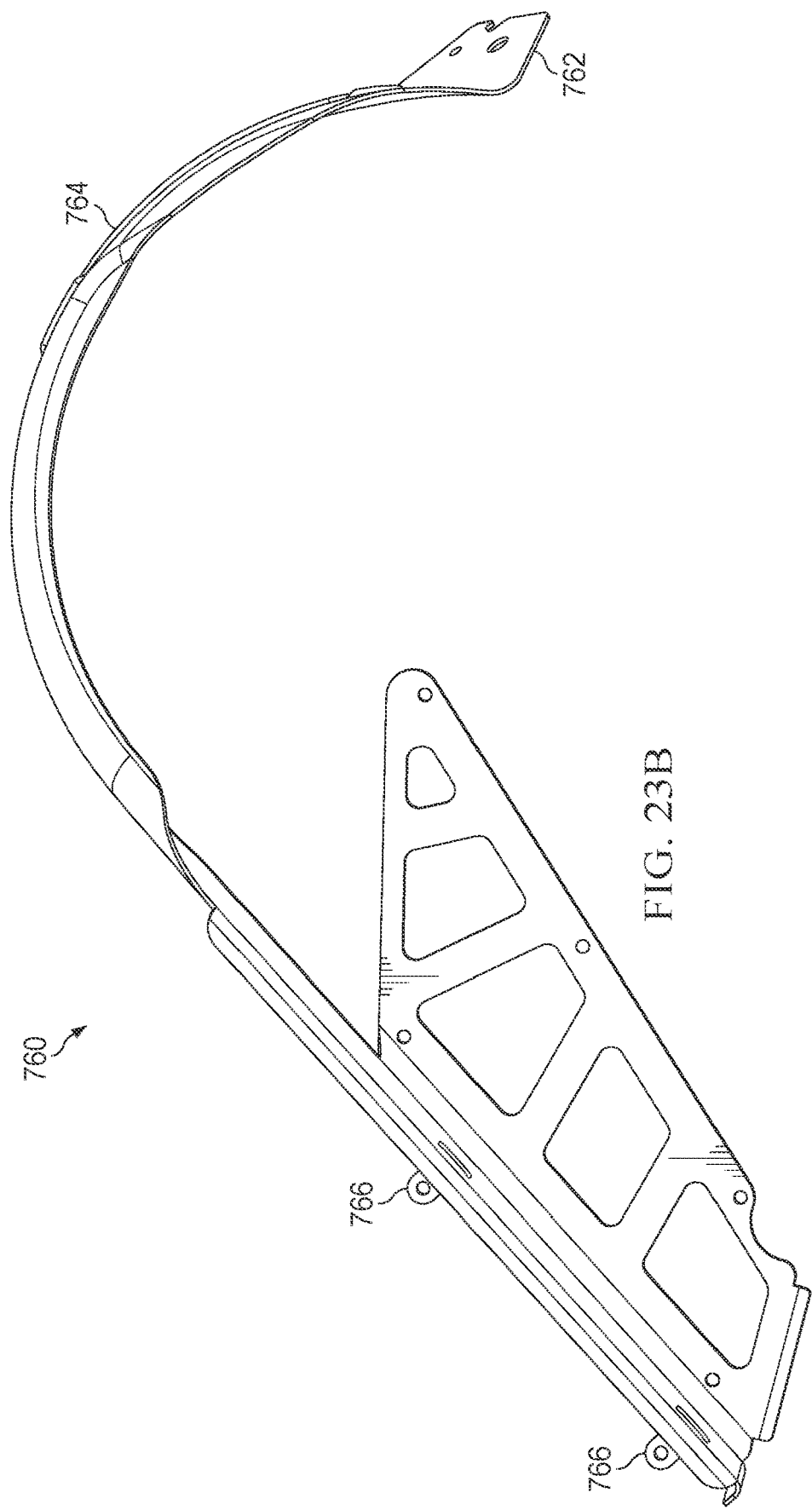
FIG. 23B illustrates a side view of a liner assembly 760, according to some embodiments.
Figure 23C:
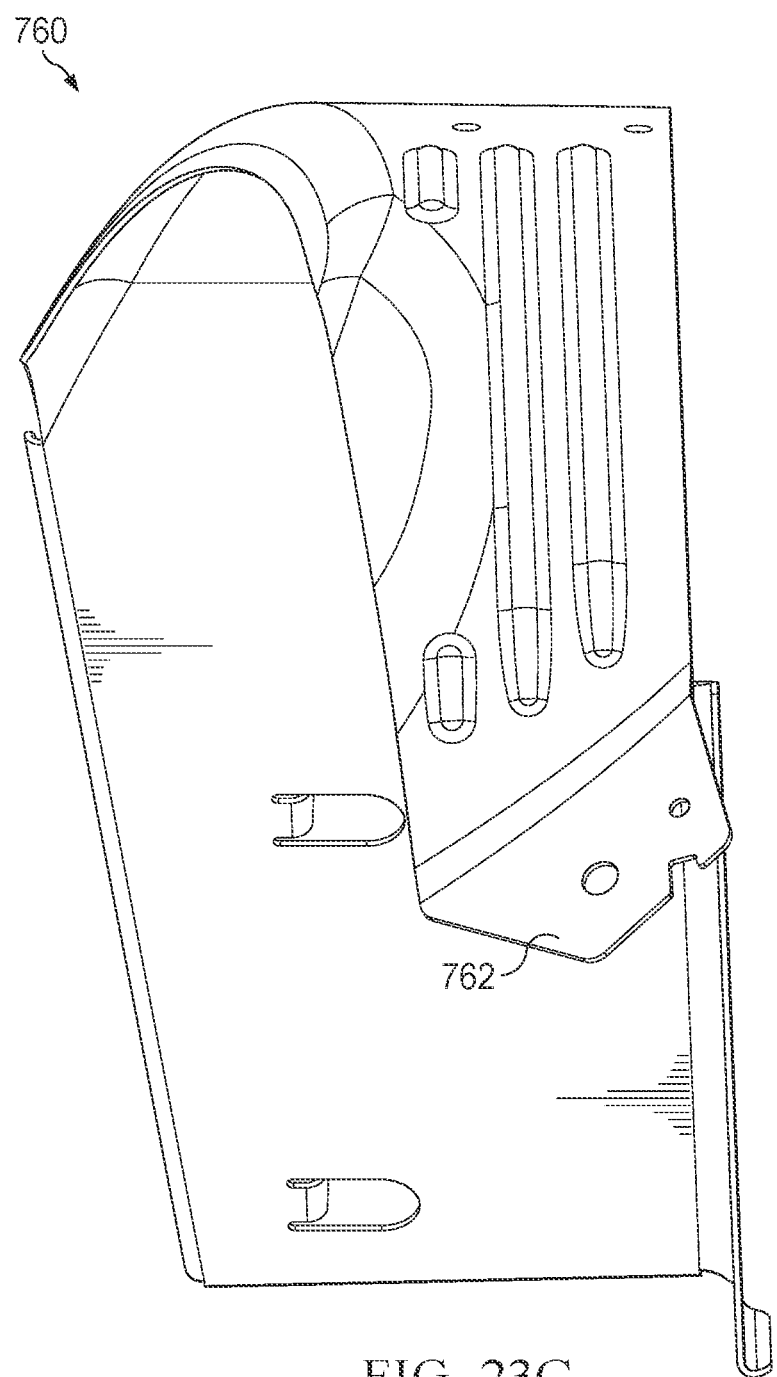
FIG. 23C illustrates a front view of a liner assembly 760, according to some embodiments.
Figure 23D:
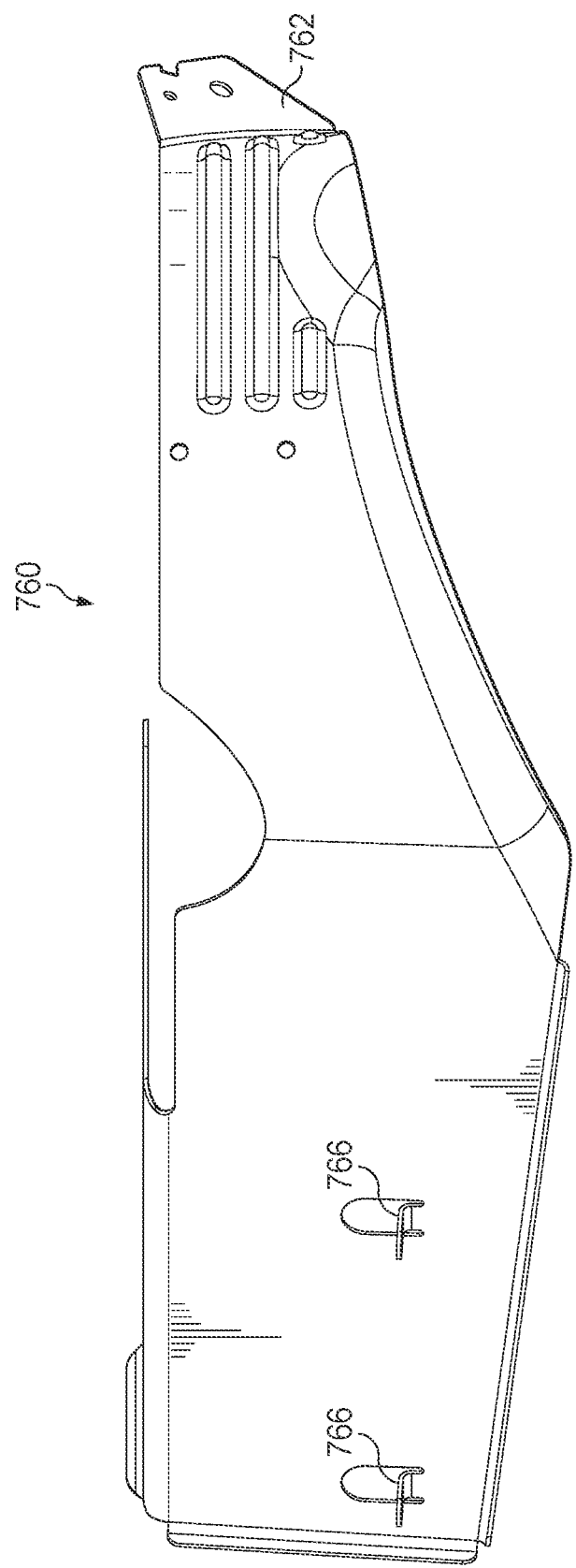
FIG. 23D illustrates a top view of a liner assembly 760, according to some embodiments.

FIG. 22A-B illustrate perspective views of recoil housing 950 and starting cord 968, according to some embodiments. Recoil housing 950 may include damping feature 408, arm 952, housing portion 962, mounting portion 964, engine fastening feature 972, fastening feature 974, mounting portion feature 976, starting cord pathway 978, first ribs 980, second ribs 981, housing portion feature 982, and airflow component 984.

Figure 24:
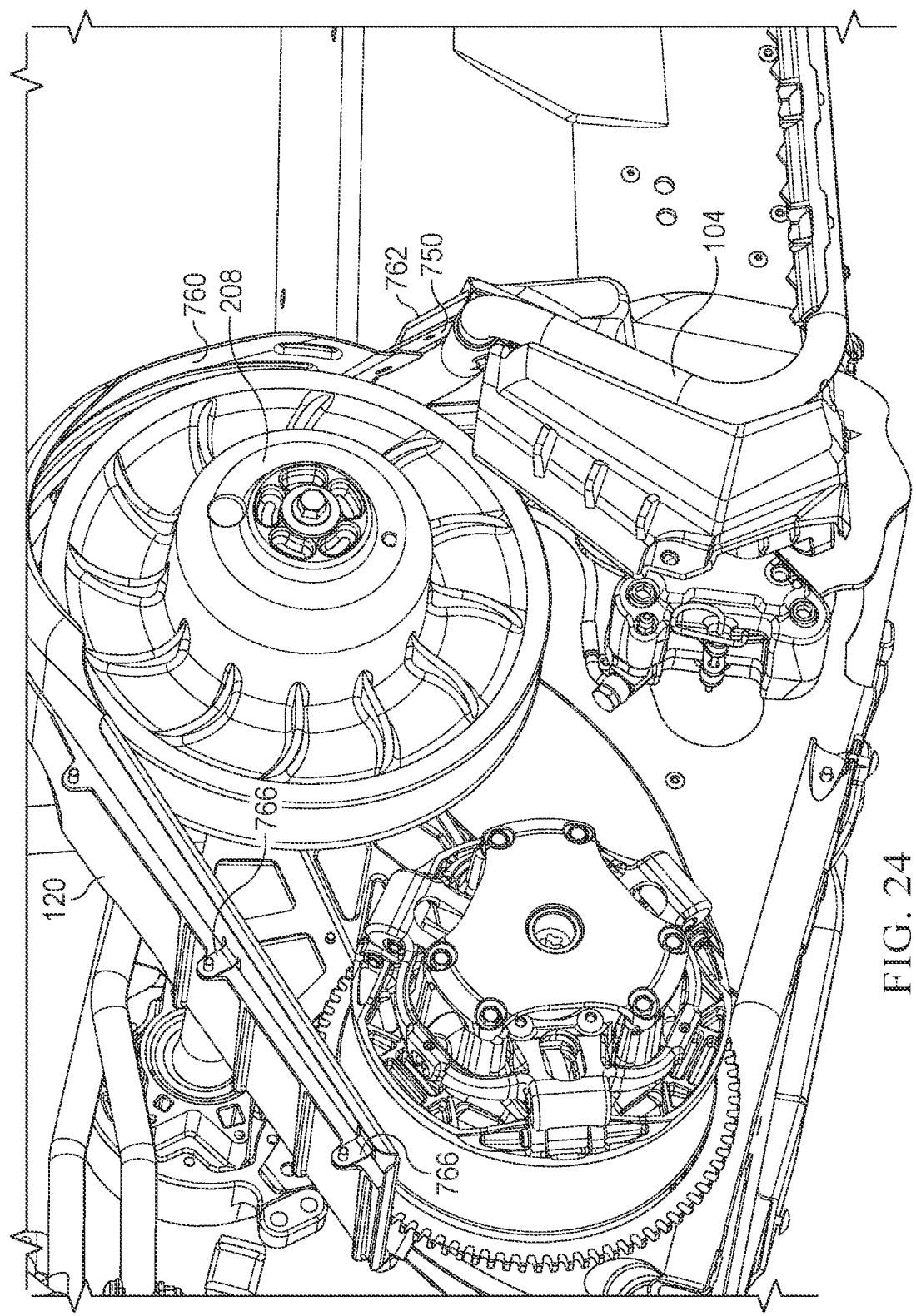
FIG. 24 illustrates an isometric view of a liner assembly 760 secured to the clutch guard 120 and a snowmobile frame, according to some embodiments.

FIGS. 23A-23D illustrate views of the liner assembly 760, according to some embodiments. The liner assembly 760 includes a frame connection feature 762 (i.e., a flange 762), a curved portion 764 configured to follow the interior curvature of the lip 160 of the clutch guard 120 around the driven clutch 208, and a planar portion positionable on the underside of the lip 160 with one or more attachment features 766 extending therefrom that are configured to engage or affix to one or more mounting features that may be positioned on an outboard end of the lip 160 of the clutch guard 120 (see e.g., FIG. 24). The one or more attachment features 766 may be configured to secure the liner assembly 760 to the clutch guard 120 via rivets or other fasteners.

In some embodiments, the liner assembly 760 may be manufactured from aluminum, graphite, steel alloy, or any other high strength, low weight material known in the art. The frame connection feature 762 may extend from underneath the end of the curved portion of the lip 160, and rearward therefrom to be secured or affixed directly to the frame 104 at the frame mount feature 750, and thus, the frame 104 may provide structural support for the liner assembly 760. Accordingly, the liner 760 defines an indirect cantilevered connection between the shield body 124 and the frame 140. Therefore, the shield body 124 is not unnecessarily constricted from moving, except that the cantilevered liner 760 connection to the frame 104 allows the liner 760 to inhibit forward deflection of the curved length of the lip 160 towards the belt or other components of the belt assembly. In other embodiments, the frame connection feature 762 may be secured to a toe stop, outboard, or other structural component secured to the frame 104. The liner assembly 760 may provide an additional safeguard to prevent the shield body 124 and/or other components from deflecting toward the drive clutch 206 and/or the driven clutch 208. In some embodiments, the liner assembly 760 may be configured to absorb and/or distribute an impact load from the clutch guard 120 and to the frame 104. In some embodiments, the liner assembly 760 may provide additional resistance to a belt failure, i.e., the liner assembly 760 may prevent a fast-moving belt from impacting the lip 160.

Optionally, the engine crankcase includes a bulkhead extending between the first and second structural walls substantially parallel to the longitudinal centerline of the vehicle frame, and the engine mount housing is secured to the mounting surface with a second fastener that extends into the bulkhead.

Optionally, the mounting surface 904 is a planar surface on a wall that extends outward from the panel and along the panel from the first structural wall to the bulkhead, wherein the wall at least partially defines an oblong perimeter about a portion of the panel, wherein the portion of panel inside the perimeter is positioned opposite the damper.

Optionally, the first structural wall is positioned forward of the second structural wall along the longitudinal centerline. Optionally, the first fastener is positioned a first distance from the longitudinal centerline, and the second fastener is positioned a second distance from the longitudinal centerline that is different than the first distance.

Optionally, the second fastener is positioned along the longitudinal centerline between the first structural wall and the second structural wall and closer to the second structural wall than the first. This may position the fasteners away from the apex of the curved surface, thereby lowering the damper which is also offset from the apex. The apex may be positioned midway between the first and the second structural walls.

Optionally, the clutch guard may include one or more exhaust attachment features. The shield body portion may include an inboard side, an outboard side, and a lip extending outboard from the outboard side, wherein the outboard side and the lip are shaped to at least partially house a transmission belt when secured to the snow vehicle, wherein the inboard side includes one or more accessory attachment features defined thereon. The clutch guard may further comprise a heat shielding component in contact with the one more exhaust attachment features.

Optionally, the clutch guard may include a damping component, positioned at least partially within each of the one or more chassis mounting features.

Optionally, the clutch guard may include the shield body portion and the torque control link portion comprised of a polymer matrix composite.

Optionally, the clutch guard may include a bearing, positioned at least partially within the jackshaft aperture.

Optionally, the clutch guard may include one or more compression limiters positioned at least partially within the one or more engine mounting features.

Optionally, the clutch guard may include a metal or metal alloy liner assembly affixed to the shield body portion, wherein the liner assembly includes a curved portion configured to provide structural support to the clutch guard.

Optionally, the clutch guard may include a shield body portion including a lip extending outboard from an outboard side, wherein the lip includes a first planar length extending from a forward end of the shield body portion, and a second curved length extending rearward therefrom. A lower surface of the lip at least partially houses a transmission belt with the outboard side, the liner assembly includes a first planar length secured to the lower surface of the first planar length of the lip, and a second curved length that extends along and conforms to the lower surface of the second curved length of the lip but is not secured thereto. A flange extends outward from an end of the second curved length of the liner assembly under and rearward of a rearward end of the second curved length of the lip, the flange is directly secured to a chassis to inhibit forward deflection of the second curved length of the lip of the shield body portion, and the shield body portion is not directly secured to the chassis.

Optionally, the snowmobile may include an exhaust system in contact with the engine. The snowmobile may further include one or more exhaust attachment features on the shield body for securing at least a portion of the exhaust system to the clutch guard. The shield body and the torque control link section may comprise a polymer matrix composite. The shield body may include an inboard side, an outboard side, and a lip extending outboard from the outboard side, wherein the outboard side and a lower surface of the lip are shaped to at least partially house a transmission belt when secured to the snowmobile, wherein an upper surface of the lip includes one or more accessory attachments defined thereon, wherein the accessory attachment defines a first arm extending outward from an inboard end of the lip and a second arm extending outward from an outboard end of the lip to define an accessory retention feature therebetween.

Optionally, the snowmobile may include a heat shielding component in contact with the one more exhaust attachment features and the exhaust system. One or more compression limiters may be positioned at least partially within the one or more engine mounting features.

Optionally, the snowmobile may include a clutch guard further includes a liner assembly affixed to the shield body, the liner assembly including a frame connection feature configured to secure to the chassis, and a curved portion configured to partially surround the driven clutch.

Optionally, the snowmobile may include a shield body including an outboard side that at least partially houses the belt, and an inboard side, where one or more accessory attachment features are defined on the inboard side of the shield body. The snowmobile may further comprise a fiber reinforced recoil housing secured on a second side of the engine, the fiber reinforced recoil housing secured to the chassis.

Optionally, the snowmobile may include a shield body including a lip extending outboard from an outboard side, wherein the lip includes a first planar length extending from a forward end of the shield body, and a second curved length extending rearward therefrom, wherein a lower surface of the lip at least partially houses the belt with the outboard side, and wherein a metal or metal alloy liner includes a first planar length secured to the lower surface of the first planar length of the lip, and a second curved length that extends along and conforms to the lower surface of the second curved length of the lip but is not secured thereto, wherein a flange extends outward from an end of the second curved length of the liner under and rearward of a rearward end of the second curved length of the lip, wherein the flange is directly secured to the chassis to inhibit forward deflection of the second curved length of the lip of the shield body, and wherein the shield body is not directly secured to the chassis.

It is to be understood that the first fastener may be inserted in a bulkhead instead of the first structural wall. It is to be understood that the wall positioned near the first structural wall has a height that is greater than the height of the wall near the bulkhead.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus, the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

The invention claimed is:

1. A recoil housing for an engine in a vehicle, comprising:
a housing portion including one or more first apertures, the housing portion configured to at least partially house a crankcase of the engine;
an arm, integrated with the housing portion; and
a mounting portion integrated with the arm;

wherein the mounting portion includes one or more second apertures, wherein the arm is configured to secure to a frame mount feature on the vehicle.

2. The recoil housing of claim 1, wherein the one or more second apertures are configured to receive a damping component therein, the damping component configured to be secured to the vehicle.

3. The recoil housing of claim 2, wherein the arm includes one or more ribs extending from the housing portion to the damping component.

4. The recoil housing of claim 3, wherein the recoil housing is a single-piece construction.

5. The recoil housing of claim 4, wherein the arm includes a starting cord pathway configured to receive a starting cord therethrough.

6. The recoil housing of claim 5, wherein the arm extends outboard from the housing portion, wherein the frame mount feature is located rearward from the crankcase.

7. The recoil housing of claim 1, wherein each of the one or more first apertures includes a damping feature, the damping feature configured to prevent deformation of the recoil housing.

8. The recoil housing of claim 7, wherein each of the one or more first apertures are disposed on an outer circumference of the recoil housing and wherein each of the one or more first apertures include an unthreaded through hole configured to receive a threaded fastener and/or a self-tapping fastener.

9. The recoil housing of claim 1, wherein the housing portion comprises a third aperture for accepting a self-tapping screw or machine screw sufficient to secure an engine starting component to the housing portion.

10. The recoil housing of claim 1, wherein the recoil housing includes a fiber reinforced polymer body including one or more of Polyphthalamide, Nylon 6/6, Polyetheretherketone, and Polypropylene, wherein the fiber reinforced polymer body includes a fiber material ranging in percent volume from 40%-60%.

11. A snowmobile comprising:
an engine mounted on a chassis, the engine including a crankcase; and
a recoil housing with a fiber reinforced polymer body including:
a housing portion in contact with the engine, wherein the housing portion includes one or more first apertures,
an arm, integrated with the housing portion; and
a mounting portion integrated with the arm;
wherein the mounting portion includes one or more second apertures,
wherein the arm is configured to secure to a frame mount feature on the vehicle,
the frame mount feature located rearward from the crankcase.

12. The snowmobile of claim 11, wherein the recoil housing is a single-piece construction.

13. The snowmobile of claim 11, wherein the fiber reinforced polymer body comprises one or more of Polyphthalamide, Nylon 6/6, Polyetheretherketone, and Polypropylene, wherein the fiber reinforced polymer body includes a fiber material ranging in percent volume from 40%-60%.

14. The snowmobile of claim 11 wherein the crankcase includes an upper crankcase portion and a lower crankcase portion secured together, wherein at least one of the one or more first apertures are configured to secure to the upper crankcase and wherein at least one of the one or more first apertures are configured to secure to the lower crankcase.

15. The snowmobile of claim 11, wherein one or more of the arm and the mounting portion are offset to an inboard or outboard side of the snowmobile from the housing portion.

16. The snowmobile of claim 11 further comprising a damping component, wherein the damping component is positioned at least partially within the one or more second apertures.

17. The snowmobile of claim 16, wherein the damping component is secured to one or more of the chassis, a mount, a heat exchanger assembly, and a heat exchanger end cap.

18. A snowmobile comprising:
an engine mounted on a chassis;
a clutch guard secured to both the chassis and the engine; and
a single-piece construction recoil housing on an opposite side of the engine from the clutch guard, the single-piece construction recoil housing including:
a housing portion in contact with the engine, wherein the housing portion includes one or more first apertures,
an arm, integrated with the housing portion and extending rearward of the housing portion; and
a mounting portion integrated with the arm.

19. The snowmobile of claim 18 further comprising a damping component, wherein the damping component is positioned at least partially within the mounting portion.

20. The snowmobile of claim 19, wherein the damping component is secured to one or more of the chassis, a mount, a heat exchanger assembly, and a heat exchanger end cap.

* * * * *